(12) United States Patent
Hunter

(10) Patent No.: US 12,373,647 B2
(45) Date of Patent: Jul. 29, 2025

(54) SEMANTIC MAP GENERATION FROM NATURAL-LANGUAGE TEXT DOCUMENTS

(71) Applicant: Digital Asset Capital, Inc., Gaithersburg, MD (US)

(72) Inventor: Edward Hunter, Gaithersburg, MD (US)

(73) Assignee: Digital Asset Capital, Inc, Gaithersburg, MD (US)

( * ) Notice: Subject to any disclaimer, the term of this patent is extended or adjusted under 35 U.S.C. 154(b) by 0 days.

(21) Appl. No.: 17/892,026

(22) Filed: Aug. 19, 2022

(65) Prior Publication Data
US 2023/0059494 A1 Feb. 23, 2023

Related U.S. Application Data

(60) Provisional application No. 63/282,583, filed on Nov. 23, 2021, provisional application No. 63/234,978, filed on Aug. 19, 2021.

(51) Int. Cl.
*G06F 40/30* (2020.01)
*G06F 16/34* (2025.01)
(Continued)

(52) U.S. Cl.
CPC ............. *G06F 40/30* (2020.01); *G06F 16/34* (2019.01); *G06F 16/367* (2019.01);
(Continued)

(58) Field of Classification Search
CPC .... G06F 40/30; G06F 16/367; G06F 16/9024; G06F 40/137; G06F 40/169; G06F 40/20;
(Continued)

(56) References Cited

U.S. PATENT DOCUMENTS 8,766,666 B2 * 7/2014 Dlugosch .......... G06F 15/17362
326/46
8,977,953 B1 * 3/2015 Pierre ................... G06F 40/289
715/201
(Continued)

FOREIGN PATENT DOCUMENTS

CN 114064920 A * 2/2022
CN 114661914 A * 6/2022
(Continued)

OTHER PUBLICATIONS

Non-Final Office Action from related U.S. Appl. No. 17/892,030 dated Jun. 22, 2023, pp. 1-105.
(Continued)

*Primary Examiner* — Benjamin Smith
(74) *Attorney, Agent, or Firm* — Pillsbury Winthrop Shaw Pittman LLP

(57) ABSTRACT

Techniques include obtaining, with a computer system, a natural-language-text document comprising unstructured text; generating, with the computer system, based on a first set of machine learning model parameters, a neural representation of the unstructured text; identifying, with the computer system, based on the neural representation, a trigger word located within the unstructured text and associated with a first category; determining, with the computer system, based on the trigger word, a region within the unstructured text comprising descriptors associated with the first category; determining, with the computer system, from the region based on a second set of machine learning model parameters, a descriptor describing an action or condition of the first category; generating, with the computer system, a data model object comprising the descriptor defining an action or condition of the first category; and storing, with the computer system, the data model object in memory.

17 Claims, 20 Drawing Sheets

(51) Int. Cl.

| | |
|---|---|
| *G06F 16/36* | (2019.01) |
| *G06F 16/901* | (2019.01) |
| *G06F 16/9038* | (2019.01) |
| *G06F 16/93* | (2019.01) |
| *G06F 40/117* | (2020.01) |
| *G06F 40/137* | (2020.01) |
| *G06F 40/169* | (2020.01) |
| *G06F 40/20* | (2020.01) |
| *G06F 40/211* | (2020.01) |
| *G06F 40/258* | (2020.01) |
| *G06F 40/284* | (2020.01) |
| *G06N 5/022* | (2023.01) |
| *G06Q 50/18* | (2012.01) |

(52) U.S. Cl.
CPC ...... *G06F 16/9024* (2019.01); *G06F 16/9038* (2019.01); *G06F 16/93* (2019.01); *G06F 40/117* (2020.01); *G06F 40/137* (2020.01); *G06F 40/169* (2020.01); *G06F 40/20* (2020.01); *G06F 40/211* (2020.01); *G06F 40/258* (2020.01); *G06F 40/284* (2020.01); *G06N 5/022* (2013.01); *G06Q 50/18* (2013.01)

(58) Field of Classification Search
CPC .... G06F 40/211; G06F 40/258; G06F 40/284; G06Q 50/18
See application file for complete search history.

(56) References Cited

U.S. PATENT DOCUMENTS

| | | | |
|---|---|---|---|
| 9,263,052 B1 | 2/2016 | Talkin | |
| 10,121,467 B1 | 11/2018 | Gandhe et al. | |
| 10,191,788 B2* | 1/2019 | Dlugosch | G06F 15/17362 |
| 10,445,698 B2* | 10/2019 | Hunn | G06Q 10/10 |
| 10,460,162 B2* | 10/2019 | Gelosi | G06F 40/131 |
| 10,650,186 B2* | 5/2020 | Gelosi | G06F 40/137 |
| 10,726,198 B2* | 7/2020 | Gelosi | G06F 40/166 |
| 10,831,452 B1* | 11/2020 | Hunter | G06F 17/18 |
| 10,915,578 B1* | 2/2021 | Hunter | H04L 9/3263 |
| 10,990,879 B2* | 4/2021 | Hunter | H04L 63/123 |
| 11,017,778 B1* | 5/2021 | Thomson | G10L 15/28 |
| 11,087,219 B1* | 8/2021 | Brecque | G06F 40/143 |
| 11,132,403 B2* | 9/2021 | Hunter | G06F 21/64 |
| 11,145,312 B2 | 10/2021 | Thomson et al. | |
| 11,170,761 B2 | 11/2021 | Thomson et al. | |
| 11,256,856 B2* | 2/2022 | Gelosi | G06F 40/131 |
| 11,379,735 B2* | 7/2022 | Brecque | G06F 40/279 |
| 11,393,024 B1* | 7/2022 | Kodihalli | G06Q 40/03 |
| 11,475,209 B2* | 10/2022 | Gelosi | G06F 16/31 |
| 11,526,333 B2* | 12/2022 | Hunter | G06F 9/5038 |
| 11,526,614 B2* | 12/2022 | Fang | H04L 9/50 |
| 11,544,468 B2* | 1/2023 | Manandise | G06Q 10/10 |
| 11,568,505 B2* | 1/2023 | Hunn | G06Q 50/188 |
| 11,803,706 B2* | 10/2023 | Pito | G06F 40/289 |
| 11,967,312 B2* | 4/2024 | Yuan | G06N 3/08 |
| 2009/0012842 A1* | 1/2009 | Srinivasan | G06F 16/3344 707/999.005 |
| 2011/0307433 A1* | 12/2011 | Dlugosch | G06F 15/17312 706/45 |
| 2013/0346066 A1 | 12/2013 | Deoras et al. | |
| 2017/0060649 A1* | 3/2017 | Dlugosch | G06F 11/3409 |
| 2018/0005186 A1* | 1/2018 | Hunn | G06F 16/93 |
| 2018/0365201 A1* | 12/2018 | Hunn | G06F 40/134 |
| 2019/0114479 A1* | 4/2019 | Gelosi | G06F 40/166 |
| 2019/0122317 A1* | 4/2019 | Hunn | H04L 9/0637 |
| 2019/0220503 A1* | 7/2019 | Gelosi | G06F 40/177 |
| 2019/0303541 A1* | 10/2019 | Reddy | G06F 21/64 |
| 2019/0303579 A1* | 10/2019 | Reddy | H04L 9/3239 |
| 2019/0303623 A1* | 10/2019 | Reddy | G06F 8/71 |
| 2019/0305957 A1* | 10/2019 | Reddy | G06F 8/60 |
| 2019/0305959 A1* | 10/2019 | Reddy | G06F 8/73 |
| 2019/0306173 A1* | 10/2019 | Reddy | H04L 63/0281 |
| 2019/0377779 A1* | 12/2019 | Gelosi | G06F 40/137 |
| 2020/0057994 A1* | 2/2020 | Hunn | G06F 21/645 |
| 2020/0143366 A1 | 5/2020 | Liu et al. | |
| 2020/0143372 A1 | 5/2020 | Liu et al. | |
| 2020/0175961 A1 | 6/2020 | Thomson et al. | |
| 2020/0243094 A1* | 7/2020 | Thomson | G10L 15/32 |
| 2021/0073282 A1* | 3/2021 | Hunter | G06F 21/64 |
| 2021/0073284 A1* | 3/2021 | Hunter | G06F 8/35 |
| 2021/0073285 A1* | 3/2021 | Hunter | G06F 8/65 |
| 2021/0073286 A1* | 3/2021 | Hunter | H04L 9/50 |
| 2021/0073287 A1* | 3/2021 | Hunter | H04L 9/3239 |
| 2021/0073288 A1* | 3/2021 | Hunter | G06F 9/547 |
| 2021/0073289 A1* | 3/2021 | Hunter | H04L 9/3239 |
| 2021/0073290 A1* | 3/2021 | Hunter | G06F 17/18 |
| 2021/0073291 A1* | 3/2021 | Hunter | G06N 3/045 |
| 2021/0073647 A1* | 3/2021 | Hunter | G06F 21/64 |
| 2021/0110047 A1* | 4/2021 | Fang | H04L 63/1433 |
| 2021/0149958 A1* | 5/2021 | Hunter | G06F 17/18 |
| 2021/0150128 A1* | 5/2021 | Gelosi | G06F 40/177 |
| 2021/0157975 A1* | 5/2021 | Gelosi | G06F 40/166 |
| 2021/0295321 A1 | 9/2021 | Liu et al. | |
| 2021/0342530 A1* | 11/2021 | Wu | G06F 40/30 |
| 2021/0366065 A1* | 11/2021 | Zhou | G06F 16/338 |
| 2021/0374672 A1* | 12/2021 | Hunn | H04L 9/50 |
| 2021/0383247 A1* | 12/2021 | Brecque | G06N 5/02 |
| 2022/0027564 A1* | 1/2022 | Manandise | G06F 40/211 |
| 2022/0028397 A1 | 1/2022 | Thomson et al. | |
| 2022/0036890 A1* | 2/2022 | Yuan | G10L 15/063 |
| 2022/0059077 A1 | 2/2022 | Thomson | |
| 2022/0122587 A1 | 4/2022 | Thomson et al. | |
| 2022/0284215 A1 | 9/2022 | Rastogi et al. | |
| 2022/0335553 A1* | 10/2022 | Chew | G06F 16/35 |
| 2022/0398256 A1* | 12/2022 | Hartline | G06F 16/256 |
| 2023/0140938 A1* | 5/2023 | Sun | G06F 40/205 715/256 |
| 2023/0162304 A1* | 5/2023 | Hunn | G06Q 50/188 707/798 |

FOREIGN PATENT DOCUMENTS

| | | | |
|---|---|---|---|
| CN | 115269874 A | * | 11/2022 |
| CN | 115422904 A | * | 12/2022 |

OTHER PUBLICATIONS

Non-Final Office Action from related U.S. Appl. No. 17/892,033 dated Jun. 22, 2023, pp. 1-21.

* cited by examiner

Step 1. Trigram scores.
For all triples $(y_i, y_{i-1}, y_{i-2})$ in input sequence, compute $$\phi(y_i, y_{i-1}, y_{i-2})$$

Step 2. Initialization.
Set $\theta^0_{-1,0} = 0$.
For all $i, j, l > 0$, set $\theta^l_{ij} = -\infty$, $\pi^l_{ij} = \emptyset$.

Step 3. Node relaxation.
For step $l = 0 \ldots m$,

Step 3a. Update internal nodes.
For each current node $(h_i, h_j)_l$,
For each adjacent node $(h_j, h_k)_{l+1}$
If $\theta^l_{ij} + \phi(h_k, h_j, h_i) > \theta^{l+1}_{jk}$, set $$\theta^{l+1}_{jk} = \theta^l_{ij} + \phi(h_k, h_j, h_i)$$
$$\pi^{l+1}_{jk} = (i, j)$$

Step 3b. Update terminal node.
For each current node $(h_i, h_j)_{l>0}$
If $\theta^l_{ij} + \phi(h_{n+1}, h_j, h_i) > \theta_{n+1}$, set $$\theta_{n+1} = \theta^l_{ij} + \phi(h_{n+1}, h_j, h_i)$$
$$\pi_{n+1} = (i, j, l)$$

FIG. 3H

Step 1. Trigram scores.
For all triples $(y_i, y_{i-1}, y_{i-2})$ in input sequence, compute
$$\phi(y_i, y_{i-1}, y_{i-2})$$
Step 2. Backward recurrence.
Set $\theta_{m+1}(y_m, y_{m-1}) \triangleq \phi(h_{n+1}, y_m, y_{m-1})$
For $i = m \ldots 1$, compute $$\theta_i(y_{i-1}, y_{i-2}) = \max_{y_i} \begin{cases} \phi(y_i, y_{i-1}, y_{i-2}) + \theta_{i+1}(y_i, y_{i-1}) & y_i \neq h_{n+1} \\ \phi(y_i, y_{i-1}, y_{i-2}) \alpha_i & y_i = h_{n+1} \end{cases}$$

Step 3. Forward recurrence.
For $i = 1 \ldots m^*$, $y_{m^*} = h_{n+1}$, compute
$$y_i^* = \arg\max_{y_i} \theta_i(y_{i-1}^*, y_{i-2}^*)$$

FIG. 3I

Step 1. Initialize beam.
$$A_0 = \{(y'_0, \theta_0)\} \quad y'_0 = (y_0, y_{-1}), \theta_0 = 0$$

Step 2. Propagate beam.
For $i = 1...m + 1$,

Step 2a. Expand beam.
Expand each current beam element $(y'_j, \theta_j)$ into all possible one word extensions, $$\text{Compute } \{(y'_{jk}, \theta_{jk})\}_{j=1, k=1}^{b, k}$$

$$\theta_{jk} = \begin{cases} \phi(y_i, y_{i-1}, y_{i-2}) + \theta_j & y_i \neq h_{n+1} \\ \phi(y_i, y_{i-1}, y_{i-2})\alpha_i + \theta_j & y_i = h_{n+1} \end{cases}$$

$$y'_{jk} = y_i \circ y'_j$$

where
$$\text{ind}_h(y_i) > \text{ind}_h(y_{i-1})$$
$$y_{i-1} \neq h_{n+1}$$
$$(y_{i-1}, y_{i-2}) = \text{prefix}(\pi_j)$$

Step 2b. Filter beam.

$$A_i = \{(y'_j, \theta_j)\}_{j=1}^{b} = \{(y', \theta) \in \{(y'_{jk}, \theta_{jk})\}_{j=1, k=1}^{b, k} \mid \theta \in \text{b-max } \theta_{jk}\}$$

Step 3. Compute solution.

$$(y^*, \theta^*) = (y', \theta) \in A \mid \theta = \max_j \theta_j$$

$$\pi^* = \text{ind}_h y^*$$

FIG. 3J

SEMANTIC MAP GENERATION FROM NATURAL-LANGUAGE TEXT DOCUMENTS

CROSS-REFERENCE TO RELATED APPLICATIONS

This application claims priority to U.S. Provisional Patent Application No. 63/282,583, filed on Nov. 23, 2021, titled "SEMANTIC CONTRACT MAP GENERATION FROM NATURAL-LANGUAGE-TEXT DOCUMENTS" and U.S. Provisional Patent Application No. 63/234,978, filed on Aug. 19, 2021, titled "SEMANTIC MAP GENERATION FROM NATURAL-LANGUAGE-TEXT DOCUMENTS," which are each hereby incorporated by reference in their entireties.

This application is related to, extends upon the techniques described in, and describes processes that can be integrated with embodiments of U.S. patent application Ser. No. 17/337,239, filed on Jun. 2, 2021, titled "SEMANTIC MAP GENERATION FROM NATURAL-LANGUAGE-TEXT DOCUMENTS," U.S. Provisional Patent Application No. 63/034,255, filed on Jun. 3, 2020 titled "SEMANTIC CONTRACT MAPS," U.S. Provisional Patent Application 63/134,872, filed on Jan. 7, 2021, titled "STRUCTURED SEMANTIC CONTRACT MAPS," U.S. Provisional Patent Application No. 63/191,724 filed on May 21, 2021, titled "SEMANTIC CONTRACT MAPPING WITH DEEP LEARNING," U.S. patent application Ser. No. 16/893,299, filed Jun. 4, 2020, titled "GRAPH EXPANSION AND OUTCOME DETERMINATION FOR GRAPH-DEFINED PROGRAM STATES" (now U.S. Pat. No. 10,990,879), U.S. patent application Ser. No. 17/015,069, filed on Sep. 8, 2020, titled "GRAPH-BASED PROGRAM STATE NOTIFICATION", U.S. patent application Ser. No. 17/015,028, filed on Sep. 8, 2020, titled "QUERYING GRAPH-BASED MODELS," U.S. patent application Ser. No. 17/015,074, filed on Sep. 8, 2020, titled "ADAPTIVE PARAMETER TRANSFER FOR LEARNING MODELS," and U.S. patent application Ser. No. 17/015,042, filed on Sep. 8, 2020, titled "MULTIGRAPH VERIFICATION," U.S. Patent Application titled SEMANTIC MAP GENERATION USING HIERARCHICAL CLAUSE STRUCTURE filed Aug. 19, 2022, and U.S. Patent Application titled SEMANTIC MAP GENERATION EMPLOYING LATTICE PATH DECODING filed Aug. 19, 2022. Each afore-listed patent filing is hereby incorporated by reference in their entireties.

BACKGROUND

Distributed applications operating on a distributed computing platform may be useful in a variety of contexts. Such applications can store program state data on a tamper-evident data store operating on the distributed computing platform. The use of a tamper-evident data store or some other data systems distributed over multiple computing devices may increase the security and reliability of distributed applications. Additionally, data queried from the tamper-evident data store may be utilized in applications related to the context in which the tamper-evident data store is used.

SUMMARY

The following is a non-exhaustive listing of some aspects of the present techniques. These and other aspects are described in the following disclosure.

Some aspects include a process that includes obtaining a natural-language-text document comprising a plurality of clauses. The process includes identifying a first set of characteristics describing one or more of rights, obligations, and prohibitions of contract parties. The process includes extracting a graph depicting a first hierarchy of clauses including one or more characteristics of the first set of characteristics. The process includes extracting a triple from the graph by generating a decoding lattice and obtaining a path that maximizes a calculated output score. The process includes performing a decoding operation to provide the decoded triple for consumption.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE SEVERAL VIEWS OF THE DRAWINGS

The above-mentioned aspects and other aspects of the present techniques will be better understood when the present application is read in view of the following figures in which like numbers indicate similar or identical elements.

FIG. 3H illustrates a diagram for lattice decoding in generating a semantic contract map in accordance with one or more embodiments.

FIG. 3I illustrates a diagram for lattice decoding by recursive optimization in generating a semantic contract map in accordance with one or more embodiments.

FIG. 3J illustrates a diagram for lattice decoding by beam search in generating a semantic contract map in accordance with one or more embodiments.

Figure 1:
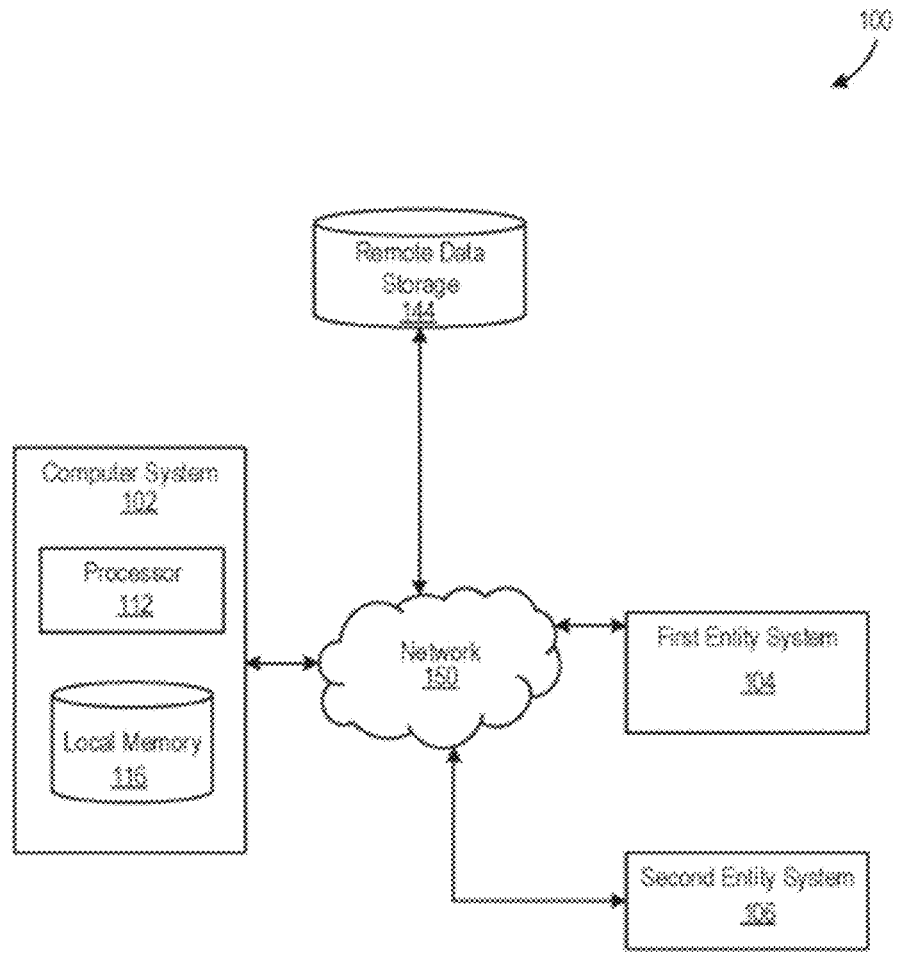
FIG. 1 is a schematic diagram of a first computing environment in which a self-executing protocol may be generated from a natural-language-text document, in accordance with one or more embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of natural language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Contracts can be very complex, and the complexity can be a profound hindrance to business decision making. A modern syndicated loan credit agreement can reach 200 pages or more, not including exhibits and amendments. Every sentence therein may contain legal payloads that combine broadly with each other to create an intricate logical structure, entailing, for example, hundreds or thousands of propositions, implications and interrelationships that can be difficult to reason over holistically. Often, consideration is narrowed to isolated clauses or conditions to reduce complexity and develop a partial logical picture, followed by iterative expansions of focus in an attempt to assemble a coherent logical framework piecemeal. This can be labor intensive and error-prone, and may exacerbate inefficiencies in multiparty business processes governed by these documents. Answering questions (e.g., "Who is responsible for repayments if the borrower defaults?" or "What lender rights become activated in an event of default?") can involve finding clauses identifying principal obligations and default events, and tracing named contract entities from there recursively until another clause can be identified that carries the desired information. Often, personnel who need answers to these questions, such as portfolio managers trading or evaluating positions, lack the expertise and time to find this information, and, as a result, decision making often occurs without it. As a result, businesses may not have a clear picture of their own risk or exposure, and markets generally may be left in a weakened position.

Normative assertions describing the rights, obligations, and prohibitions (ROPs) of contract parties, and their dynamic relationships are often the heart of contracts. They may describe, for example, what "ought to be," the current state, the steps leading up to the current state and the conditions that will result if expectations are met or not.

Contracts are often complex because they contain a vast number of inter-related assertions that exist as unstructured natural language. Unstructured legal text, with all its quirks and customs, is generally intended for human consumption, primarily by legal professionals. That is, the data is represented in a form intended for a certain, primitive kind of presentation. Because unstructured legal text lacks a data model or semantic annotation, unstructured legal text may not be easily visualized or queried in ways that would make it straightforward to answer questions like those above. With unstructured text, A user may, for example, rely on basic keyword searching to locate relevant text and terms. But when data can be structured in a way that codifies some of the essential semantics that arise when reasoning about it, the representation may be considered "smarter," in that it may allow for various kinds of automation. ROPs represent a fundamental se-mantic unit in legal reasoning, and thus, it would be particularly useful if textual units describing the rights, obligations and prohibitions could be automatically identified and represented in a machine processable form that is capable of capturing these kinds of normative semantics. This could enable building of powerful tools to visualize, query and automatically reason about contracts.

Various approaches to modeling legal semantics may be considered. In some embodiments, normative assertions can be considered as semantic triples of the form SPP:

$$(\text{subject}, \text{predicate}, \text{proposition}) \qquad (1)$$

In this approach, a contract may be considered a long list of statements of this form, along with metadata that binds the statements to each other and to locations in the unstructured text. The top-level predicate may, for example, be constrained to describe an individual ROP to facilitate modeling normative assertions. This may be applicable to a large amount of contract mechanics. The subject may, for example, be bound to the contract party to whom the predicate applies. Because of the normative character of ROP predicates (that they have the semantics "will do," "will not do," or "may do," and similarly for "to be"), the propositional argument may not generally be a simple object such as in basic semantic web techniques, but may usually describe a condition that is intended to hold or not hold, or an action to be taken. Consider the following clause:

Subject to the terms and conditions set forth herein, each Lender severally agrees to make a Term A Loan in Dollars to the Parent Borrower on the Closing Date in an aggregate principal amount not exceeding its Term A Commitment.

This clause describes a requirement, which has the predicate Obligation bound to the subject Lender. The proposition describes an action that must be taken, namely, to make a loan with certain qualifying conditions. Representing propositions can be done at increasing levels of sophistication and utility. In some cases, the propositional text can be precisely delimited and extracted and inserted in the triple as a raw text string, resulting in the following:

(Lender,Obligation,to make a Term A Loan . . . )

Identifying an obligation, bounding its subject and delimiting the text snippet of the proposition, can produce significant utility. For example, one may be able to list, search for or visualize ROPs of different types constrained by who is the subject and by keywords in the proposition. Beyond this approach, extraction from the proposition defined entities (Term A Loan, Dollars, etc.) and perhaps other entities like certain curated verbs (to make) may be performed, and those may be encoded alongside the raw text in a structured form. As actions or conditions, propositions may themselves be structured as traditional SPO semantic triples (subject, predicate, object), or PO pairs (predicate, object) when the subject is redundant, and nested within the outer ROP triple, such as the following:

(Lender,Obligation,(to make,Term A Loan))

These possibilities may be denoted as follows:

$$(s,r,t) \quad (2)$$

$$(s,r,\sigma) \quad (3)$$

$$(s,r,(p,o)) \quad (4)$$

with ROP subject s, ROP predicate $r \in \{R, O, P\}$, proposition text string t, arbitrary proposition data structure σ, proposition predicate p, and proposition object o. The third option may extend beyond the second in that it makes explicit identification of the proposition predicate and object roles, which may be viewed as a further level of semantic structuring.

Triple extraction may involve imposing semantic structure on textual units. Another structure is the document structure itself: the hierarchical clause tree and references. For example, extending the example, see the following example text presented in a hierarchical structure:

Section 2.01 Commitments. Subject to the terms and conditions set forth herein, each Lender severally agrees
(a) to make a Term A Loan . . .
(b) [reserved],
(c) to make Term B USD Loans . . .
(d) to make Term B EUR Loans . . .
(e) to make . . . Revolving Loans . . . that will not result in
(i) . . . Exposure . . . exceeding . . . Commitment
(ii) . . . Exposure . . . exceeding . . . Commitment
(iii) . . . Exposure . . . exceeding . . . Sublimit
Within the foregoing limits and subject to the terms and conditions set forth herein, the Borrowers may borrow, prepay and reborrow
Revolving Loans. Amounts repaid in respect of Term Loans may not be reborrowed.

This hierarchical structure is typical of legal text, containing three sentences that run about ⅓ of a page. The first sentence is broken into a two-deep hierarchy of marked clauses containing four obligations tied to the lead phrase, and three prohibitions tied to the obligation in part (e). The final two sentences following the marked clauses contain a right and a prohibition, respectively. When sentences are "simple" like the final two in this example, they may be a basis for an appropriate textual unit, but it is also common for nonhierarchical sentences to express multiple ROPs, for example by conjunction or disjunction.

Such a document structure may, for example, be extracted and represented as a directed graph $G=(V, E)$ where each vertex $v \in V$ corresponds to a clause and each edge $e \in E$ corresponds to a parent-child relationship or to a reference between clauses. Ornamenting vertexes with annotations resulting from the corresponding clause text may provide a fully structured contract datum.

This approach (e.g., the structuring of contract information into a normative, semantically annotated form) may make it possible to build powerful visualization, search, and reasoning capabilities, which may be collectively referred to as semantic contract maps. User interface technologies communicating such representations may provide efficient mechanisms for analyzing and navigating contracts. These techniques employ the value of structuring legal information, and representing useful semantic units, such as ROPs. Embodiments may involve processing the natural language of legal text to produce a database of semantic ROP triples. This may employ natural language processing (NLP), and elements of text summarization (TS) and semantic role labeling (SRL). As described here, triple extraction is a narrow but powerful paradigm, and combined with formulations described, it can be successfully implemented using neural approaches.

As noted, contracts are often complex because they contain a vast number of interrelated assertions that exist as unstructured natural language. Each assertion may include a subject-predicate-object relation, in addition to adjunct arguments that serve to specialize and constrain parameters of the relation in various ways, such as introducing deadlines, amounts, denominations manner of action, and so on. These adjuncts can lengthen and complicate the core relation, often multiplying it several times over. The style of legal text itself can add complexity, with its characteristic flourishes that come from the tradition of legal writing rather than from day-to-day communication. Further, the number of assertions to be considered can be vast, and there can be many near duplications where, in order to enumerate a wide range of expected or possible outcomes, different assertions differ only in specialized parameters adjunct to the subject-predicate-object core. As a result, a very high cognitive load may be required to read and understand the assertions within a clause and assess its relevance to any particular question under consideration. Thus, it can be difficult for most users to assess and understand the contents of contracts effectively, and great deal of time and money may be needed to employ one or more persons (e.g., a team) to assess and understand the contents of contracts effectively.

Contract clauses often contain extensive detail that is not immediately relevant to identifying the clauses of interest for deeper examination. While contracts are written documents and so a form of communication, their purpose is to act as the exhaustive authority on the specific nature of the business relationship they govern. By their nature, contracts communicate this entirety in order to fulfill their role. In any business setting where contracts exist in large numbers and contain large numbers of assertions, there are generally two interrelated kinds of interactions that users must simultaneously engage—"search" and "understanding." In the understanding modality, one may be given a relevant clause and need to deeply read and understand its requirements precisely. In this case, the contract, despite its complexity, is a cooperative communicator. As complex as a clause may be, generally every adjunct argument and every word is vital to the understanding of the relationship. In deep reading and understanding, a high cognitive load is required and unavoidable.

In the search modality, on the other hand, one may not be attempting this deep level of understanding, at least not at first, but are simply trying to determine whether each clause from throughout the document is relevant to a given question or situation so that it may be passed along to the reading and understanding phase. In this way these two activities may require different cognitive loads—while the heavy cognitive load of reading and understanding may be irreducible and correct, the act of finding relevant information may be made to have a light cognitive load in order that search and navigation can be cooperative and efficient. One might think of these two activities akin to performing a web search: we scan the results summaries quickly, and decide based on this reduced and hopefully pertinent information which specific results warrant a click and a deeper, more effortful concentrated reading. The interplay of these modalities may be what makes web search so natural and successful. It is believed that something similar is possible for legal documents. For example, semantic annotation and user interfaces may be employed to make searching and navigating contracts a form of highly cooperative communication with legal documents.

Syntactic parsing is used in NLP to process text and assign a structure to it according to some grammatical theory of language. Generally, phrase structure parsing uses the theory of context free grammars to produce a parse tree where the leaves are words and internal nodes are nested phrases of different syntactic types (constituents) such as verb phrases and noun phrases that serve to group syntactically related words. Such a structure may be useful in itself, as when checking grammaticality or indexing phrases, but is more commonly used as an intermediate representation for further processing such as identifying particular phrases containing important information or determining a semantic relationship between words or phrases. When used this way, the parse tree may provide informative features for downstream processing. Parsing algorithms are generally learned by applying statistical machine learning to large corpora of human-parsed sentences called treebanks. Instead of computing a phrase tree, dependency parsing generally forgoes phrasal structures and instead uses a dependency grammar to compute the grammatical function between words, also arranged as a tree. Each word has a single head word linking to it, where the category of the link determines the syntactic function in the sentence relative to the head, and possibly multiple dependents for which it serves as head. Syntactic functions are categories such as nominal subject, direct object and indirect object (among many others). The two types of parses are in some sense reciprocal: where phrase structure parses make phrases explicit and derive grammatical function from the relationships between them, dependency parses make the grammatical function explicit and derive phrase structure from the relationships among grammatical functions. As such, de-pendency parses and features derived from them can be seen as closer to the predicate-argument structure we seek to extract.

Deep semantic parsing generally has a goal of processing a textual unit and producing a meaningful representation that is useful in computational manipulations. To be successful, such a representation may need to possess a number of qualities—be unambiguous and verifiable, provide linkage to external world knowledge in a database, support inference of new facts from stated premises, and be sufficiently expressive to represent the required subject matter. Whereas syntactic parsing converts a sentence to a phrase or dependency tree, deep semantic parsing using predicate logic may convert a sentence into logical formulas that embodies the meaning in some sense or domain.

One approach for deep semantic parsing utilizes a syntactic parse as an input to drive the semantic interpretation by recursively forming larger units of meaning from smaller ones compositionally. The possible space of inputs and outputs for a semantic analyzer when dealing robustly with the required level of contractual language may be enormous, and there are generally no existing training sets or semantically augmented grammars of this sort readily available in the domain of legal agreements.

Semantic role labeling, also called shallow semantic parsing, may operate on the surface level of words, for example, assigning each of them a label indicating their participatory role as one of possibly several arguments to a given predicate. A subcategorization frame gives a template for the expected arguments to be found. While attempting to extract principle actions and suppress detail, one can simplify even more using a generic subject-predicate-object frame for all predicates and attempt to learn to fill these simpler structures where each argument may take multiple words. Doing so may avoid complexities of finding many adjunct arguments that may not be needed in a summary annotation as well as disambiguating the subcategorization frame for a given predicate, both problems that can impact performance. This is, in effect, a form of SPO triple extraction that may avoid problems associated with deep semantic parsing, and at the same time the problems with syntactic parsing assuming word sequences can be processed directly SRL with generic SPO frames as described above is a form of labeled extraction. If one abandons the labeling inherent in SRL, we can view the problem as a certain extractive kind of text summarization, in which a grammatically correct subsequence of the words is constructed as a representation. This may then be further processed into SPO triples with the reasonable expectation that these simpler summary statements will be more amenable to parsing and other further processing or used directly as summary annotation.

Text summarization may be abstractive or extractive in nature. Abstractive summarization involves rephrasing or paraphrasing content with novel words and phrases, while extractive summarization attempts to select a set of words directly from the input to construct a summary. Abstractive approaches are more complicated, less successful, and can suffer from grammatical errors and repetition. As described here, in some embodiments, deep neural models are trained and employed to directly extract short, grammatically correct summaries.

Classical information extraction typically involves a well de-limited text domain and seeks to extract certain kinds of surface-level events along with associated variable arguments. Some of these systems involve shallow parsing and learning extraction patterns consisting of syntactic patterns triggered by lexical items.

These early systems typically assume detailed knowledge of the domain and relevant events under consideration for extraction. Open information extraction (OIE), on the other hand, typically does not require such a priori knowledge, and for a given text attempts to extract a set of arbitrary relations from an open-ended set along with their arguments. OIE is therefore very similar in nature to the simplified SRL task described above.

Words can have multiple meanings or senses. Bass can refer to a musical instrument or a type of fish, and plant can refer to a class of living organism, the act of fixing a seed or plant in the ground so it can grow, or a manufacturing facility. Word sense disambiguation (WSD) involves the task of classifying a word instance as it appears in context into one of its prespecified senses given by a lexicon. Thus, WSD is a generally word labeling problem. In applications the task may be invoked to classify all words throughout a text (the all-words WSD problem), or to a prespecified subset of target words (the lexical subset WSD problem). WSD is typically approached by looking at co-occurring words in the local context to provide evidence for distinguishing between the possible senses. The most common features used include the word itself and its part of speech, co-occurring words, co-occurring parts of speech, the surrounding syntactic features as provided by a parse of the text.

ROPs are typically signaled by certain trigger words, often modal verbs, that indicate possibility, necessity or agreement, and this set can be identified a priori. However, such trigger words may not be used exclusively for this purpose and given an instance of a trigger word and its local context it is necessary to determine if its use indicates the presence of an ROP or not. As described here with regard to ROP localization and classification, a lexical sample WSD task may provide a useful framework for identifying and extracting ROPs. In some embodiments, positive word instances may act as a reference point for ROP extraction.

Technology-based self-executing protocols, such as smart contracts and other programs, have seen increased use in recent years. However, some smart contracts data models and other data models used by self-executing protocols often rely on industry-specific conventions that may be difficult to generalize, use for comparison analysis, or re-use in similar contexts due to minor differences in contract details. As a result, the use of self-executing protocols has not extended into areas that are often the domain of natural-language-text documents. In contrast, contracts encoded in a natural-language-text document often rely on imprecise human interpretation systems to provide the resources and mechanisms to construct, interpret, and enforce terms in the natural-language-text document. As contract terms increase in number or a situation within which a contract was formed evolves, such reliance may lead to a lack of enforcement, ambiguity, and wasted resources spent on the re-interpretation or enforcement of contract terms. Described herein is a process and related system to construct a semantic map that permits the interpretation, analysis, and reliable re-use of terms for a self-executing protocol in a systematic and unambiguous way across a broad range of applicable fields.

The interpretability of a complex natural-language-text document may be significantly enhanced by generating appropriate data structures that satisfy the boundaries and expectations of a domain of the natural-language-text document. Some embodiments may use one or more operations described in this disclosure to generate a semantic map based on the text of a natural-language-text document. A semantic map may include a data structure comprising data model objects (i.e., "data entity") such as semantic triples or semantic doubles, where the data model objects may be nested with respect to each other or may be otherwise associated with each other. As used in this disclosure, a semantic triple may include a data model object including at least three values that codifies a statement about semantic data, where each of the three values may be associated with a different parameter identifier. While some embodiments of a semantic triple may codify a semantic statement such that a first field value stores a subject identifier, a second field value stores a predicate identifier, and a third field value stores an object identifier, other versions of a semantic triple are possible. Reference to "objects" should not be read as limiting the present techniques to object-oriented programming languages. The term, rather, references a data structure that may be implemented in object-oriented and non-object-oriented programming languages. Semantic triples may be part of larger unit data structures with more than three fields without ceasing to constitute a "semantic triple," e.g., a semantic triple embedded in a unit data structure with four fields is still a semantic triple.

Some embodiments may associate category values with the data model objects or use the data model objects as elements of conditional statements or portions of conditional statements. In some embodiments, some of the category values may represent categories of deontic logic or otherwise be mutually exclusive with respect to each other, where the properties of mutual exclusivity may be used to increase machine efficiency when processing or searching through data model objects and predicting possible outcomes. For example, some embodiments may use a semantic map stored in the form of a directed graph to predict outcomes using one or more operations described in U.S. Pat. No. 10,990,879, titled "GRAPH EXPANSION AND OUTCOME DETERMINATION FOR GRAPH-DEFINED PROGRAM STATES," which is hereby incorporated by reference in its entirety.

In some embodiments, a clause or other text section of a natural-language-text document may be associated with a category value based on a conditional statement generated from the clause, where the conditional statement may be generated from one or more data model objects that were determined from the clause. For example, some embodiments may associate a first semantic triple with the category value "right," where the category value may indicate that the semantic triple represents a right of a first entity to perform one or more operations indicated by the semantic triple. Some embodiments may indicate different types of category values with different entities. For example, the category value "right" for a first semantic triple may be associated with a first entity and not associated with a second entity in response to a determination that the semantic triple is a right of the first entity and not a right of the second entity. Furthermore, some embodiments may distinguish between different types of data model objects based on their content, where a semantic triple may include non-processed text, a proposition data structure, or another data model object, such as a semantic triple described in U.S. Provisional Patent Application No. 63/034,255, filed on Jun. 4, 2020 and titled "SEMANTIC CONTRACT MAPS," which is hereby incorporated by reference in its entirety. For example, some embodiments may generate a semantic triple in the form of an "(s, p, t)" semantic triple. As described elsewhere in this disclosure, in an "(s, p, t)" semantic triple, "s" may represent an entity associated with a category value and "p" may represent the category value selected from a set of mutually exclusive categories "["right", "obligation", "prohibition"]. Furthermore, "t" may represent an object entity, text including both a verb predicate and an object, a semantic double or second data model object that may include the verb predicate in a first field of the second data model object and the object entity in a second field of the second data model object, or the like.

In some embodiments, the category value of a semantic triple or another data model object may represent a category of a deontic logic model, where category values may be selected from a set of deontic primitive categories. As recited elsewhere in this disclosure, a category value may include a label such as "right," "obligation," or "prohibition." The category value may indicate whether a written or program-encoded behavior is one that an entity may perform, must perform to avoid a consequent outcome, or must not perform to not trigger a consequent outcome. As recited elsewhere in this disclosure, a semantic triple or other data model object may be associated with a status such as "true," "false," or "unrealized," where the status may be associated with a conditional statement that indicates one or more consequent outcomes based on the status or a change in status. The set of data model objects generated from a natural-language-text document may be collected into a directed graph, where the directed graph may be stored in various formats such as a graph database, a set of links associating records of a SQL database, or the like. The directed graph may include information associated with the set of data model objects, such as associative array of data model objects, their associated category values, their associated states, text obtained from clauses or other text sections used to generate a data model object, labels of headers or other identifiers for the text sections, timestamps indicating times when a data model object is updated, entity identifiers, or the like.

As discussed elsewhere in this disclosure, some embodiments may use one or more machine learning models to determine data model objects from natural language text, determine inferences based on the data model objects, or perform other information extraction or categorization operations. For example, some embodiments may apply natural language processing (NLP) operations to convert an existing prose document into a semantic map of a smart contract using operations similar to those described for U.S. Provisional Patent Application 63/134,872, filed on Jan. 7, 2021, titled "STRUCTURED SEMANTIC CONTRACT MAPS," which is hereby incorporated by reference in its entirety. For example, some embodiments may determine that a natural-language-text document includes a first clause that recites, "subject to the terms and conditions set forth herein, each lender severally agrees to make a term A loan in dollars to the parent borrower on the closing date in an aggregate principal amount not exceeding its term A commitment." Using one or more operations described in this disclosure, some embodiments may use a machine learning model or another natural language model to generate a semantic triple "(lender, obligation, to make a term A loan)." Some embodiments may further extract "to make" from the recited text after a determination that "to make" is a verb predicate and convert the proposition "to make a term A loan" into the predicate object pair "(to make, term A loan)." As described elsewhere in this disclosure, some embodiments may use one or more implementations of NLP methods to extract information from the text of clauses. Alternatively, or in addition, some embodiments may extract additional information from the natural language text or further segment the extracted information into additional data model objects and associate the additional information with the semantic triple.

As described elsewhere in this disclosure, some embodiments may store data model objects or other information extracted from a natural-language-text document into a directed graph, where a graph may be referred to as the same graph after the graph is manipulated. For example, if a graph is referred to as a "first graph" is modified to include an extra graph vertex and graph edge, the term "first graph" may be used to refer to the modified graph. Additionally, it should be understood that a data structure need not be labeled in program code as a graph to constitute a graph, as long as that data structure encodes the relationships between values described herein. For example, a graph may be encoded in a key-value store even if the source code does not label the key-value store as a graph. In some embodiments, graph vertices of a directed graph may represent text sections such as paragraphs, clauses, contract agreement terms or the like. Alternatively, or in addition, some embodiments may generate the graph vertices that are associated with data model objects generated from the clauses or other text sections. Additionally, graph edges may represent parent-child relationships or references between the text sections, where the graph edges may be associated with labels indicating different relationships between text sections or data model objects generated from the text sections. Some embodiments may use the directed graph as a semantic map that permits efficient navigation and visualization of information stored in a natural-language-text document.

Some embodiments may use a semantic map to generate a self-executing protocol. As used in this disclosure, a self-executing protocol may include a program executable as a script, an application, or portion of an application on a decentralized distributed computing platform, centralized computing system, or single computing device. Self-executing protocols may execute responsive to external events, which may include outputs of third-party programs, measurements provided by sensors, or human input via a user interface (UI). For example, a self-executing protocol may execute on a computing substrate that involves human intervention to operate, like turning on a computer and launching an event listener.

A self-executing protocol may be implemented in various ways. For example, some embodiments may construct, enforce, or terminate the self-executing protocol using a distributed ledger or distributed computing system. Alternatively, some embodiments may implement the self-executing protocol using a request-response system over a public or private internet protocol (IP) network. Using the methods described in this disclosure may increase the efficiency of self-executing protocol enforcement by advancing the state of complex computer programs that enforce behaviors between multiple independent entities in a fast and unambiguous way. Furthermore, implementing and using self-executing protocols with the embodiments described herein may allow for the comparison, quantification, and reuse of self-executing protocols in a way that would be inapplicable to custom-coded self-executing protocols. In some embodiments, the self-executing protocol may be stored in a distributed, tamper-evident data store. A distributed, tamper-evident data store (e.g., repositories rendering data tamper-evident with one or more tamper-evident data structures) afford desirable properties, including making it relatively easy to detect tampering with entries in the data store and making it relatively difficult to modify entries to avoid such detection. Furthermore, various self-executing protocols may be operating across one or more nodes of a computer network hosting the distributed, tamper-evident data store, reducing the susceptibility of the self-executing protocol to geographically localized attacks or anomalies.

In some embodiments, graph vertices of a directed graph generated from a natural-language-text document may be associated with (e.g., encode, identify, or otherwise represent) data model objects, such as a normative statement ("norm") of a self-executing protocol. In some embodiments, the data model object may represent a formal language statement that, as described elsewhere in this disclosure, may be paired with a set of statuses, such as a truth condition. For example, the data model object may be used as a part of a conditional statement that branches program flow or otherwise changes program state responsive to a determination that a truth condition is satisfied. For example, a graph vertex of a directed graph may include a conditional statement that includes a first semantic triple associated with a truth condition. The graph vertex may also include a second semantic triple associated with a consequent outcome that occurs in response to a determination that the truth condition is set to a status indicating satisfaction of the first conditional statement. Furthermore, it should be understood that the term "norm" is used for illustrative purposes and that this term may have different names in other references and contexts.

As described elsewhere in this disclosure, text sections may be associated with a collection of one or more data model objects representing a norm, where the collection of data model objects may include conditions, outcomes of condition satisfaction or failure, indications of a satisfaction status, or the like. In some embodiments, satisfying a condition of a conditional statement may change a satisfaction status of the conditional statement and lead to the creation or activation of a consequent norm of the conditional statement based on the actions performed by the system when executing the outcome subroutines corresponding to the satisfied condition. In some embodiments, an active conditional statement may be triggered when a determination is made that an event satisfies a condition of the conditional statement, where triggering an active conditional statement may cause a consequent outcome of the active conditional statement to occur. For example, some embodiments may trigger a conditional statement after determining that an event indicates that an action stored in a semantic triple has been performed, where the semantic triple is used as an associated condition of the conditional statement. Alternatively, some types of conditional statements may be triggered when an associated condition of the conditional statement is not satisfied before a condition expiration threshold is satisfied.

As used in this disclosure, an active conditional statement is a conditional statement having associated conditions that, after having been satisfied by an event, cause the occurrence of one or more consequent outcomes of the active conditional statement. In contrast, an inactive conditional statement is not updated even if its corresponding conditions are satisfied. For example, a conditional statement may include a first condition "if generator1.power_output<threshold" that is generated from the semantic triple ("generator1", "obligation", "to provide power power_output greater than threshold") using one or more operations described in U.S. Provisional Patent Application No. 63/191,724 filed on May 21, 2021, titled "SEMANTIC CONTRACT MAPPING WITH DEEP LEARNING," which is hereby incorporated by reference in its entirety. If the conditional statement is indicated as an active conditional statement, a determination that the criterion "generator1.power_output<threshold" may trigger an encoded consequent outcome, where the consequent outcome may also be generated from a semantic triple. In contrast, if the conditional statement is indicated as an inactive conditional statement, the encoded consequent outcome may remain untriggered even if a determination is made that the criterion "generator1.power_output<threshold" is not satisfied. In some embodiments, a conditional statement may remain in an inactive state because a parent conditional statement of the inactive conditional statement is not satisfied or may be rendered inactive due to other changes in the state of a self-executing protocol.

Some embodiments may store self-executing protocol data in one or more types of formats. For example, while some embodiments may temporarily store a directed graph in non-persistent storage, some embodiments may store the directed graph on a persistent storage. In some embodiments, various other types of information such as conditional statement statuses (e.g., "triggered," "failed," "satisfied," etc.), deontic categories (e.g., "rights," "obligation," "prohibition," etc.), or other information may be included in or otherwise associated with some or all of the vertices of the directed graph. Furthermore, some embodiments may generate visual display representing of the program state data to show the directed graph and its associated statuses, categories, or other information. For example, as further described below, some embodiments may display the directed graph as a set of UI elements structured as a hierarchy tree in a web application.

A self-executing protocol may be generated from a set of data model objects that incorporate elements of a deontic logic model, where an event may trigger an active conditional statement of the self-executing protocol by satisfying a condition of the conditional statement. A conditional statement of a self-executing protocol may include values stored in the set of data model objects. For example, a condition of a conditional statement may be generated based on a semantic triple that indicates that a first entity has an obligation to perform an action associated with the natural language text header "header1." Some embodiments may then generate a condition based on the action associated with the "header1" in response to a determination that the semantic triple includes a field value that indicates that the action is an obligation. Some embodiments may also perform operations to determine future outcome states of a self-executing protocol, such as a possible future change in one or more state values. Some embodiments may perform operations to determine a future outcome state using operations described in U.S. patent application Ser. No. 16/893,299, filed Jun. 4, 2020, titled "GRAPH EXPANSION AND OUTCOME DETERMINATION FOR GRAPH-DEFINED PROGRAM STATES" (now U.S. Pat. No. 10,990,879), which is hereby incorporated by reference in its entirety.

None of the preceding should be taken to suggest that any technique is disclaimed or that the approaches described herein may not be used in conjunction with other approaches having these or other described disadvantages, for instance, some embodiments may use a custom-written smart-contract that includes one or more of the norms, data structures, or graphs described herein. Alternatively, or in addition, some embodiments may be implemented on a centralized server without storing self-executing protocol state data on a distributed computing system, such as a decentralized computing system. Further, it should be emphasized that the data structures, concepts, and instructions described herein may bear labels different from those applied here in program code, e.g., a data structure need not be labeled as a "node" or a "graph" in program code to qualify as such, provided that the essential characteristics of such items are embodied.

FIG. 1 is a schematic diagram of a first computing environment in which a self-executing protocol may be generated from a natural-language-text document, in accordance with one or more embodiments of the present techniques. As shown in FIG. 1, a computing environment 100 may include a computer system 102, a first entity system 104, a second entity system 106, or other computer systems. The computer system 102 may include a processor 112, a local memory 116, or other computer components. Each of the first entity system 104 or second entity system 106 may include any type of mobile computing device, fixed computing device, or other electronic device. In some embodiments, the first entity system 104 may perform transactions with the second entity system 106 by sending messages via the network 150 to the computer system 102. Parameters, variables, or other values used to perform one or more operations described in this disclosure may be retrieved or stored in the local memory 116. Alternatively, or in addition, parameters, variables, or other values used or provided by the computer system 102, entity systems 104-106, or other systems may be sent to or retrieved from the remote data storage 144 via the network 150, where the remote data storage 144 may include the memory of a distributed computing system.

In some embodiments, the computer system 102 may execute a set of applications with a processor 112 to perform one or more operations described in this disclosure. As described elsewhere in this disclosure, the computer system 102 may obtain a natural-language-text document and segment the natural-language-text document into text sections. The computer system 102 may then determine a set of learned representations (e.g., embedding vectors, categories, etc.) corresponding to the words, lexical items, or other n-grams of the text sections. For example, the computer system 102 may use a set of neural network layers or other components of a trained machine learning model to generate embedding vectors based on the natural language text. In some embodiments, the computer system 102 may include or be part of a decentralized computing platform capable of persisting state to a decentralized tamper-evident data store. Furthermore, in some embodiments, the decentralized computing platform may be capable of executing various programs, such as smart contracts, on the computing platform in a decentralized, verifiable manner. For example, the computing platform may be hosted on a peer-to-peer data-sharing network, where each peer node of a set of peer nodes of the peer-to-peer data-sharing network may perform the same computations. In some embodiments, a consensus may be reached regarding results of the computation. In some embodiments, various consensus algorithms (e.g., Raft, Paxos, Helix, Hotstuff, Practical Byzantine Fault Tolerance, Honey Badger Byzantine Fault Tolerance, or the like) may be implemented to determine states or computation results of the various programs executed on the decentralized computing platform without requiring that any one computing device be a trusted device (e.g., require an assumption that the computing device's computation results are correct). The one or more consensus algorithms used may be selected or altered to impede an entity from modifying, corrupting, or otherwise altering results of the computation by peer nodes of the peer-to-peer data sharing network not under the entity's control. Examples of a decentralized tamper-evident data store may include Interplanetary File System, Blockstack, Swarm, or the like. Examples of a decentralized computing platform may include Hyperledger (e.g., Sawtooth, Fabric, or Iroha, or the like), Stellar, Ethereum, EOS, Bitcoin, Corda, Libra, NEO, or Openchain.

The computer system 102 may generate a set of data model objects corresponding to propositions detected with a natural language model based on a set of embedding vectors or text used to generate the set of embedding vectors. In some embodiments, a data model object includes a category value that may be selected from a set of categories of a deontic logic model. Some embodiments may use a recurrent learning model or an attention-based machine learning model to categorize the deontic logic model. In some embodiments, the use of a neural network may be combined with the use of a symbolic artificial intelligence (AI) system to increase categorization accuracy or perform downstream analysis operations. In addition, the computer system 102 may determine associations between the data model objects based on shared parameters between the data model objects or shared parameters between text sections used to generate the data model objects. Furthermore, the computer system 102 may determine whether one or more of the entities identified in a data model object corresponds with an entity associated with a computer system. For example, some embodiments may associate an identifier of the first entity with the first entity system 104 such that updates to a data model object storing the first entity identifier causes a notification message to be sent to the first entity system 104. In some embodiments, the notification may be sent using operations described in U.S. patent application Ser. No. 17/015,069, filed Sep. 7, 2020, titled "GRAPH-BASED PROGRAM STATE NOTIFICATION," which is hereby incorporated by reference in its entirety.

The computer system 102 may store a semantic map, such as a semantic map stored in the form of a graph database, in local memory 116. The semantic map may include the category values and the association between the data model objects. Alternatively, or in addition, some embodiments may store the semantic map in a remote data storage 144, where the remote data storage 144 may include a decentralized tamper-evident data store. Furthermore, the computer system 102 may then cause the presentation of visualizations of the data model objects by sending values or program instructions to the first entity system 104 or the second entity system 106. The visualization may include, for example, shapes that represent the data model objects or associations between the data model objects.

Figure 2:
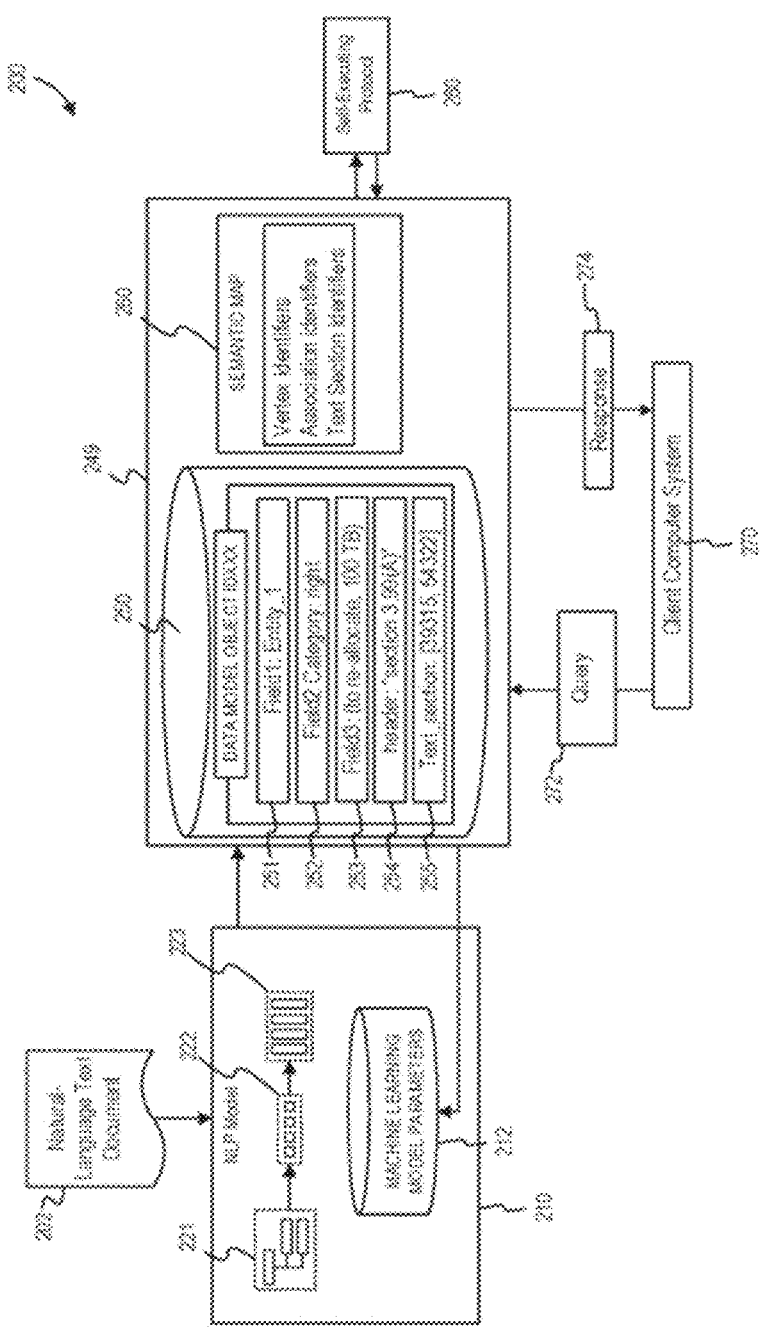
FIG. 2 depicts an example system is a logical architecture block diagram illustrating a computing environment in which a natural-language-text document may be used to generate a semantic map, in accordance with one or more embodiments of the present techniques.

FIG. 2 depicts an example system is a logical architecture block diagram illustrating a computing environment in which a natural-language-text document may be used to generate a semantic map, in accordance with one or more embodiments of the present techniques. The diagram 200 presents an NLP model 210, where the NLP model 210 may be a machine learning model that uses the machine learning model parameters 212. The natural language text document 202 may be process by the NLP model 210 to populate records, values, or other data of a data model 249 after using a finite state matching algorithm to generate structured document 221 based on the natural language text document 202. The NLP model 210 may, for each respective text section 222 of the text sections of the structured document 221, generate a respective sequence of embedding vectors 223 using the machine learning model parameters 212. Some embodiments may then perform one or more operations to determine values of the data model 249 based on the respective sequence of embedding vectors 223.

In some embodiments, the data model 249 includes a set of data model objects 250. Records of the set of data model objects 250 may include a first field 251, a second field 252, and a third field 253. Some embodiments may populate the fields of a record of the set of data model objects 250 with entity identifiers, category values indicating a deontic model, text from a text section such as a clause used to generate the data model object, or the like. In some embodiments, a record of the data model object may include fields for additional values, such as a fourth field 254 indicating a text section title or a fifth field 255 that may be populated with a text section boundary identifier, such as a set of text positions indicating the boundaries of the text section. A data model object of the set of data model objects 250 may include various other fields, indications of an event, indications of other data model objects representing text sections that are associated with the current data model object, relationships between the data model objects, or the like. Furthermore, a field may be said to be "populated" with an n-gram in a variety of ways, including reciting that n-gram in the field, having a pointer to the n-gram in the field, and specifying a semantic referent of the n-gram in the field (e.g., a global unique identifier, a canonical identifier, or a vector in an embedding space representing the referent). An "n-gram" may be "received" with a similarly broad set of approaches, e.g., the tokens constituting the n-gram need not be received for that n-gram to be "received" if some other value specifying the referent of the n-gram is received.

In some embodiments, the data model 249 may include a semantic map 260 that may be stored in the form of a directed graph. The semantic map 260 may include graph vertex identifiers, graph edge identifiers representing associations between different data model objects, text section identifiers that identify one or more text sections associated with graph vertices of the semantic map 260, or the like. In some embodiments, a graph vertex of the semantic map 260 may be mapped to a specific data model object. For example, a graph vertex of the semantic map 260 may be mapped to a semantic triple recorded in the set of data model objects 250. Alternatively, or in addition, in some embodiments, the semantic map 260 may include graph vertices that obtain data from multiple data model objects recorded in the set of data model objects 250. For example, a graph vertex of the semantic map 260 may include data from a first semantic triple and data from a second semantic triple, where the data from the first semantic triple indicates a condition of a conditional statement of the graph vertex, and where the data from the second semantic triple indicates an outcome of the conditional statement. Some embodiments may then generate a self-executing protocol 280 based on the semantic map 260. The self-executing protocol 280 may use sensor measurements, messages sent from other computer systems, or interface-entered values to perform one or more actions based on a determination that one or more corresponding conditional statements of the self-executing protocol 280 have been triggered.

In some embodiments, a client computer system 270 may send a query 272 to the data model 249, where the query 272 may include category values, entity identifiers, or other values usable to perform a search. In response, some embodiments may search through the set of data model objects 250, traverse a graph database of the semantic map 260, or search through other data of the data model 249. Some embodiments may present a search result of the query 272 in a response 274, where the response 274 may be presented in the form of a visualization, search summary, text section excerpts, or the like. Various other querying operations may be performed, such as operations described in U.S. patent application Ser. No. 17/015,028, filed Sep. 7, 2020, titled "QUERYING GRAPH-BASED MODELS," which is hereby incorporated by reference in its entirety.

Figure 3A:
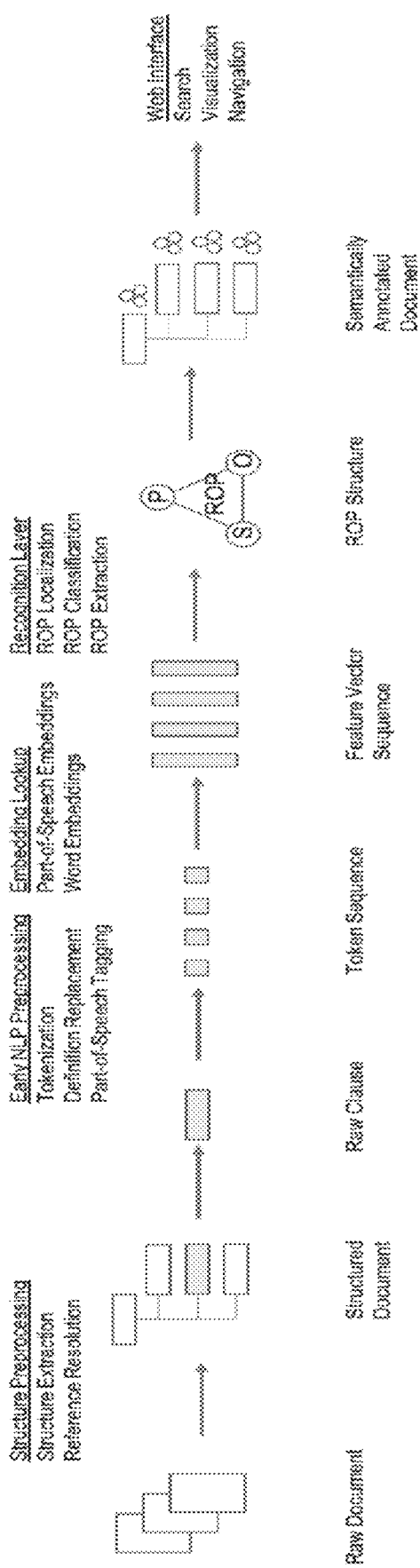
FIG. 3A illustrates a flow diagram of document processing stages for generating a semantic contract map in accordance with one or more embodiments.

FIG. 3A illustrates a flow diagram of document processing stages for generating a semantic contract map in accordance with one or more embodiments. As illustrated, in a structure preprocessing stage, a cascade of finite state matching algorithms may be applied to a raw document (e.g., a natural language document) to extract a hierarchical structure of the document and resolve references. In some embodiments, textual units correspond to unique branches of a corresponding document tree. The text of each branch may, for example, be treated as a contextual unit and passed forward to an early NLP preprocessing stage that converts the raw text (e.g., raw clauses) into a part-of-speech tagged token sequence where contract definitions have been replaced with lexical equivalents.

Following this preprocessing, a two-step process may be employed to first localize, and then extract, the ROPs. In each phase, an embedding layer may replace word tokens and part-of-speech tags with high-dimensional representations that are processed by a convolutional or bidirectional recurrent neural model to produce a neural representation of the text sequence. These part-of-speech embeddings and word embeddings may represent the primitive system features. Both may be learned at network training time, along with the network parameters, or part-of-speech embeddings may be learned and pretrained word embeddings used.

In some embodiments, in the neural localization phase, trigger words are identified that syntactically co-occur with an ROP. Once identified, these trigger words are used as a reference signal by a second neural model over the embeddings that employs structured prediction to extract the ROP, either as a subject-predicate-object (SPO) template structure or as a short clause (e.g., determined using lattice decoding), and annotate the structured document. A graphical user interface (GUI), such as a web interface, may provide for visual presentation of succinct, interactive maps of ROP summaries (e.g., including how they inherit from each other hierarchically or by reference), which can provide visual and interactive search and navigation facility using the annotated document. In the following sections, we discuss the clause unwinding, neural representation, localization and extraction steps in detail.

Contract text is often organized as a hierarchy of nested clauses, where, for example, sub-clauses extend and specialize their parent text. This can occur several levels deep. Each full path through this tree may be a complete and coherent textual unit. In order to apply machine learning methods, such text may need to be unwound (or "flattened") to produce a list of textual units that can be considered independently for inference.

This unwinding operation can involve techniques that enable context free grammars to be used to generate the structure of a clause tree. Context free grammars may have production rules of the form:

S→s where S is a nonterminal and s can be any string of terminals and nonterminals. That is, the nonterminal symbol S may be replaced regardless of what may surround it in the input string. Repeated application of the rules may generate an instance string drawn from the context free language defined by the grammar. Consider a start symbol $(\Lambda, A_1)$ and the following production rules:

$$\Lambda \rightarrow \gamma(\Lambda, A_1)$$

$$A_i \rightarrow c + \alpha_i(\Lambda, A_1) + A_{i+1} \quad (5)$$

At any current endpoint of the tree, the first rule extends that clause by one non-clause symbol. The nonterminals in parentheses indicate that either rule may be applied. The second rule concludes the current derivation (c), but also appends two new derivations onto that point indicated by addition. The first new branch appends the appropriate clause marker $\alpha_i$ and new nonterminals allowing continued extension and creation of deeper clauses. The second derivation places a new nonterminal here as a placeholder for the next ordered clause at this level so this point is remembered, and further derivations may be added here as necessary. Unlike traditional grammars that operate over a single string, these modifications may allow an arbitrary tree to be grown with the appropriate clause markers appearing at each branch point, as in the contract text.

Since context free languages are recognized by pushdown automata, this suggests that transduce (label) and ultimately unwind clauses can be recognized using this mechanism. Considering setting of clause markers as follows:

$$A_l = \{a, b, \ldots, z, aa, bb, \ldots, zz\}$$

$$A_u = \{A, B, \ldots, Z, AA, BB, \ldots, ZZ\}$$

$$A_r = \{i, ii, \ldots, xx\}$$

$$A_n = \{1, 2, \ldots, 20\}$$

$$A = A_l \cup A_u \cup A_r \cup A_n \quad (6)$$

where $\alpha \in A$ is an arbitrary marker element where we maintain the ordering information so that if $\alpha_1 = a$ or i then $\alpha_2 = b$ or ii and so on, and let $\gamma$ be an arbitrary non-marker input symbol. A pushdown automaton is a state machine equipped with a stack. At each timepoint, one may read the input, pop from and push to the stack, and change states. The definition employs a 7-tuple, and the following is a suitable example of one for this problem:

$(Q, \Sigma, \Gamma, \delta, q0, Z, F)$ pushdown automaton $Q = r \cup A$ set of states $\Sigma \gamma \cup A$ input alphabet $\Gamma = A$ stack alphabet $\delta = \delta(p, a, b, q, c)$ transition relation $q0 = r$ start state $Z = S$ start stack symbol $F = r$ accept state $\quad (7)$ where $\delta(p, a, b, q, c)$ transition relation $p$ input state $a$ input symbol read $b$ pop stack symbol $q$ output state $c$ push stack symbol $\quad (8)$ The space of possible states includes r, for read state, and a separate state with the same behavior for all symbols in the marker vocabulary A. This definition of state allows one to remember the marker identity while working with the stack to resolve it. The transition function defines the set of allowable actions.

In such an embodiment, the machine may take the following at each timestep:

$1\delta(r, \alpha_i, \alpha_i, c)$ read marker, move to state $a$, $2\delta(\alpha_1, c, c, r, \alpha_1)$ push start marker, move to state $r$ $3\delta(\alpha_i, c, \alpha = \alpha_i - r, \alpha_i)$ replace matching marker, move to state $r$ $4\delta(\alpha_i, c, \alpha I = \alpha_{i+1}, \alpha_i, c)$ pop non-matching symbol $5\delta(r, \gamma, c, r, c)$ read non-marker symbol $6\delta(r, \emptyset, \alpha_i \geq 2, r, c)$ end of input, pop marker with index $i \geq 2$ $\quad (9)$ The acceptance criteria are (a) to be in the read state r, (b) to have exhausted all available input, and (c) to reduce the stack to the start symbol S. In some embodiments, if the machine reaches a state other than this when no transitions remain available, the input is rejected as invalid. A state transition diagram for this machine is shown in FIG. 3B.

Figure 3B:
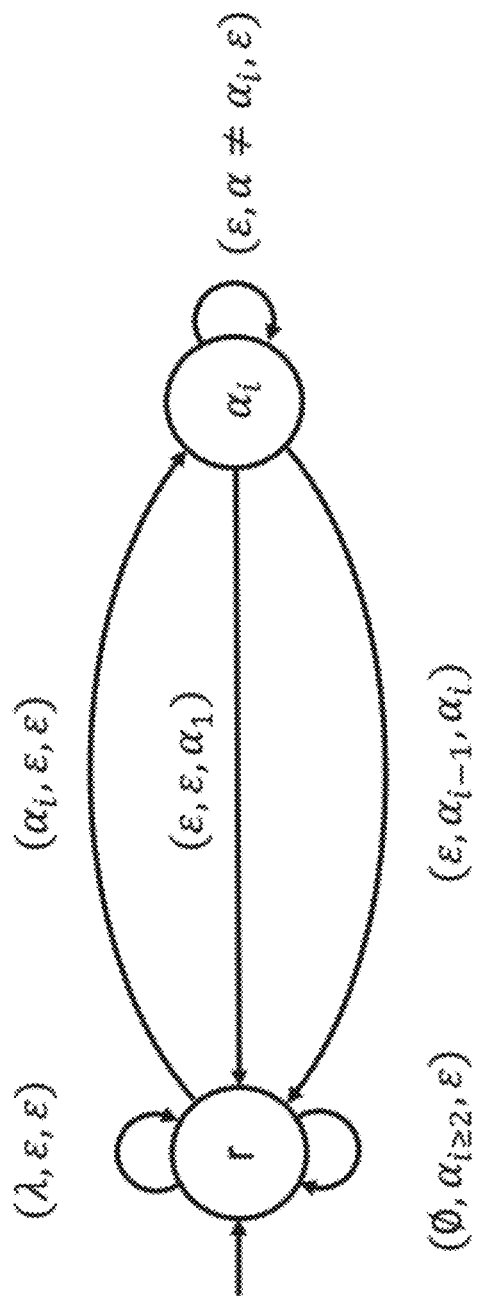
FIG. 3B illustrates a state transition diagram for clause unwinding pushdown automaton in accordance with one or more embodiments.

FIG. 3B illustrates a state transition diagram for clause unwinding pushdown automaton in accordance with one or more embodiments. In the illustrated embodiment, each state transition is labeled with corresponding (a, b, c) values from the transition relation ($\delta$).

To unwind clauses, the machine may be used as a transducer as well as an acceptor, where the output label written to each input symbol is the stack contents following transitions 2, 3 and 5. In this way each input symbol may be tagged with the identity of the clause branch it is found on. Once a text is transduced this way one linear pass can be made over the input sequence labels $l_i$, as outlined in the following:

Initialize set $L \leftarrow \{\ \}$

For each label $l_i$ $i = 1 \ldots n$ $L \leftarrow L + l_i \ l_i \notin L$ $L \leftarrow L - l_i' \ l_i' \in L, \ l_i' = \text{prefix}(l_i), \quad (10)$ After this pass, the set L will contain the labels for each unique leaf which correspond to the text units needed. To read them out, for each leaf the input sequence can be extracted where each label corresponds to that leaf or one of its prefixes. The result is an unwound list of text units corresponding to the unique paths through the clauses. For example, the text units corresponding to clauses (a) and (e)(iii) of the example given in the first section are:

Subject to the terms and conditions set forth herein, each Lender severally agrees (a) to make a Term A Loan in Dollars to the Parent Borrower on the Closing Date in an aggregate principal amount not exceeding its Term A Commitment, Subject to the terms and conditions set forth herein, each Lender severally agrees (e) to make USD/Multicurrency Revolving Loans in Dollars or Alternative Currencies to the Parent Borrower and any Additional Borrowers, from time to time during the Revolving Availability Period in an aggregate principal amount that will not result in (iii) the Dollar Equivalent of the aggregate Multicurrency Revolving Exposure exceeding the Multicurrency Revolving Sublimit.

Notably, these units share introductory text from the beginning of the paragraph, and this common text contains the subject Lender and the trigger agrees that participate in two distinct ROPs in the two units shown.

ROP extraction may employ a two-phase process where each phase is a particular classification or prediction task acting on the text sequence (e.g., as described in more detail below). In both cases, it may be beneficial to transform the input token sequence into an intermediate representation optimized for these tasks. In some embodiments, deep neural architectures are employed to transform the input sequence into such a representation. This strategy may avoid complex and unreliable preprocessing such as syntactic parsing, and replace certain features (e.g., suboptimal, hand-crafted features) with a learned representation that maximizes performance in a data-driven manner. In similar problems like semantic role labeling, these architectural elements may be employed to avoid a syntactic parse of the text.

In some embodiments, the input to the model is the part-of-speech tagged token sequence provided by NLP preprocessing, defined as follows:

$$S=(w_1,t_1) \ldots (w_n,t_n) \tag{11}$$

where $w_j$ and $t_j$ are one-hot vectors representing words and corresponding tags. This is transformed into a distributed representation using word and tag embedding matrices U and V in accordance with the following:

$$e = e_1 \ldots e_n \tag{12}$$

$$e_j = \begin{bmatrix} u_j \\ v_j \end{bmatrix}$$

$$u_j = Uw_j \tag{13}$$

$$v_j = Vt_j$$

The embedding sequence may be taken as the input to the bottom layer of a deep convolutional or bidirectional recurrent neural network. Each layer i of these networks may processes information from the previous layer or input sequence to compute a hidden state sequence $h_{ij}$. In the case of convolutional networks, a linear combination of inputs in a window of size m centered on j with weights given by the convolution parameters may produce a hidden state at each word position in accordance with the following:

$$h_{ij} = c(A_i * x_{i-1} + b_i)_j \tag{14}$$

$$= c\left(\sum_{k=-(m-1)/2}^{(m-1)/2} A_{ik} x_{i-1,j+k} + b_i\right)$$

$$x_{ij} = \begin{cases} e_j & i = 1 \\ h_{i-1,j} & i \geq 2 \end{cases}$$

with convolution matrices $A_{1k} \sim d_h \times d_e$, $A_{i>1k} \sim d_h \times d_h$, biases $b_i \sim d_h \times 1$ and nonlinear activation c. In the recurrent case, the forward and backward recurrence relations may process inputs and adjacent states to produce a hidden state at each word position in accordance with the following:

$$h_{ij} = \begin{bmatrix} h_{ij}^f \\ h_{ij}^b \end{bmatrix} \tag{15}$$

$$h_{ij}^f = f_{ij}^f(x_{ij}, h_{ij-1}^f)$$

$$h_{ij}^b = f_{ij}^b(x_{ij}, h_{ij+1}^b)$$

$$x_{ij} = \begin{cases} e_j & i = 1 \\ h_{i-1,j} & i \geq 2 \end{cases}$$

This recurrent architecture may be bidirectional, so data is processed in both a forward and backward linear order, which may allow the state to encode future and past context simultaneously. Elementary processing units may come from the gated family: long short term memory (LSTM) or gated recurrent units (GRU). These designs may include internal memory gates that overcome problems related to diminishing training signal over long sequences and allow representation of important long-range dependencies.

Overall and in either case, the network may transform the embedding sequence into a corresponding sequence of hidden states at the top layer in accordance with the following:

$$h_1 \ldots h_n = f(e_1 \ldots e_n) \tag{16}$$

In some embodiments, this representation is used for localization, classification and extraction, as described herein.

In some embodiments, the first step in ROP extraction includes localization. This step, may be employed, for example, to predict certain trigger words that express necessity, possibility or agreement (e.g., "may," "shall," "will," "agrees," etc.) specifically and only when the co-occur syntactically with and govern an instance of ROP language. Let the set T contain a curated set of such triggers. For each trigger candidate word in the corpus $w_i \in T$ a binary label $\pi_i \in \{-1, -1, +1\}$ indicating this class membership may be defined. of the localization process may be employed, for example, to process the local context $y_i$ at $w_i$ to compute a real valued score $g(y_i)$ and make a prediction in accordance with the following:

$$\pi_i^* = +1 \quad g(y_i) \geq 0$$

$$\pi_i^* = -1 \quad g(y_i) < 0 \tag{17}$$

such that $\pi^* = \pi_i$. The location of positive trigger words may provide a reference signal for ROP extraction as discussed herein.

In some instances, localization involves a word sense disambiguation with the narrow, two-sense distinction "is an ROP trigger" vs. "is not an ROP trigger." A survey of labeled data may suggest that when candidate triggers occur in contexts other than ROPs, the syntax signals this in idiomatic ways that differ from the positive cases. Consider the following negative examples:

... as the borrower may request in accordance herewith
... in which the lender will participate
... such other information as shall be necessary to prepare credit
... party agrees that in the absence of gross negligence ...

In these examples, the trigger participates in subordinate clauses modifying another concept or introducing supplementary information. N gram patterns such as as X may Y, in which X will Y, X as shall Y, X agrees that in Y may be of interest in making this sense distinction. Another common case occurs when there are multiple triggers, such as the following:

the lender agrees that such notice shall be irrevocable

The pattern X agrees that Y shall Z where agrees is negative and shall is positive. There may be a relatively large space of potentially useful N gram patterns, each with different levels of discriminatory value and interpattern correlations. Some patterns may be more obvious to a human reader, while many others may be less so. While an attempt to enumerate such features manually may be futile, machine learning algorithms may excel, and so these observations highlight the use of convolutional or recurrent network representations well suited to recognize such N grams.

To construct a context for making this classification, the neural representation of the candidate trigger $h_i$ may be combined with regional features that capture the prominent relevant patterns in each of four context regions in accordance with the following:

$$y_i = \begin{bmatrix} h_i \\ \phi_{i,-1} \\ \phi_{i,-2} \\ \phi_{i,1} \\ \phi_{i,2} \end{bmatrix} \quad (18)$$

$\varphi_{il}$ may be the elementwise maximum vector for the max-pooled context region l, as defined in the following:

$$\varphi il = \max(hi+k-(m-1)/2 \ldots hi+k+(m-1)/2) \quad (19)$$

with region width m, stride s and offset k, as defined in the following:

$$k = \text{sgn}(l)\left[\left(\frac{m-1}{2}\right) + 1 + (|l| - 1)s\right] \quad (20)$$

The context regions may capture N gram activations in near left context (l=−1), far left (l=−2), near right context (l=1) and far right (l=2).

The score may now be computed with a feedforward multilayer perceptron, in accordance with the following:

$$g(y_i) = A_2 c(A_1 y_i + b_1) + b_2 \quad (21)$$

where $A_1 \sim d_h \times 5_{di}$ transforms the context vector $y_i$ into a hidden layer, $b_i \sim d_h \times 1$ is the hidden layer bias, $A_2 \sim 1 \times d_h$ transforms the hidden layer to a scalar output, $b_2 \sim$ scalar is the output bias, and c is a nonlinear activation function. An example of this arrangement is illustrated in FIG. 3C.

Figure 3C:
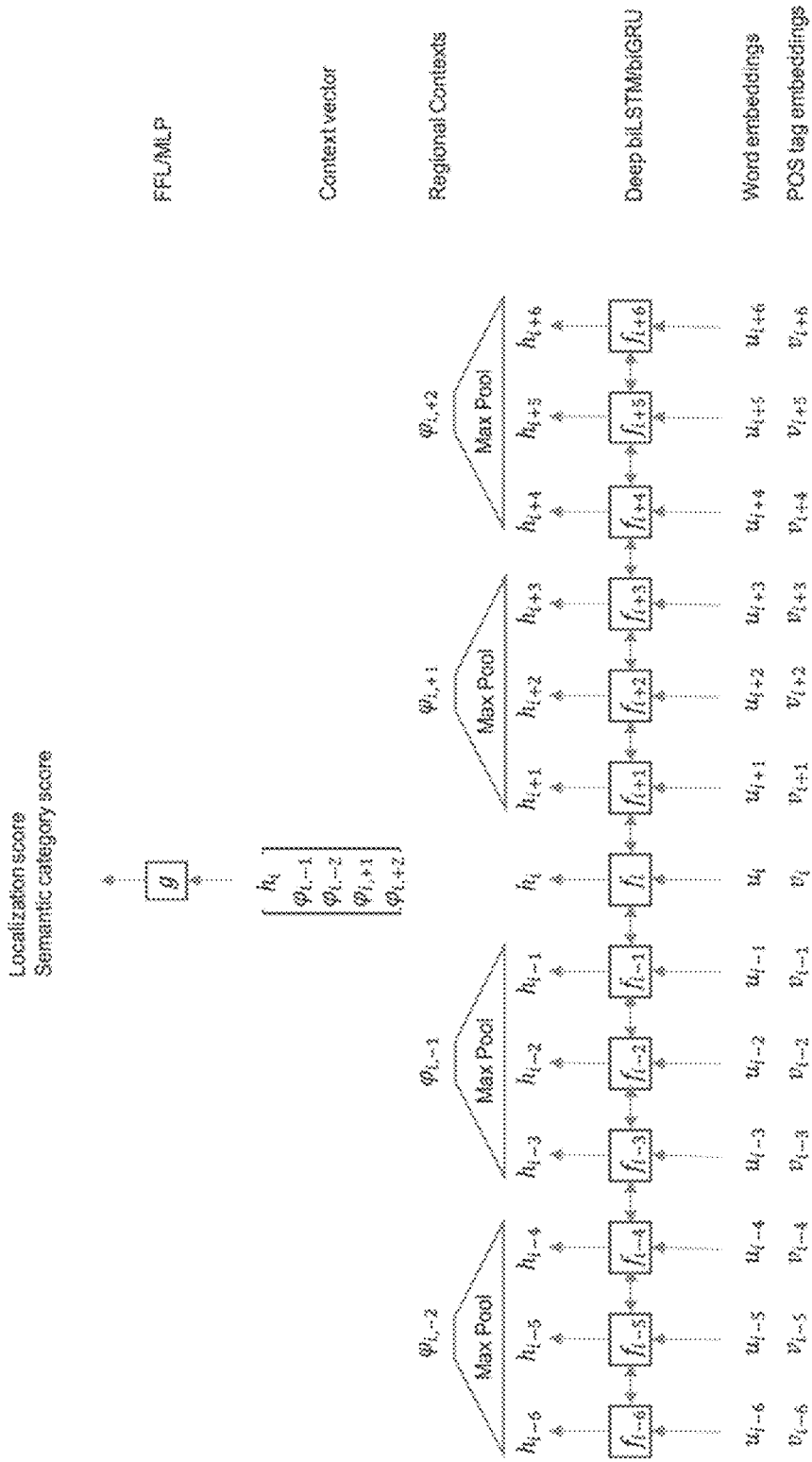
FIG. 3C illustrates a view of a neural model for semantic triple localization and classification for generating a semantic contract map in accordance with one or more embodiments.

FIG. 3C illustrates a view of a neural model for semantic triple localization and classification for generating a semantic contract map in accordance with one or more embodiments. In the illustrated embodiment, a gated bidirectional recurrent network computes a hidden representation which is then max-pooled into four context regions and combined with the trigger word representation into a context vector. A multilayer perceptron converts the context vector into a scalar localization score or K-dimensional semantic category score.

Training the network may include numerically optimizing the weighted margin hinge loss over all candidate triggers. The margin hinge loss component at word i may be defined as follows:

$$H(\pi_i, y_i) = c_i \max(0, \delta - \pi_i g(y_i)) \quad (22)$$

$$c_i = \begin{cases} c_{-1} & \pi_i = -1 \\ c_{+1} & \pi_i = +1 \end{cases}$$

where $c_i$ is the weight, or cost, associated with each type of error. The most common trigger words can be severely imbalanced, for example, with over 90% of candidates true positives and less than 10% negative. In such cases introducing costs can help prevent against learning a naive classifier and more aggressively suppress negatives. The total objective over all candidate triggers may be defined as follows:

$$J(\theta) = \sum_{y_i | w_i \in T} H(\pi_i, y_i) = \sum_{y_i | w_i \in T} c_i \max(0, \delta - \pi_i g(y_i)) \quad (23)$$

with system parameter vector θ, and gradient defined as follows:

$$\nabla J(\theta) = \sum_{y_i | w_i \in T} \begin{cases} -c_i \pi_i \nabla g(y_i) & \pi_i g(y_i) < \delta \\ 0 & \pi_i g(y_i) \geq \delta \end{cases} \quad (24)$$

ROP classification may be employed to categorize an ROP localized at a positive trigger word according to the category of predicate as described herein, including right, obligation and prohibition. Additional semantic categories such as event, condition, non-obligation, failure, and possibly others, may also be useful. The set of categories, their properties and relationships between them may, for example, be drawn from an empirical survey of contracts, and organized as an ontology of legal semantics. Let $\pi_i \in \{1 \ldots K\}$ be the semantic category label for $\omega_i \in T$. Following the same intuition regarding linguistic signals as outlined above, the same neural sequence architecture and context definition may be used with an, adjustment to the feedforward layer so that $A_2 \sim d_K \times d_h$ and $b_2 \sim d_K \times 1$ to compute a K-dimensional output score, defined as follows:

$$g(y_i) = A_2 c(A_1 y_i + b_1) + b_2 \in R^K \quad (25)$$

The index of the maximizing element gives the classification rule, defined as follows:

$$\pi^* = \text{ind}_i \max g(y_i) \in \{1 \ldots K\} \quad (26)$$

The corresponding 1-of-K categorical margin hinge loss, objective and gradient may be defined as follows:

$$H(\pi_i, y_i) = \max\left(0, \delta + \max_{\pi \neq \pi_i} g(y_i) - g(y_i)_{\pi_i}\right) \quad (27)$$

$$J(\theta) = \sum_{y_i | w_i \in T} H(\pi_i, y_i) = \sum_{y_i | w_i \in T} \max\left(0, \delta + \max_{\pi \neq \pi_i} g(y_i) - g(y_i)_{\pi_i}\right) \quad (28)$$

$$J(\theta) = \sum_{y_i | w_i \in T} H(\pi_i, y_i) = \sum_{y_i | w_i \in T} \max\left(0, \delta + \max_{\pi \neq \pi_i} g(y_i) - g(y_i)_{\pi_i}\right) \quad (29)$$

In some embodiments, once ROPs are localized and classified, the second processing stage extracts each ROP by jointly identifying a small set of words that together defines the core action or condition of the ROP. Instead of a sequence of independent decisions, this may be a problem of inferring a single combinatorial structure jointly out of many possibilities, and may be formulated as a structured prediction problem. Formalizing this extraction task may revolve around different ways of defining the type of structure to be predicted. Two options include: a prespecified linguistic template and a short trigram clause, corresponding to two of the options described above.

In some embodiments, an ROP is specified as a tuple composed of the words useful to describe the essence of the ROP. For each trigger word identified in the localization stage, let that trigger be identified with hidden state $h_T$ corresponding to its position at the top of the network. A minimal template model signaled by $h_T$ is defined as follows:

$$\pi = (S_1, T, S_2, P, I, O) \qquad (30)$$

This may be referred to as a subject-predicate-object style template, where the elements are defined as follows: $S_1$ is the primary subject, occurring left of the trigger T, $S_2$ is the secondary subject, occurring right of the trigger, P is the predicate, I is a preposition and O is the object. In some embodiments, the trigger and predicate are required elements. In such an embodiment, the other elements may be optional and may occur depending on the ROP and the particular grammatical constructions used to express it.

In some embodiments, a scalar output score is computed with a feedforward layer for a candidate vector y but is not transformed into a probability in accordance with the following:

$$g(y) = A_2 c(A_1 y + b_1) + b_2 \qquad (31)$$

$$y = \begin{bmatrix} h_{S1} \\ h_T \\ h_{S2} \\ h_P \\ h_I \\ h_O \end{bmatrix} \qquad (32)$$

where, $h_T$ is a fixed reference while the other components can vary over the positions of the input sequence recorded in h (ind y and ind max y give the index of elements of h and its maximizers). The ROP prediction may be the tuple that maximizes the output score, defined as follows:

$$y^* = \underset{y}{\operatorname{argmax}}\, g(y) \qquad (33)$$

$$\pi^* = \operatorname{ind} \underset{y}{\max}\, g(y)$$

Figure 3D:
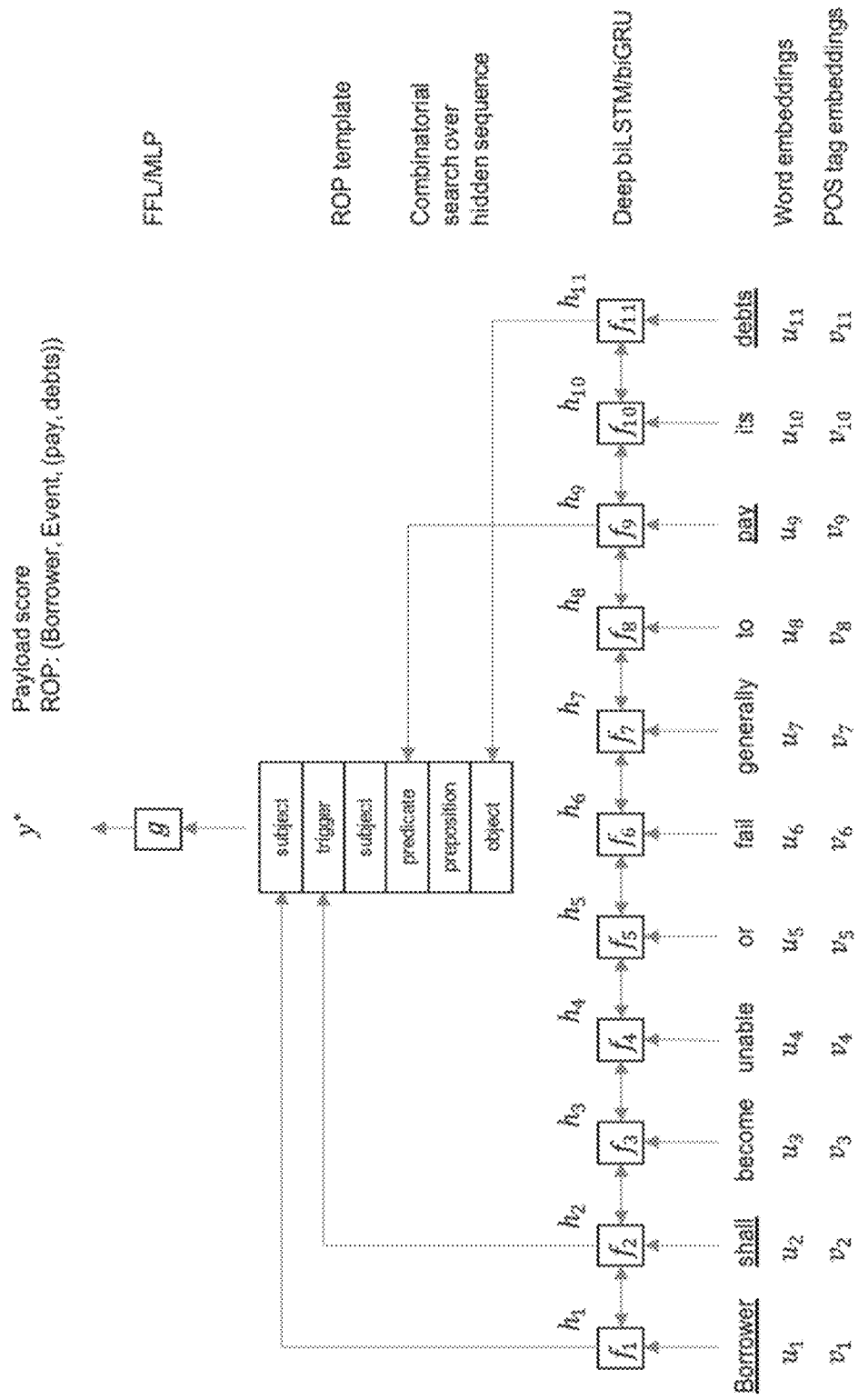
FIG. 3D illustrates a view of a neural model applying structured prediction for semantic triple extraction for generating a semantic contract map in accordance with one or more embodiments.
Figure 3E:
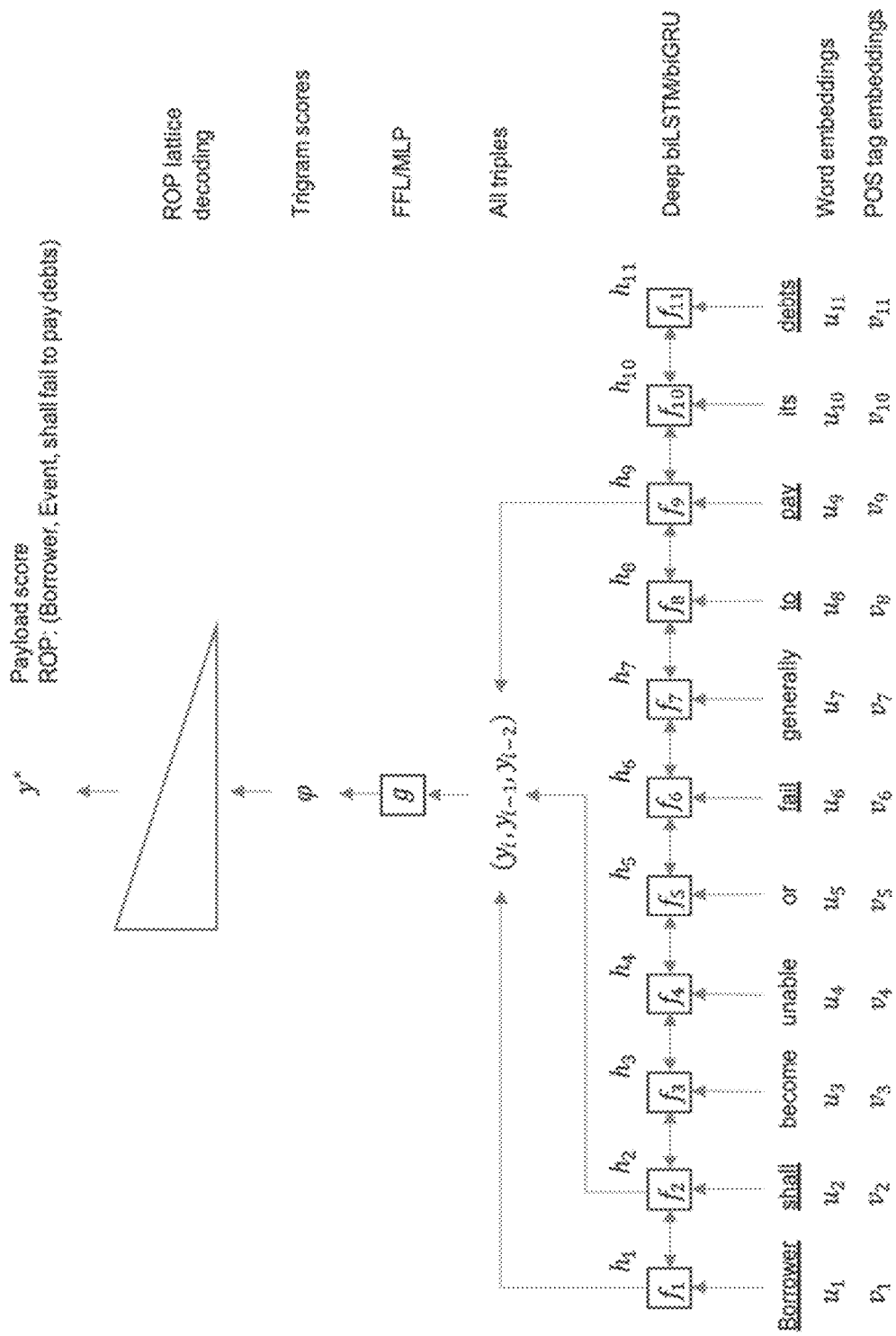
FIG. 3E illustrates a view of a neural model applying structured prediction for semantic triple extraction including lattice decoding in generating a semantic contract map in accordance with one or more embodiments.

This may be a combinatorial search jointly over sequence elements that can be found by direct enumeration or suitable approximations. An example of this arrangement is shown in FIG. 3D. FIGS. 3D and 3E illustrate structured neural models for ROP extraction in accordance with one or more embodiments.

FIG. 3D is a diagram that illustrates a structured prediction for ROP template extraction. In such an embodiment, a gated bidirectional recurrent network and feedforward layer may be trained so that a unique combination of words filling the ROP template jointly maximizes the output score.

This may be considered a structured prediction problem of identifying one correct combinatorial structure out of a large set, and training the network to perform this task may be achieved using margin hinge loss in a manner similar to that used in ROP 1-of-K classification, above. This may provide for training the network so that the correct combination of template elements is found by producing a score that exceeds the best incorrect solution by a minimum margin amount δ. For the $i^{th}$ localized ROP, let the correct tuple have solution $y_i$ and $\pi_i$, then the margin hinge loss component, total objective and stochastic gradient are defined as follows:

$$H(y_i, y) = \max\left(0, \delta + \max_{y \neq y_i} g(y) - g(y_i)\right) \qquad (34)$$

$$J(\theta) = \sum_i \max\left(0, \delta + \max_{y \neq y_i} g(y) - g(y_i)\right) \qquad (35)$$

$$\nabla J(\theta) = \sum_i \begin{cases} \nabla \max_{y \neq y_i} g(y) - \nabla g(y_i) g(y_i) - \max_{y \neq y_i} g(y) < \delta \\ 0 g(y_i) - \max_{y \neq y_i} g(y) \geq \delta \end{cases} \qquad (36)$$

In such an embodiment, the network may learn to increase the score of the correct tuple while simultaneously suppressing the incorrect solutions that score most closely, focusing discriminatory power on the critical distinctions and ignoring combinations that fail to compete with the correct answer.

Figure 3F:
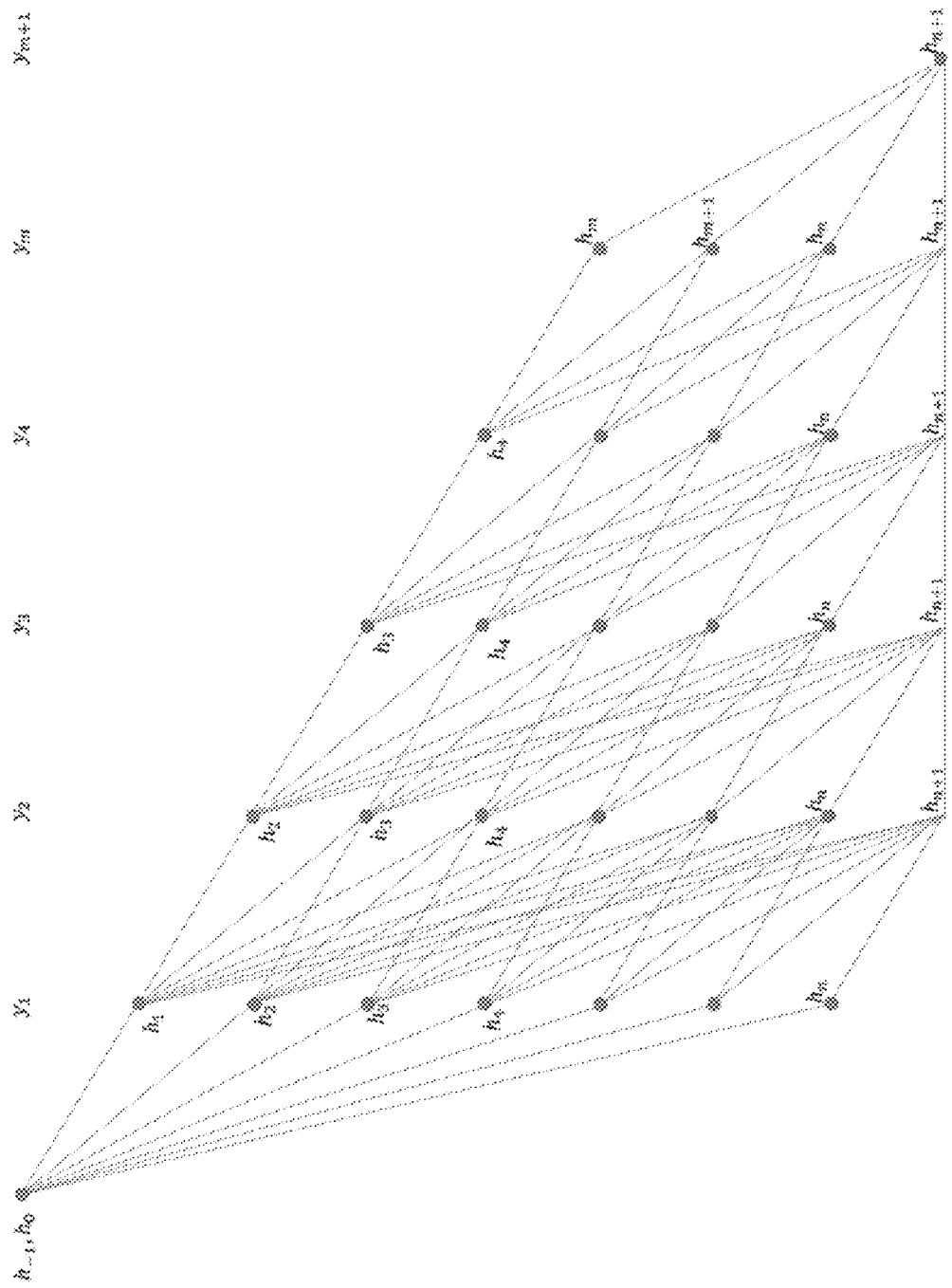
FIG. 3F illustrates a decoding lattice for semantic triple extraction for generating a semantic contract map in accordance with one or more embodiments.
Figure 3G:
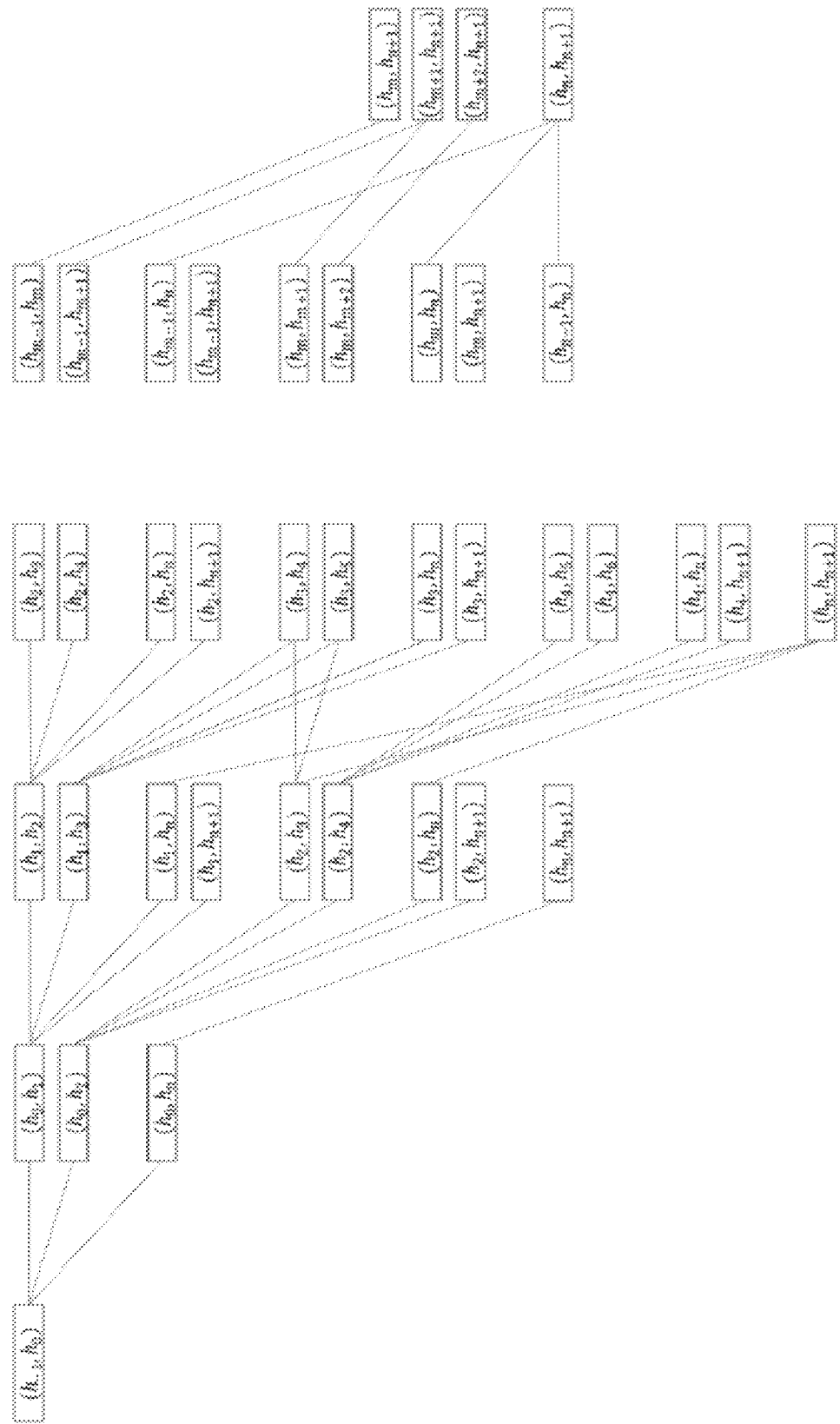
FIG. 3G illustrates a bivariate graph for semantic triple extraction in generating a semantic contract map in accordance with one or more embodiments.

In some embodiments, ROP extraction forgoes use of a fixed linguistic template and employs a technique that attempts to identify an appropriate short clause, typically up to 6-10 words or so in length, that captures the core of the ROP action or condition. In some embodiments, a clause decoding lattice, such as those shown in FIGS. 3F and 3G are employed. FIGS. 3F and 3G are diagrams that illustrate graphical models for ROP clause decoding in accordance with one or more embodiments.

FIG. 3E illustrates a diagram that illustrates structured prediction for ROP clause extraction in accordance with some or more embodiments. A gated bidirectional recurrent network and feedforward layer may be trained to score ROP trigrams. The unique best clause may be determined by maximizing total trigram path length with a lattice decoding algorithm.

FIG. 3F illustrates a ROP decoding lattice in accordance with one or more embodiments. Rows in the lattice may hold hidden state representations of the input sequence n positions to the right of the trigger h0. Columns may be the identities of the m word ROP subsequence $y_i$. In some embodiments, the left to right path from h0 to the end token $h_n+1$ that maximizes an objective function identifies the optimal ROP clause y*.

FIG. 3G illustrates an abbreviated bivariate ROP graph in accordance with one or more embodiments. Each node may be defined by the current and previous word. In some embodiments, relaxation operations can propagate maximum path lengths from prior to next nodes using current max path length and trigram scores.

Taking $y_1 \ldots y_m^* \subset h_1 \ldots h_n$ to be the summarized ROP clause of length $1 \leq m^* \leq m$ from a window of n words right of the trigger, where y elements maintain their ordering from h. The lattices may enumerate some or all possible paths through this window of length less than or equal to m. The word at positions $h_{n-1}$ may be a special end of clause token, while the words at position $h_0 = y_0$ and $h_{-1} = y_{-1}$ may be the trigger and a starting stub, respectively.

In some embodiments, the network is trained to score trigrams high when they are statistically likely to belong to the ROP extraction, in accordance with the following:

$$\varphi(y_i, y_{i-1}, y_{i-2}) \qquad (37)$$

The objective may maximize the overall path score, and suppose that score decomposes into a sum over trigrams, defined as follows:

$$\max_y \phi(y) = \max_y \sum_{i=1}^{m+1} \phi(y_i, y_{i-1}, y_{i-2}) \qquad (38)$$

Robust joint prediction may then be accomplished by applying an appropriate decoding scheme to the lattice. One approach to decoding a lattice involves employing standard graph algorithms. The ordering inherent in text means that our lattice may be directed, acyclic and topologically sorted by construction, and in such cases maximal paths may be computed by iteratively relaxing nodes in order. However, the trigram model may also mean that links cannot be considered independently of one another, which can violate assumptions of the standard algorithms.

In some embodiments, three possible decoding schemes are: (1) compute scores for all triples and then compute the maximizing path through the lattice using standard graph algorithms, (2) compute scores for all triples and then compute exact inference by recursive evaluation of the objective function, and (3) compute the path in a forward fashion using beam search only evaluating scores based on elements in the current beam. These techniques are described in more detail below.

In some embodiments, this complication is addressed with a bivariate lattice, where each node corresponds to the current word and the previous word (e.g., as illustrated in FIG. 3B). This may roughly square the size of the lattice, but may maintains sufficient information in each node such that it can fully calculate the score of any forward link by completing a triple.

Let the lattice be arranged as a start node, a progressive sequence of m columns of bivariate nodes containing the possible path positions at each point, and a set of final terminal nodes, defined as follows:

$(h_{-1}, h_0)_{l=0}$ start node $(h_j, h_{n+1})_{l+1}$ end nodes at l>1

$(h_0, h_j)_{l=1}$ j=1 ... n nodes at l=1

$(h_i, h_j)_l$ i=l-1 ... j-1, j=l ... n nodes at 1<l≤m (39)

Then, the edges on the lattice are defined as follows:

$(h_{-1}, h_0)_0 \to (h_0, h_j)_l$ start edges $(h_i, h_j)_l \to (h_j, h_n)_{l+1}$ end edges $(h_i, h_j)_l \to (h_j, h_k)_{l+1}$ internal edges (40)

With this bivariate lattice definition, a maximum path algorithm may be able to maintain a maximum partial path value θ at each node. Assuming this partial maximum is known for the current column, adjacent nodes in the next column may be progressively relaxed by comparing the running adjacent maximum to each incoming θ+φ.

FIG. 3H illustrates a diagram for lattice decoding by maximum path relaxation in accordance with one or more embodiments. The complexity of maximum path decoding is $O(n^3)$ trigram evaluations followed by $O(n^2)$ edge relaxations for each step l=0 ... m.

FIG. 3I illustrates a diagram for lattice decoding by recursive optimization in accordance with one or more embodiments.

In some embodiments, exact decoding by recursive optimization involves manipulating the objective function to derive a recursive computational solution in the manner of dynamic programming and used in techniques such as the Viterbi algorithm and inference in conditional random fields. In some embodiments, the techniques involve expanding the objective sum and distribute the maximum operators in accordance with the following:

$$\max_y \phi(y) = \max_{y_1} \ldots \max_{y_m} \sum_{i=1}^{m+1} \phi(y_i, y_{i-1}, i_{i-2}) \quad (41)$$

$$= \max_{y_1}\left(\phi(y_1, y_0, y_{-1}) + \max_{y_2}(\phi(y_2, y_1, y_0) + \ldots + \max_{y_m}(\phi(y_m, y_{m-1}, y_{m-2}) + \phi(y_{m+1} = h_{n+1}, y_m, y_{m-1}))\ldots)\right)$$

Note that the last term may correspond to the end token. The following function may be defined:

$$\theta_{m+1}(y_m, y_{m-1}) \stackrel{\Delta}{=} \phi(h_{n+1}, y_m, y_{m-1}) \quad (42)$$

This function is the score of the end token for all combinations of $y_m$ and $y_{m-1}$. Similarly, the maximum over $y_m$ may be the function $\theta_m(y_{m-1}, y_{m-2})$. Once can proceed to maximize these combined terms over each $y_i$ into a function $\theta_i(y_{i-1}, y_{i-2})$, continuing right to left until the trigger token, with the following recurrence:

$$\max_y \phi(y) = \max_{y_1}\left(\phi(y_1, y_0, y_{-1}) + \max_{y_2}\left(\phi(y_2, y_1, y_0) + \ldots + \max_{y_i}(\phi(y_i, y_{i-1}, y_{i-2}) + \theta_{i+1}(y_i, y_{i-1}))\ldots\right)\right) \quad (43)$$

$$\theta_i(y_{i-1}, y_{i-2}) = \max_{y_i} \begin{cases} \phi(y_i, y_{i-1}, y_{i-2}) + \theta_{i+1}(y_i, y_{i-1}) y_i \neq h_{n+1} \\ \phi(y_i, y_{i-1}, y_{i-2})\alpha_i y_i = h_{n+1} \end{cases} \quad (44)$$

Since any condition $y_i = h_{n+1}$ may act to end the sequence, the accumulation of the path score may be dropped for these choices. $\alpha_i$ may be an optional weight that may be used to normalize for or introduce a prior over path length. For example, we may normalize all path scores by extending the terminating score to m by $\alpha_i = (m+2-i)$. This may have the effect of not preferring ROP clauses simply because they are longer, unless the extension actually outscores the early termination.

Upon reaching $y_1$ the following may be defined:

$$\max_y \phi(y) = \max_{y_1}(\phi(y_1, y_0, y_{-1}) + \theta_2(y_1, y_0)) \quad (45)$$
$$= \theta_1(y_0, y_{-1})$$

and, since $y_0$ and $y_{-1}$ are fixed, the following may be defined:

$$y_1^* = \underset{y_1}{\operatorname{argmax}}\, \theta_1(y_0, y_{-1}) \quad (46)$$

With $y_i^{**}$ known, we can solve for $y_2$ with $$y_2^* = \underset{y_2}{\operatorname{argmax}}\, \theta_2(y_1^*, y_0) \quad (47)$$

And in general, proceeding left to right $$y_i^* = \underset{y_i}{\operatorname{argmax}}\, \theta_i(y_{i-1}^*, y_{i-2}^*) \tag{48}$$

where the forward recurrence halts when:

$$y_i^* = h_{n+1}.$$

Inference in exact recursive optimization may employ $O(n^3)$ trigram evaluations followed by a backward recurrence of m steps of $O(n^2)$ comparisons to build each θ table. The forward recurrence may employ m constant time arg max lookups.

FIG. 3J illustrates a diagram for lattice decoding by beam search in generating a semantic contract map in accordance with one or more embodiments.

In some embodiments, beam search is employed as a decoding scheme to build the optimal trigram path left to right from the trigger using. This may trade guaranteed optimality for efficiency, although given the short size of the clause extraction, extensive trigram overlap and a modest beam width, this method may perform nearly as well or effectively equal to exact inference in many cases.

Beam search may build the optimal path one element at a time, keeping the beam width b best hypotheses in the beam set as we proceed. One may define the beam at step i−1 as follows:

$$\Lambda_{i-1} = \{(y_j^I, \theta^j)\}_{j=1}^{b} \tag{49}$$

where $y_j^I$ is partial solution path with score $\theta_j$. Initialize the beam as $$\Lambda_0 = \{(y_0^I, \theta_0)\} y_0^I = y_{-1}) \theta_0 = 0 \tag{50}$$

In some embodiments, to compute the beam update, once can expand each beam hypothesis into all possible continuations and keep the b best. Enumerating all extensions as k=1 ... $k_j$ for each j, the expanded hypothesis set may be defined as follows:

$$\{(y'_{jk}, \theta_{jk})\}_{j=1,k=1}^{bk_j} \tag{51}$$

and so the step i beam update may be defined as follows:

$$\Lambda_i = \{(y'_j, \theta_j)\}_{j=1}^{b} = \{(y', \theta) \in \{(y'_{jk}, \theta_{jk})\}_{j=1,k=1}^{bk_j} \mid \theta \in b\text{-max}\,\theta_{jk}\} \tag{52}$$

$$\theta_{jk} = \begin{cases} \phi(y_i, y_{i-1}, y_{i-2}) + \theta_j y_i \neq h_{n+1} \\ \phi(y_i, y_{i-1}, y_{i-2})\alpha_i + \theta_j y_i = h_{n+1} \end{cases}$$

$$y'_{jk} = y_i \circ y'_j$$

where ° denotes sequence concatenation and b-max $\theta_j$k denotes the maximum b elements of $\{\theta_{jk}\}$. In some embodiments, the notation b-max $\theta_{jk}$ emphasizes the algorithm operations and so is preferred over the more analytical $|\{\theta_{jk}\} \cap (\theta, \infty)| < b$. New hypotheses may be all possible one-word extensions that satisfy the following conditions:

$$\underset{h}{\operatorname{ind}}(y_i) > \underset{h}{\operatorname{ind}}(y_{i-1}) \tag{53}$$

$$y_{i-1} \neq h_{n+1}$$

$$(y_{i-1}, y_{i-2}) = prefix(\pi_j)$$

In cases where expansion is impossible due to $y_{i-1} = h_{n+1}$, these hypotheses may remain unaltered in the expanded set and continue to compete to remain in the beam. Upon conclusion of the m+1 steps, the clausal ROP extraction may be the maximizing beam path, defined as follows:

$$(y^*, \theta^*) = (y', \theta) \in \Lambda \mid \theta = \max_j \theta_j \tag{54}$$

$$\pi^* = \underset{h}{\operatorname{ind}} y^*$$

Inference with beam search lattice decoding may takes advantage of the fact that one may only need to evaluate trigrams for possible extensions of the beam. Each step may employ O(n) trigram evaluations to expand the beam followed by an O(n log n) sort to filter the beam.

The recursive and maximum path decoding algorithms have the following computational requirements. In the case of recursive optimization, a suitable nested loop at column $y_1$ is defined as follows:

$$j = l-1 \ldots n(n-l+2) \text{elements}$$

$$i = l-2 \ldots j-1(j-l+2) \text{ elements}$$

$$k = j+1 \ldots n+1(n-j+1) \text{elements} \tag{55}$$

In this loop, i enumerates the positions for $y_{l-2}$, j for $y_{l-1}$ and k for $y_l$. Each $y_{l-1}$ position requires a maximization over $(n-j+1)y_l$ elements, and at each $y_{l-1}$ we will have $(j-l+2)$ possible $y_{l-2}$ elements, each requiring this same max evaluation. Therefore, the total number of required comparisons to build the $\theta_l$ table may be defined as follows:

$$\sum_{j=l-1}^{n}(j-l+2)(n-j+1) = \tag{56}$$

$$-\sum j^2 + (n+l-1)\sum j + (-\ln -l + 2n + 2)\sum 1 = S_1 + S_2 + S_3 \text{ where}$$

$$S_1 = -\frac{1}{2}(n-l+2)(n^2+(l-1)^2) = -\frac{1}{2}(n^3 - \ln^2 + 2n^2) + O(n) \tag{57}$$

$$S_2 = \frac{1}{2}(n+l-1)^2(n-l+2) = \frac{1}{2}(n^3 + \ln^2 - n^2) + O(n)$$

$$S_3 = (-\ln -l + 2n + 2)(n-l+2) = (-\ln^2 + 2n^2) + O(n) \mid \tag{58}$$

$$S_1 + S_2 + S_3 = \frac{1}{2}n^2 + O(n)$$

The complexity is $O(n^2)$. Notably, the cubic terms cancel. A similar calculation works for the maximum path decoding operations.

Figure 4:
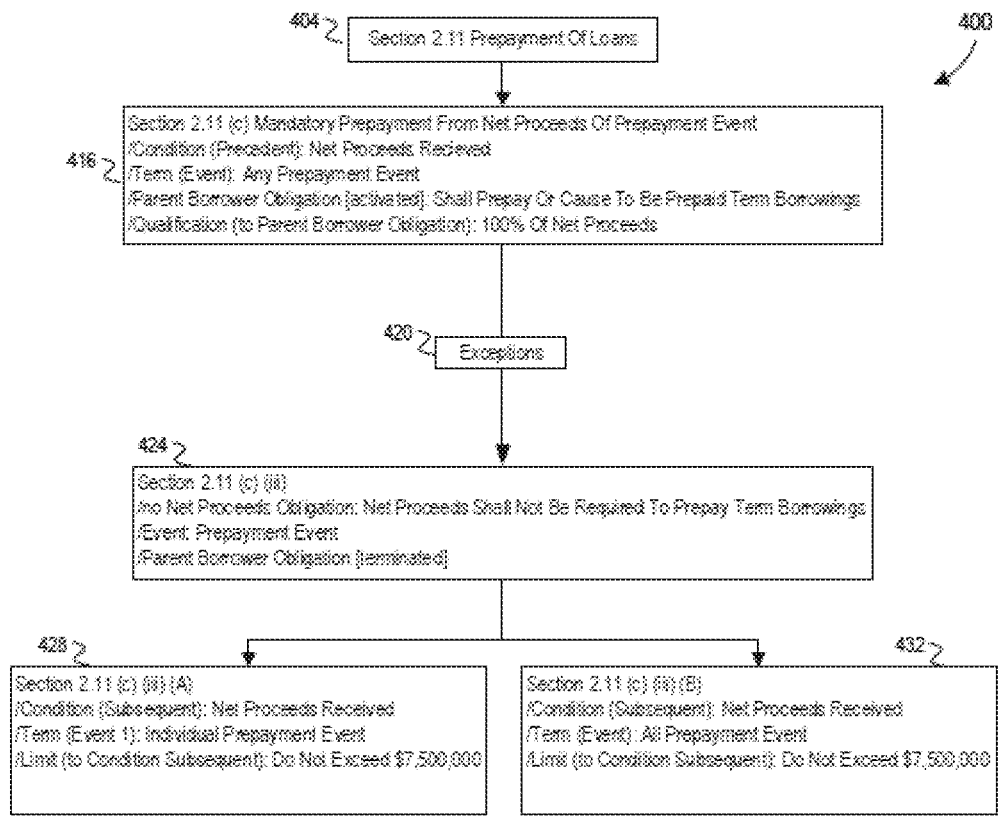
FIG. 4 shows an example visualization of a semantic map generated from a natural-language text document in accordance with one or more embodiments.

FIG. 4 shows an example visualization of a semantic map (e.g., graph visualization 400) generated from a natural-language-text document, in accordance with one or more embodiments of the present techniques. As stated elsewhere in this disclosure, some embodiments may store structured data generated from natural-language-text documents in a graph database. In some embodiments, a version of a graph data structure may include graph vertices that represent different sections of a natural-language text document, conditional statements extracted from a natural-language-text document, data model objects such as semantic triples or semantic doubles of the conditional statements, subjects obtained from the data model objects, or the like. The graph visualization 400 includes a first label 404 representing a text section header, where the text "section 2.11 prepayment of loans" may be directly extracted from a natural-language-text document. The first label 404 represent a parent text header that is a header for the text sections used to generate a graph vertex 416. In some embodiments, the properties associated with a graph vertex may be used as a category value for the graph vertex and any text section represented by the graph vertex or otherwise be used to indicate a category value.

The graph vertex 416 indicates a portion of a conditional statement that includes a previous condition "net proceeds received" that must be satisfied and stores this previous condition in the property "/Condition." As described elsewhere in this disclosure, some embodiments may use a machine learning model to extract this information into a set of data model objects and then use the set of data model objects to determine a graph vertex. Similarly, some embodiments may use the machine learning model to extract other elements and assign them to properties associated with the graph vertex 416 such as "/Term." Some embodiments may use the machine learning model to generate a semantic triple that is representable in the text form "('Borrower', 'Obligation', 'shall prepay or cause to be prepaid term borrowing.')." Some embodiments may then use this triple to augment the graph vertex with the property"/parent borrower obligation [activated]: shall prepay or cause to be prepaid term borrowing." Some embodiments may further augment a graph vertex representing a text section with quantitative values extracted from a text section. For example, the graph vertex 416 may include the text "/Qualification", where the term "/Qualification" may indicate additional data that may be relevant to a condition or outcome of an obligation, right, or prohibition.

As described elsewhere in this disclosure, some embodiments may use one or more machine learning models to label different text sections of a natural-language-text document based on learning parameters, keyword matches, key lexical item matches, or the like. For example, some embodiments may then determine, based on a shared header of the first text section and a second text section, that a graph vertex 424 is a child vertex of the graph vertex 416, where the shared header includes the text "section 2.11 (¢)." Some embodiments may use a machine learning model to determine that the text used to generate the graph vertex 424 includes a negation term "shall not" and, based on a detection of the negation term, label the association between graph vertex 424 and the graph vertex 416 with the category value "Exceptions," as indicated by the label 420.

Based on the text of the text section associated with the label "section 2.11(c)(iii)," some embodiments may further determine that this corresponds with a cancellation event of a previously recited obligation indicated by the graph vertex 416.

As indicated by the graph visualization 400, some embodiments may associate multiple graph vertices as child vertices of a parent vertex. For example, the graph visualization 400 further includes a graph vertex 428 and a graph vertex 432, which are shown as child vertices of the graph vertex 424. The graph vertex 428 may be generated based on a text section labeled with a text header "Section 2.11 (c) (iit) (A)." The graph vertex 432 may be generated based a second text header "Section 2.11 (c)(iil)(B)." Some embodiments may determine that the graph vertex 428 is a child vertex of the graph vertex 424 based on a determination that the graph vertex 428 and the graph vertex 432 shares the text section label "Section.211(c)(iii)" with the graph vertex 424.

Figure 5:
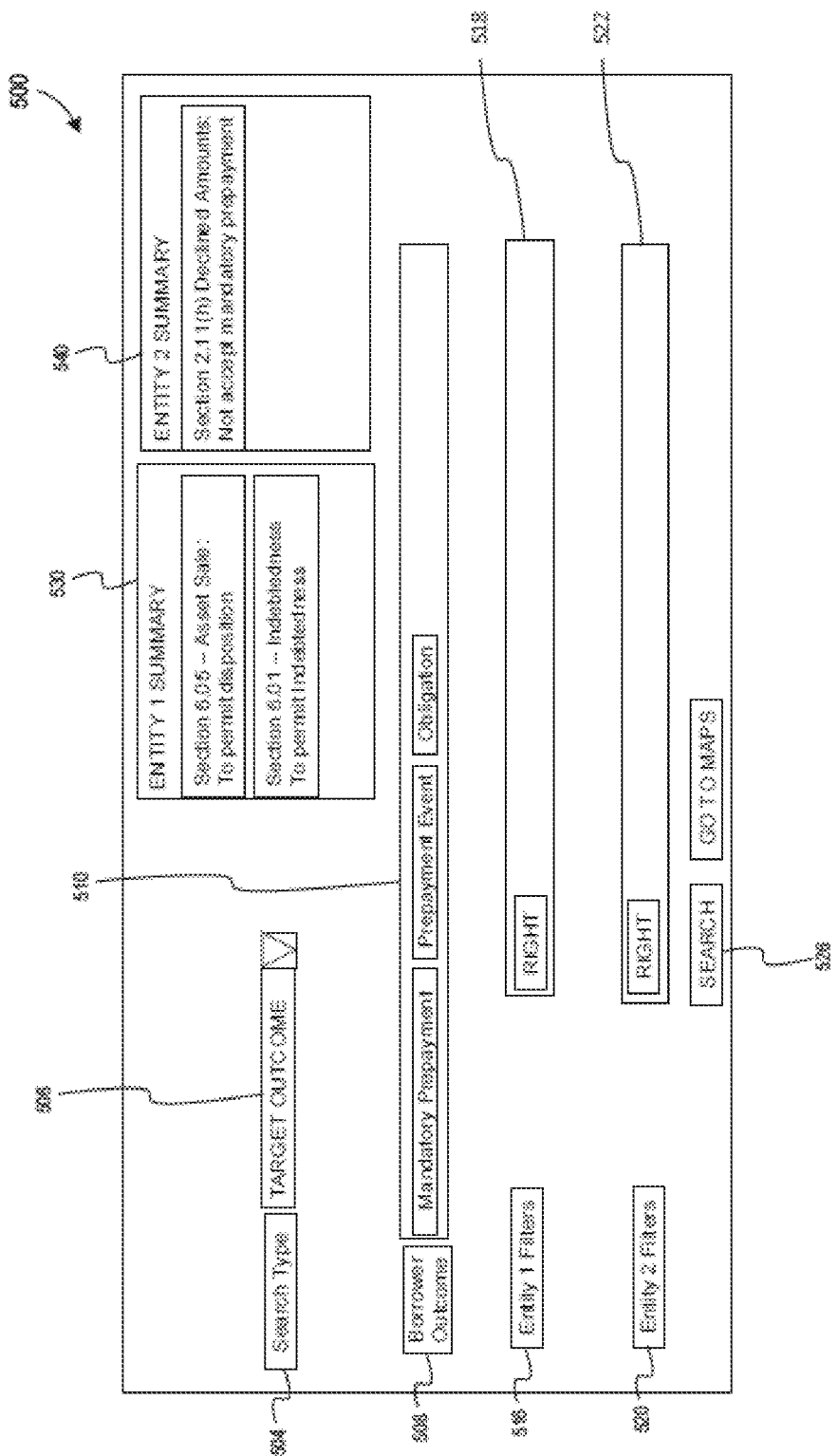
FIG. 5 shows an example user interface of a self-executing protocol search interface, in accordance with one or more embodiments of the present techniques.

FIG. 5 shows an example user interface of a self-executing protocol search interface 500, in accordance with one or more embodiments of the present techniques. In some embodiments, the UI 500 provides for displaying options for a user to generate a query through a data structure generated from a natural-language-text document, or the like. As illustrated, the UI 500 may, for example, provide a UI element 504 to indicate a specific search type such as a target outcome, as indicated by the UI element 506. In some embodiments, the UI 500 may be displayed on a client computing device, where the code to present the UI 500 may be sent from a server or cloud computing service. The UI element 508 may indicate one or more search filters of the search type indicated by the UI element 506. The first category search bar 510 may be a UI element that allows a user to select one or more category values used by the search filter indicated by the UI element 508. Some embodiments may further include a UI element 516 that indicates that category values displayed in the UI element 518 applies to an entity identified by the UI element 516. For example, the search indicated by the UI 500 includes a filter for text sections categorized with the category value "right" for the entity "entity 1." The UI 500 includes a UI element 520 that indicates the category values displayed in the UI element 522, which may indicate that the search should a filter for text sections categorized with the category value "right" for the entity "entity 2."

In some embodiments, an interaction between the user and the UI element 526 may cause a client computing device to submit a web message that includes a query to a server. After receiving the query, some embodiments may provide a response to the client computing device that may include a query result. Some embodiments may provide the query result in the form of text data used to provide a summary of text sections corresponding to each of the entities, where a first summary 530 indicates to text sections of a natural-language-text document associated with a category value "right" corresponding with the entity "Entity 1." Similarly, some embodiments may provide a second summary 540 that indicates text sections of the natural in which document associated with a category value "right" corresponding with the entity "Entity 2."

Figure 6:
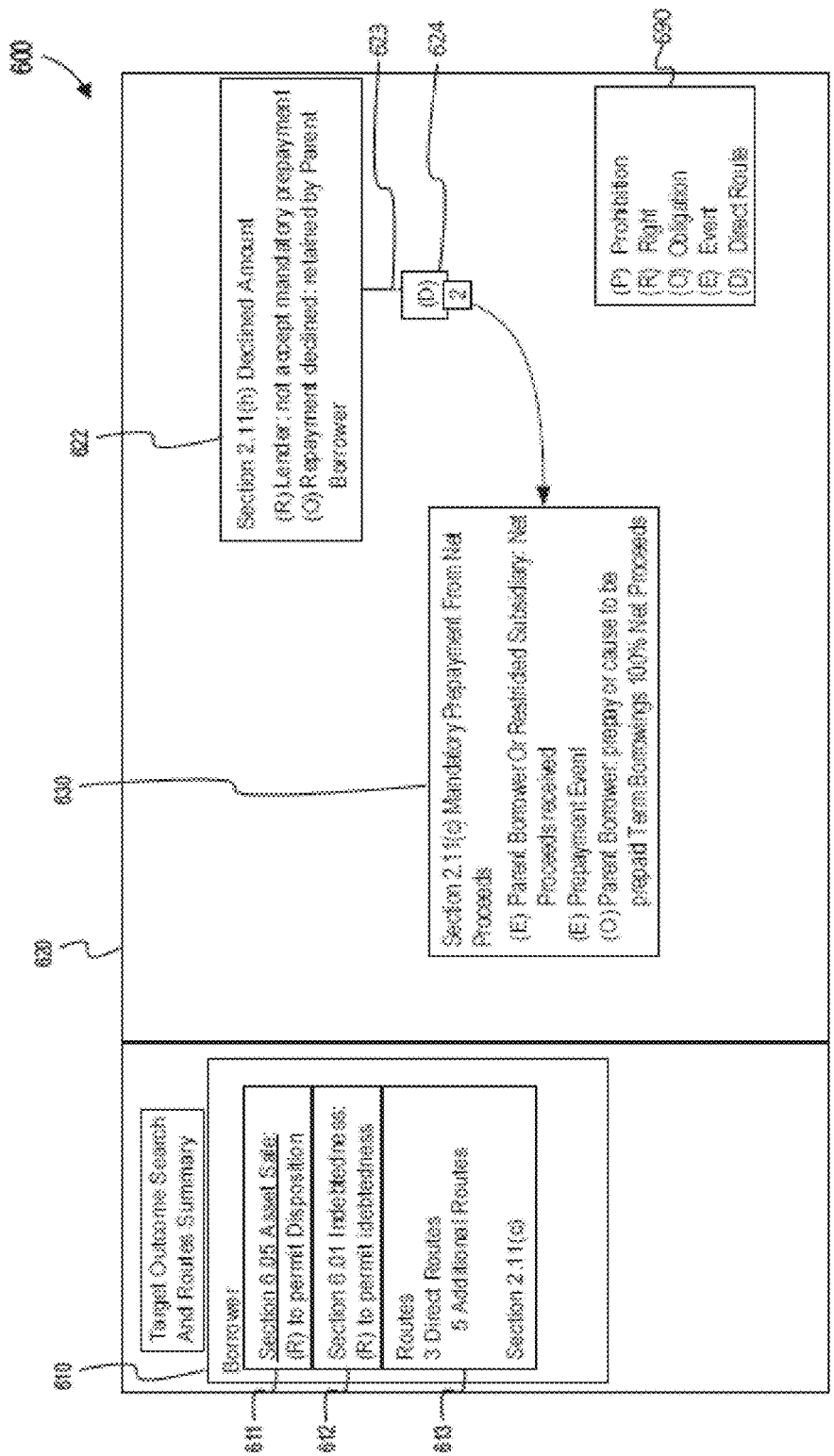
FIG. 6 shows an example user interface of a self-executing protocol search result, in accordance with one or more embodiments of the present techniques.

FIG. 6 shows an example user interface 600 for a self-executing protocol search result, in accordance with one or more embodiments of the present techniques. In some embodiments, the UI 600 provides for display of a search result for a query of a data structure generated from a natural-language-text document. As illustrated, the UI 600 may include, for example, a first search summary 610 that includes a first box 611, a second box 612, and a third box 613. The first box 611 may include a section title "Section 6.05 Asset Sale," an indication of a category value "right," and a set of n-grams representing a proposition "to permit disposition." As described elsewhere, some embodiments may use a machine learning model to convert text of the natural-language-text document that has been associated with the text section labeled "Section 6.05 Asset Sale" into text of the natural-language text document. The second box 612 may include a section title "Section 6.01 Indebtedness," a second indication of the category value "right," and a set of n-grams representing a proposition "to permit indebtedness." The third box 613 indicates a count of the direct routes and indirect routes with respect to state changes that may result to the activation, cancellation, or triggering of section 2.11(c), represented by the shape 630, which may represent a first graph vertex corresponding with the text section labeled "section 2.11(c)."

In the illustrated embodiment, the UI 600 also includes a graph window 620 that displays a visualization that includes a first shape 622 representing a second graph vertex, where the first shape 622 renders a text section identifier "Section 2.11(h) Declined Amount" and two text lines corresponding with two different semantic triples corresponding with two different entities. The first text line includes the text "lender: not accept mandatory prepayment" and is in visual proximity with the symbol "(R)". As indicated by the key 690, the symbol "(R)" represents the category value "right," the symbol "(P)" represents the category value "prohibition," and the symbol "(0)" represents the category value "obligation." In addition, the key 690 may include symbols for a contract state associated with a text section. For example, the key 690 indicates that the symbol "(E)" indicates that a graph vertex of a smart contract is associated with an event and that the symbol "(D)" indicates that a route between graph vertices representing associations between data model objects is a direct route. In addition, the key 690 may indicate properties of an association between a semantic triples, conditional statements, or graph vertices that include data obtained from semantic triples or corresponding text sections. Furthermore, as shown in the shape 622, some embodiments may display a shape that indicates different deontic categories with respect to different subject entities, where the shape 622 indicates that the subject entity "Lender" has a right listed in section 2.11(h) and that the subject entity "Borrower" has an obligation listed in the section 2.11(h). In some embodiments, shapes including shape 622 and 630 may be referred to herein as annotations.

The shape 623 may be, for example, an arrow that connects the shape 622 with the shape 630, where the shape 623 may be generated based on a detected association between the first and second graph vertices. In the illustrated embodiment, the UI 600 also includes a visual indicator 624 that indicates that the association between the first and second graph vertices is a direct route, where a direct route may indicate that the text section used to generate the shape 622 may be in a same shared text section as the text section used to generate the shape 630. Furthermore, as shown in the shape 630, some embodiments may store or retrieve indicators or events that triggered a conditional statement associated with a graph vertex, such as "Parent Borrower or Restricted Subsidiary: Net Proceeds received" or "Prepayment Event."

Figure 7:
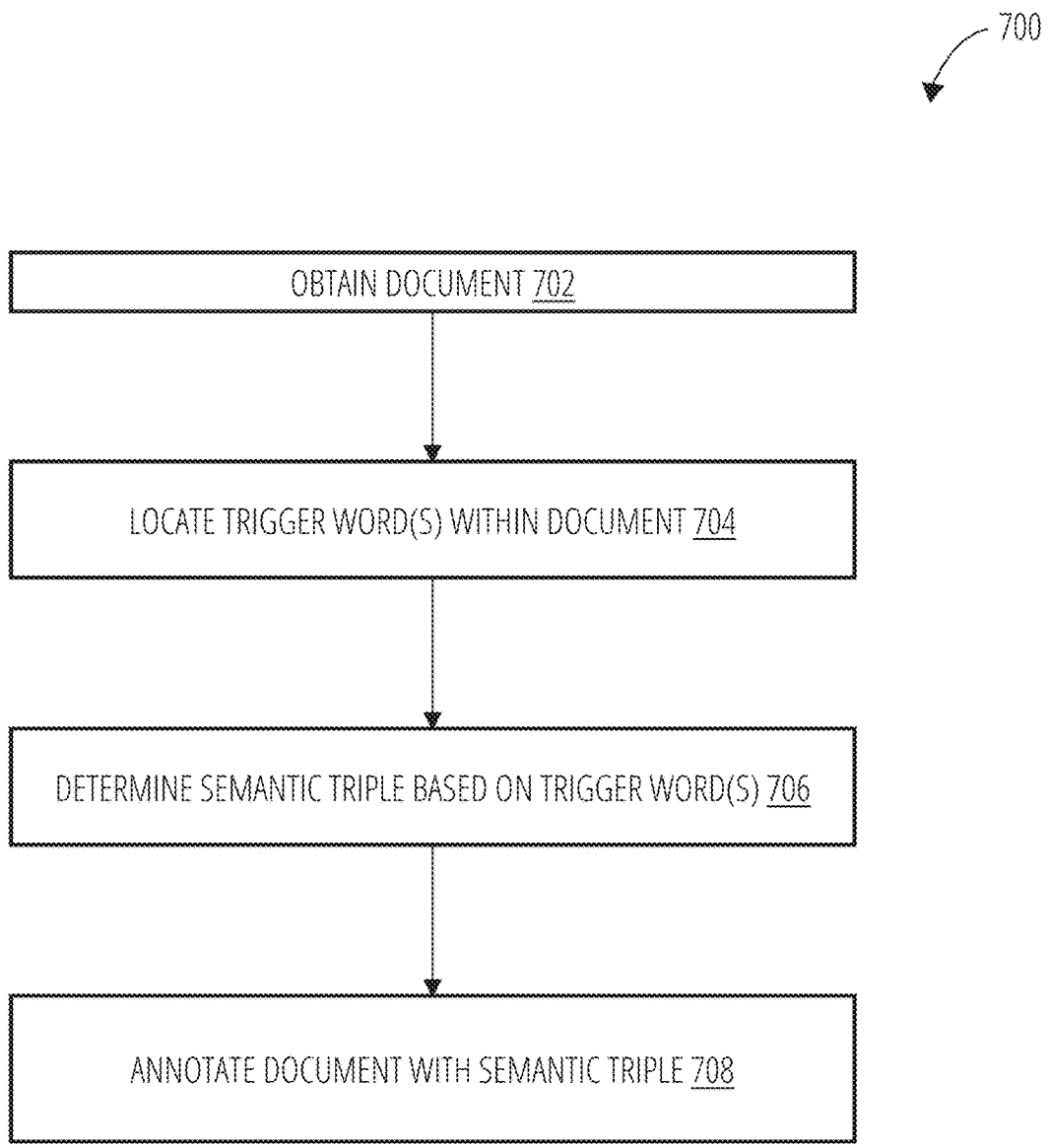
FIG. 7 is a flowchart illustrating a process to generate a semantic map, in accordance with one or more embodiments.

FIG. 7 is a flowchart illustrating a process 700 to generate a semantic map, in accordance with one or more embodiments of the present techniques.

In some embodiments, operations of the process 700 may include obtaining a document, as indicated at block 702. This may include obtaining a natural-language-text document. For example, obtaining a document may include the computer system 102 obtaining the natural-language text document 202. The natural-language-text document may be obtained from one of various types of sources, where the text of the document may be provided in various file types or formats such as plain text, formatted text, hypertext, or the like. The text may be separated into n-grams, where an n-gram may include a sequence of n items from text, where "n" may represent an integer and the items may include letters, syllables, phonemes, other parts of words, complete words, symbols, multi-word lexical items, or the like. For example, an n-gram may be a word, a lexical item, a sequence of lexical items, or the like. Additionally, the n-grams of a document do not need to include the same number of items with respect to each other. For example, a first n-gram of a document may be a lexical item consisting of the word "eat" and a second n-gram of the document may be a lexical item consisting of the phrase "traffic light."

The natural-language-text document may be obtained from one of a variety of data sources, such as the Internet, a private network, an internal database of an organization or another data repository, data provided directly from a UI element, or the like. For example, the natural language-text document may be obtained from a hyperlink, a distributed database, a cloud database, a database of a private network hosted by an on-site server, a document stored in a local memory device, or the like. In many cases, the text of a natural-language-text document may include unstructured information, where information may be loosely organized or otherwise missing discrete separators usable as delimiters between different text sections. Alternatively, or in addition, the natural-language-text document may include structured data, where the structured data includes a set of headers, other types of section titles, enumerated lists, or other elements usable as delimiters to indicate different sections of the document. In some embodiments, the natural-language text document may include unstructured data.

In some embodiments, operations of the process 700 may include locating trigger words within the document as indicated by block 704. This may include, for example, identifying or determining locations of trigger words within a natural-language-text document. For example, this may include the computer system 102 identifying and determining locations of trigger words (e.g., (e.g., "may," "shall," "will," "agrees," etc.) located in the natural-language-text document 202. In some embodiments, trigger words include modal verbs that indicate possibility, necessity, or agreement. For example, trigger words may include "may," "shall," "will," "agrees," etc. In some embodiments, trigger words may include a predetermined set of words. For example, trigger words "may," "shall," "will," "agrees," or the like may be preidentified or predetermined as being trigger words. Trigger words indicate a high probability that one or more words within a neighboring region of the trigger word includes descriptor words of an ROP. In some embodiments, a location of positive trigger words is used as a reference signal for ROP extraction. For example, a trigger word may be located, and a nearby region (e.g., a region of words neighboring the trigger word) may be assessed for associated ROP elements. A trigger word may be associated with a first, second, or third category. For example, a trigger word may be associated with a first category corresponding to a right, a second category corresponding to an obligation, or a third category corresponding to a prohibition. In some embodiments, a machine learning algorithm is configured to determine, based on a trigger word, one or more descriptors associated with a first, second, or third category. For example, as described above, a trigger word "may" can be identified and located within a natural-language-text document, and the location may be used to identify a region e.g., a region of words neighboring the trigger word) that encompasses one or more descriptors associated with the first, second, or third category. The region may, in turn, be assessed to identify and extract ROP elements, such as descriptors, from that region. For example, a clause including the words "the borrower may request in accordance herewith" may be assessed to identify and locate the trigger word "may," and the trigger word "may" may be used as a basis to search for and identify, from the clause, the descriptor "request" associated with the first category. As described, in some embodiments, locations of trigger words may be provided to other process elements for use in assessing a natural-language-text document for other elements, such as ROP elements.

In some embodiments, operations of the process 700 may include determining a set of semantic triples or other data model objects that include a set of category values based on the trigger words using a machine learning model, as indicated by block 706. This may include, for example, conducting various operations based on the identify or location of trigger words to identify semantic triples from the text of the natural-language-text document. Semantic triples can provide short, concise language that represents a fundamental semantic unit. The fundamental semantic units may be described, for example, using categories such as rights, obligations, and prohibitions. In some embodiments, a semantic triple may include a first field, a second field, and a third field representing different elements. For example, the first field may represent a subject entity, the second field may represent a category value indicating deontic category, and the third field may represent another data entity representing a proposition or text from the text section. As described elsewhere herein, a semantic triple may comprise a structure as an "(s, p, t)" semantic triple, "s" representing an entity associated with a category value and "p" may represent the category value selected from a set of categories such as a "right", "obligation", or "prohibition". Furthermore, "t" may represent an object entity, text including both a verb predicate and an object, a semantic double or second data model object that may include the verb predicate in a first field of the second data model object and the object entity in a second field of the second data model object, or the like. Other variations of concatenation of text into a semantic triple or double are also considered contemplated herein.

For example, the first field of a semantic triple may, for example, be populated with the value "entity01," where "entity01" is an identifier of a first entity stored in a list of authorized entities. The second field of the semantic triple may, for example, be populated with the value "right," which may, for example, be selected from a list of category values ["right"; "obligation"; "prohibition"], where the category value may be selected with respect to the first field value. The third field may, for example, be populated with the text from a text section representing a proposition. Alternatively, or in addition, the third field of the semantic triple may be populated with another data model object, such as a semantic double. For example, the third field may be populated with the semantic double '("to make", "45 widgets)' using a machine learning model to categorize which sequence of strings correspond with a grammatical predicate and a grammatical object, respectively. As described, the determination of semantic triples may be accomplished using various processing techniques. For example, the determination of semantic triples may be accomplished by way of structured prediction (e.g., as described with regard to FIG. 9), or by way of lattice decoding (e.g., as described with regard to FIG. 10).

In some embodiments, operations of method 700 may include annotating the document with semantic triples as indicated by block 708. A document to be provided to a user may include the natural-language text including annotations including descriptors corresponding to a first, second, or third category of a semantic triple. For example, annotations 530 may be presented to a user on a display 500 of a computing or display device as discussed with regards to FIGS. 5-6. In some embodiments, causing the presentation of a visualization including shapes representing semantic triples or text associated with semantic triples and a set of associations between semantic triples. As used in this disclosure, a shape may include a line, a polygonal shape, an ovaloid shape or another type of curved shape, or the like. For example, a first shape may include text of a first text section, where UI elements of the shape, UI elements that partially or completely overlap the shape, or UI elements that are in proximity to the shape may indicate elements of a data model object. In another example, a UI element within a shape may include one or more annotation such as an indication of an entity having an account in an account record, an indication of whether the data model object stores a proposition that is a right, obligation, or prohibition with respect to the entity, proposition text such as a sequence of words determined to be part of a verb predicate or an object, or the like. The UI may be an interactive interface allowing the user to submit requests for information regarding a specified text section and receive an annotated clause or summary of the specified clause. In some instances, a user may make use of the annotations to identify, execute or otherwise act on aspect of the contract. For example, where the document 202 is a contract specifying contract terms, a user (or other entity, such as a computer system), may review or otherwise access an annotation outlining an ROP for a term of the contract 202, determine a term of the contract based on the ROP, and may take action to modify or execute the term. For example, a user (or other entity, such as a computer system), may identify a needed change to the term and may modify the associated language in the contract. As another example, a user (or other entity, such as a computer system), may identify an action required by the term (e.g., make a monetary payment to an entity in response to an event) and may execute or cause execution of the term to effectuate the term (e.g., make a monetary payment to a bank account associated with the entity in response to the event occurring).

It is understood that the respective operations described with regards to method 700, 800, 900, and 1000 may be implemented as a standalone operation, or in combination with any of the operations described herein in any permutation of sequences.

Figure 8:
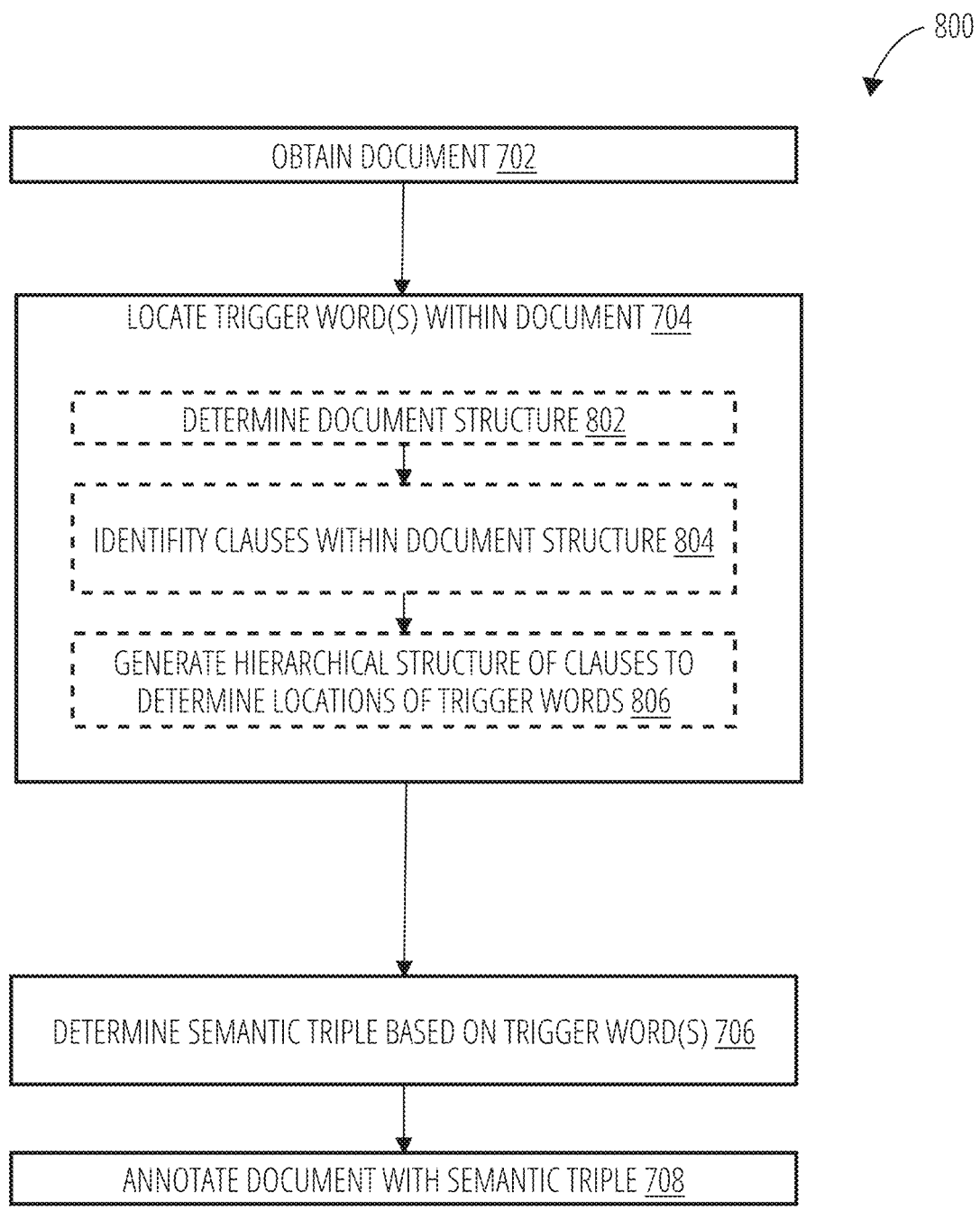
FIG. 8 is a flowchart illustrating an aspect of a process to generate a semantic map, in accordance with one or more embodiments.

FIG. 8 is a flowchart illustrating an aspect of a process to generate a semantic map, in accordance with one or more embodiments. In some embodiments of method 800, similar or identical operations as described in method 700 may be performed. Performance of the operations of process 800 may include obtaining a natural language-text document, as indicated by block 702.

In some embodiments, operations of process 800 may include locating one or more trigger words within the natural-language text document as indicated by block 704. In some embodiments, locating trigger words within the document includes determining a document structure as indicated by block 802. In some embodiments, the natural-language text document is an unstructured document. A machine learning model may extract a document structure and generate a directed graph representation of the text document in accordance with the techniques described herein in regards to at least FIG. 3A. For example, as shown in FIG. 4, an unstructured document is represented in a graph structure.

In some embodiments, operations of process 800 may include identifying clauses within the document structure as indicated by block 804. A trained machine learning algorithm may be used to extract a document structure corresponding to the unstructured text of the natural language document. The document structure may be represented as a neural representation, a directed graph, or as a set of vector representations. In a structured document, a text section may be determined by determining the boundaries of the text section in the natural-language-text document, where the boundaries may be stored as numeric values indicating text positions. Some embodiments may assign an identifier to a text section, where the identifier may be the same as or different from one or both of the boundaries. For example, some embodiments may assign a text header to a text section as a text section identifier. Furthermore, some embodiments may assign one or more category values to the text section, as described elsewhere in this disclosure. In an unstructured document, some embodiments may use a cascade of finite state matching algorithms to a natural language-text document to extract the hierarchical structure and resolve references. For example, some embodiments may perform one or more various operations to parse a natural-language-text document into a set of text sections based on whitespaces (e.g., multiple spaces, a line break, etc.) using a finite automata matching algorithm to generate a structured document.

Some embodiments may parse a natural-language-text document using one or more delimiters, where a delimiter may include whitespace, a symbol, punctuation (e.g, a comma, semicolon, colon, period, etc.), a character, a pattern of characters, other types of n-grams, a set of formatting tags, a set of metadata tags, a set of markup language tags, or the like. As discussed elsewhere in this disclosure, some embodiments may use headers or other text elements to segment a natural-language-text document into different text sections, where the different text sections may be structured to mimic a clause hierarchy shown in the natural-language-text document. Some embodiments may then generate a list of clauses or other extracted text sections, where each extracted text section may indicate the prior text in the hierarchy of clauses. As described elsewhere in this disclosure, some embodiments may then determine whether the text section includes one or more trigger phrases or other set of n-grams that is mapped to a category value representing a deontic category.

Some embodiments may pass a clause or other extracted text section to a natural language preprocessing stage that converts text into a token sequence, where natural language definition terms may be replaced by token equivalents of words in the token sequence. A token sequence may include various types of tokens, where a token may represent a reduced form of a word (e.g., a stemmed or lemmatized version of a word), the word itself, or the like. For example, some embodiments may generate a token sequence "[('3.21(iv)(b)', 'client', 'is', 'permitted', 'to', 'acquire', 'items', 'in', 'section', '7.89(i)', *.']" based on the clause "(3.21(iv)(b) client is permitted to acquire items listed in section 7.89(1)." As described elsewhere in this disclosure, some embodiments may then generate a sequence of embedding vectors representing the tokens or other n-grams of the clause in an embedding space representing a feature space of the words of the natural-language-text document. Furthermore, as described elsewhere in this disclosure, some embodiments may retrieve a stored set of entity identifiers and determine whether a word, phrase, or another sequence of strings of a text section is stored as an entity identifier. If a determination is made that the sequence of strings is the identifier or otherwise includes the identifier, some embodiments may determine that the sequence of strings is a lexical item or another element representable as a single token, where an embedding vector may be generated based on the sequence of strings or token representation of the sequence of strings.

Some embodiments may determine parameters associated with text sections based on list structure, enumeration, whitespace, punctuation, formatting, markup language tags, some combination thereof, or the like. For example, some embodiments may use a combination of keywords and newlines to determine boundaries for a text section and then select category values to assign to the text section based on the keywords. In some embodiments, the category values may be selected from a set of categories including the labels "definitions," "prices," "disclaimers," or the like, where the category values may be distinct from category values corresponding with category values of a data model object indicating whether a detected proposition may be a right, obligation, or proposition. In some embodiments, category values for text sections may be preassigned to different combinations of text elements such as white spaces, keywords, structures, formatting, markup tags, or the like. Alternatively, or in addition, some embodiments may modify multiple associations between category values and combinations of text elements based on detected features of a text. For example, some embodiments may determine that text sections are delimited by semicolons at a first text section and that text sections are delimited by periods and commas at another text section.

As used in this disclosure, a text section may include other text sections. For example, a first text section may include a paragraph, where the first text section may include a second text section and third text section, where the second and third text sections represent first and second sentences of the paragraph, respectively. The third text section may include a fourth text section and fifth text section, where the fourth and fifth text sections represent first and second clauses of the first sentence, respectively. As described elsewhere in this disclosure, some embodiments may generate a conditional statement based on a clause, where the conditional statement may be structured in a specific format associated with data model entities. For example, a conditional statement may include a first list to store or identify a first set of semantic triples and a second list to store or identify a second set of semantic triples, where the first list is to be used as conditions of the conditional statement, and where the second list is to be used as consequent outcomes of the conditions being satisfied or not satisfied.

In some embodiments, the natural language text document may include metadata tags, such as tags of a markup language. Some embodiments may generate one or more text sections or otherwise use these tags to determine relations between different text sections, different conditional statements of the text sections, or the like. For example, some embodiments may obtain a natural language text document in the form of a markup language, where different sections of the document may include hidden tags such as "<label="exceptions" that indicate labels to assign two different text sections. Furthermore, as described elsewhere in this disclosure, some embodiments may generate or update a document to include markup tags, where the markup tags may be generated from a semantic map or another set of data model objects described in this disclosure.

In some embodiments, operations of the process 800 may include determining a set of embedding sequences or other set of learned representations associated with the set of clauses or other text sections. A learned representation may include one or more types of values, such as Boolean values, numeric values, category values, or the like. For example, some embodiments may generate a set of learned representations for text data by generating a set of embedding vectors as the set of learned representations. An embedding vector may include a vector having multiple numeric values in a multi-sense embedding space, where each dimension of the embedding space may represent a feature of a natural language domain. Some embodiments may determine embedding vectors for some or all of the words of a text using a set of learning model parameters of a machine learning model. Alternatively, or in addition, some embodiments may determine embedding vectors for lexical items. For example, some embodiments may generate a first set of embedding vectors for words or parts of words of a first text section.

The embedding space of an embedding vector may include multiple vector dimensions, such as more than two dimensions, more than 20 dimensions, more than 200 dimensions, more than 2000 dimensions, or the like. In some embodiments, the embedding space of an embedding vector may include fewer dimensions than a cardinality of the words, lexical items, or other n-grams of a natural-language-text document. For example, some embodiments may obtain a natural language text document that includes over 100,000 words and represent the n-gram of the document with embedding vectors in an embedding space having fewer than 100,000 dimensions.

Some embodiments may generate an embedding vector or other learned representation using a machine learning model to otherwise reduce a high-dimensional representation of the parts of speech and lexical items to embedding vectors of an embedding layer. For example, some embodiments may use a recurrent neural network model, bidirectional recurrent neural network model, or transformer neural network model to generate a sequence of embedding vectors (embedding sequence). Some embodiments may determine an embedding vector associated with an n-gram using a model based on both the n-gram itself and the context surrounding the n-gram (e.g., other lexical items surrounding a lexical item, the corresponding embedding vectors, etc.). For example, some embodiments may use a bidirectional long short term memory (LSTM) neural network model or another recurrent neural network to generate encoding vectors. One such neural network model that may be used is described in Embeddings from Language Models (ELMo), as described by Peters et al. (Peters, M. E., Neumann, M., Iyyer, M., Gardner, M., Clark, C., Lee, K. and Zettlemoyer, L., 1802. Deep contextualized word representations. arXiv 2018. arXiv preprint arXiv:1802.05365), which is hereby incorporated by reference in its entirety. By determining embedding vectors or other learned representation of a set of words, a set of lexical items, or other n-grams based on their surrounding words, surrounding lexical items, or other context, some embodiments may encode differences in the meaning of text in cases where words or lexical items may have similar or identical spelling.

As described elsewhere in this disclosure, some embodiments may use a machine learning model such as a recurrent neural network model to predict or categorize values. For example, some embodiments may operate on unbounded sequences of n-grams or embedding vectors, where the sequences may be processed in the order of the sequence to maintain a state that is dependent on a current input and a previous state during the use of the recurrent neural network model. As described elsewhere in this disclosure, the recurrence of the neural network layers of a recurrent neural network may be bidirectional, such that intermediate outputs of a neural network layer may be processed in both a forward and backward order to permit a state to encode future and past contexts. In some embodiments, such as in the case of using a LSTM neural network or gated recurrent unit (GRU) neural network, neurons of a neural network may include internal memory gate parameters, where the internal memory gate parameters may modify stored state values in a manner analogous to 'remembering' or 'forgetting' a past state when determining a future value. Furthermore, one or more of the machine learning models described in this disclosure may include deep neural networks, where deep neural networks may include more than three neural network layers.

Some embodiments may also modify or otherwise update learning model parameters based on a selected domain category associated with a natural-language-text document. For example, a machine learning model may use a first set of neural network model parameters associated with a domain category labeled "domain1" to generate embedding vectors for an embedding sequence of a first natural-language-text document in response to a determination that the first natural language-text document is associated with the domain category "domain1." In response to a determination that a second natural language is associated with the domain category "domain2," some embodiments may select a second set of neural network model parameters associated with a domain category labeled "domain2" to generate embedding vectors for an embedding sequence of the second natural-language-text document. Furthermore, some embodiments may adaptively determine one or more model parameters based on a selected or matched graph template using one or more operations described in U.S. patent application Ser. No. 17/015,074, filed Sep. 7, 2020, titled "ADAPTIVE PARAMETER TRANSFER FOR LEARNING MODELS," which is hereby incorporated by reference in its entirety.

Some embodiments may also determine a sequence of parts-of-speech values for words, tokens, lexical items, or embedding vector representations thereof, where different words or n-grams may share the same parts-of-speech value. For example, some embodiments may use a dictionary or stored set of definitions to assign values such as grammar categories to different lexical items or other n-grams of a text section, where some embodiments may assign a respective parts-of-speech value to each respective lexical item of a text section. As described elsewhere in this disclosure, some embodiments may then use the sequence of parts-of-speech values in combination with embedding vectors or other values to categorize a text section, determine a subject entity, or determine a text section indicating a proposition or portion of a proposition.

As described elsewhere in this disclosure, some embodiments may use a machine learning model to determine one or more values used to populate fields a data model object such as a semantic triple or values associated with a semantic triple. For example, some embodiments may use a trained neural network model to determine a verb predicate value and a subject entity of a clause. Also, as described elsewhere in this disclosure, some embodiments may use parts—of speech values in conjunction with embedding vectors as inputs to a recurrent neural network model to determine category values or other values described in this disclosure. For example, some embodiments may provide a concatenation of an embedding sequence and a sequence of parts-of-speech values to a machine learning model to generate an intermediate output state including a corresponding intermediate output category value.

Some embodiments may then, during a later time after generating the intermediate output state, provide the intermediate output in conjunction with the embedding sequence and the parts-of-speech values to the recurrent neural network model to determine a first category value. For example, for a noninitial, non-terminal embedding vector of the first embedding sequence, such as a third embedding vector of an embedding sequence having at least five embedding vectors, some embodiments may determine intermediate outputs using a recurrent neural network model that are used to generate subsequent outputs. For example, some embodiments may use layers of a neural network model to generate a first intermediate output based on a first embedding vector representing the first word of a clause. Some embodiments may then use the neural network layers to generate a second intermediate output based on both the first intermediate output and a second embedding vector representing a second word of the clause and use the neural network layers to generate a third intermediate output based on both the second intermediate output and a third embedding vector representing a third word of the clause. Some embodiments may repeat the above operations of using a previous output as an inputs for later iterative uses of a neural network model to determine a final output, such as a category value.

In some embodiments, operations of process 800 may include generating a hierarchical structure of clauses to determine a location or region of trigger words as indicated by block 806. A hierarchical clause tree may be used to determine an applicable subcategorization frame to identify, locate, and extract sematic triples. For example, a hierarchical clause tree is used to represent a relationship between a parent text and child text that may modify, qualify, or provide further detail or specialization of the parent text. In some embodiments, each path through the hierarchical clause tree is unwound to produce a list of paths or herein described as textual units that can be processed independently by a machine learning algorithm.

In some embodiments, using the hierarchical clause tree and the trigger words can expedite the location, classification, and extraction of semantic triples. A clause having a hierarchical structure may be identified as having a main subject and each tier of the hierarchical structure corresponds to a subject or proposition that modifies the main subject. In this manner, the hierarchical structure is used to associate categories of semantic triples or predicate object (PO) pairs.

In some embodiments, operations of the process 800 may include determining semantic triples based on trigger words as indicated by block 706. Semantic triples may be determined various methods including classifying a word instance as it appears in context. These classified words are then used to determine co-occurring words that may indicate possibility, necessity or agreement (e.g., at least a portion of a semantic triple such as ROP). In some embodiments, various word labeling or classifications are applied to text of the document. The labeled or classified words may further be filtered to provide a set of trigger words. For example, as described with regards to FIGS. 3C, 3D, and 3E, trigger words are used to determine semantic triples in co-occurring or neighboring text. Additional or alternative operations for determining semantic triples based on trigger words are described herein with regards to at least FIGS. 9 and 10.

In some embodiments, operations of process 800 may include annotating the document with semantic triples as indicated by block 708. This may include annotating the document with semantic triples in a manner that is the same or similar to that described with regard to block 708 of FIG. 7, 9, or 10. Annotating a document with semantic triples may include the computer system 102 populating an annotation of an annotated version of the natural-language-text document 202 with the clause determined.

Some embodiments may store data model objects and associations between data model objects in a directed graph. In some embodiments, a graph vertex of a directed graph may be stored as a single record. For example, a graph vertex 416 may include data corresponding to a portion of a data model object. Alternatively, or in addition, some embodiments may store a graph vertex of a directed graph as a plurality of records or as values of a plurality of records. For example, some embodiments may store a first array that includes graph vertex identifiers, where sub-arrays identified by the graph vertex identifiers include pointers to the address of other values stored in other records that are indexed by a different set of identifiers. A record of the graph vertex may include a respective graph vertex identifier and a respective set of values stored at a corresponding address of other values indicated by a respective set of pointers associated with the respective graph vertex identifier, even if the other values are stored in a second record.

As described elsewhere in this disclosure, some embodiments may associate each graph vertex of the directed graph with its semantic triple or other data model object. For example, some embodiments may, for each semantic triple of a set of semantic triples, add a graph vertex to a directed graph that includes or is otherwise associated with an entity identified by the semantic triple, a category value representing a deontic category, and a set of text determined by a machine learning model to include a proposition. In some embodiments, the graph vertex may also include the text section used to generate graph vertex. Alternatively, some embodiments may store or otherwise associate multiple semantic triples with a graph vertex. For example, some embodiments may generate a graph vertex based on detected sections of a natural-language-text document using a machine learning model, where each graph section may include data extracted from multiple semantic triples based on listed entities of the semantic triples.

In some embodiments, operations of the process 800 may include storing a data structure that includes the semantic triples or other data model objects generated from the natural-language text document and associations between the data model objects in memory. For example, the semantic triples or other data model objects are stored in data 1120 of computer system 1102. Various data structures may be used to store structured data generated from a natural language-text document. For example, some embodiments may store the data structure in a resource description framework (RDF) database (i.e., triplestore database). As described elsewhere in this disclosure, some embodiments may store structured data in a SQL database, a key-value pair database, or another type of database. In some embodiments, storing a data structure that includes the generated data model objects may include serializing the data structure and then storing the serialized form of the data structure. Some embodiments may store the data model in a nonvolatile local persistent memory device, such as a spinning hard drive or solid-state drive. Alternatively, or in addition, storing the data model objects may include storing the data structure on a decentralized, tamper-evident data store. For example, some embodiments may store one or more data object models on a decentralized tamper-evident data store such as the Interplanetary File System. Furthermore, during or after storing a semantic map or other structured data, some embodiments may combine conditional statements with other semantic maps. For example, some embodiments may perform operations to determine an aggregated parameter by combining parameters of data model objects using one or more operations described in U.S. patent application Ser. No. 17/015,042, filed Sep. 7, 2020, titled "MULTI-GRAPH VERIFICATION," which is hereby incorporated by reference in its entirety.

Figure 9:
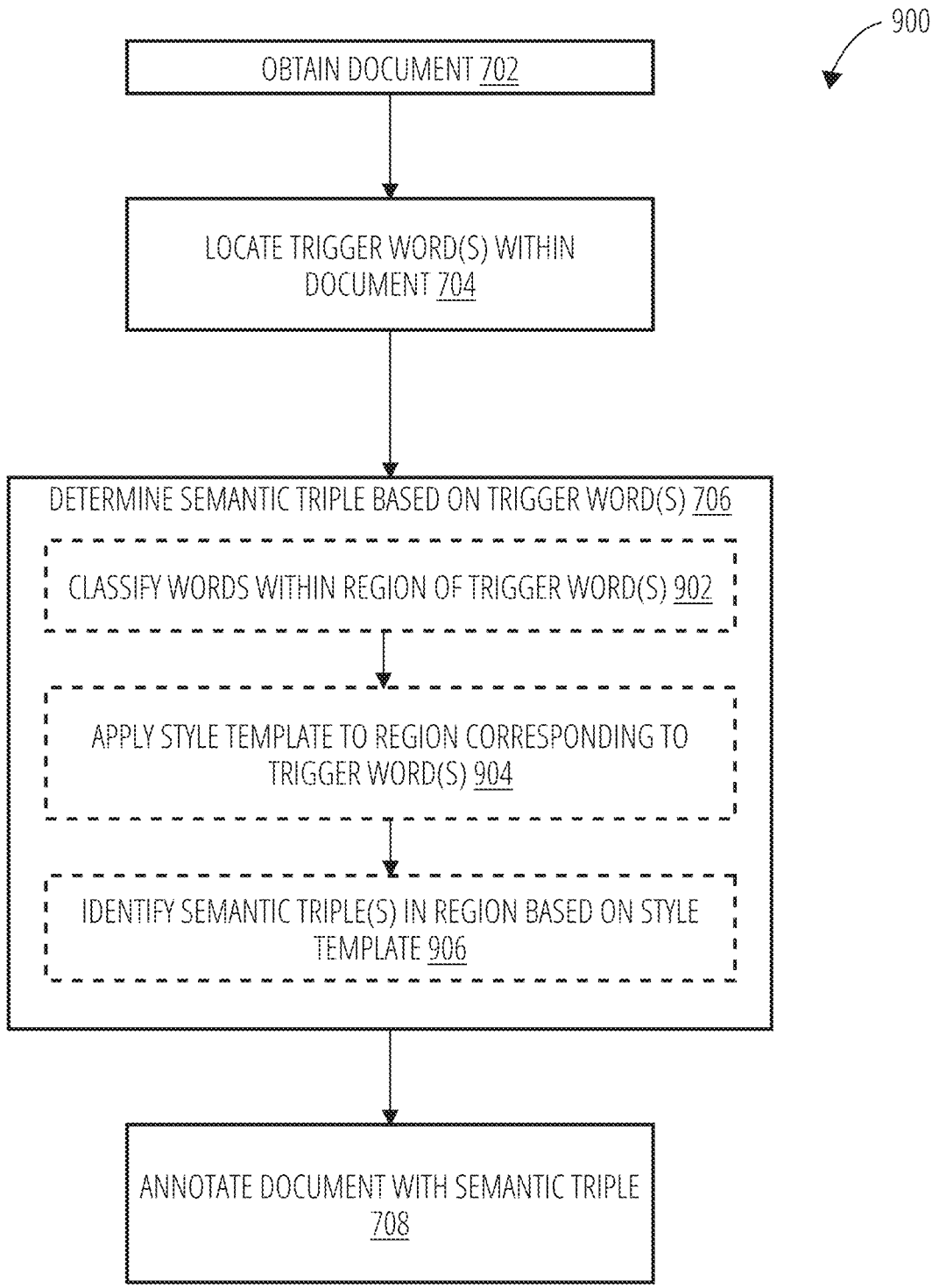
FIG. 9 is a flowchart illustrating an aspect of a process to generate a semantic map, in accordance with one or more embodiments.

FIG. 9 is a flowchart illustrating an aspect of a process to generate a semantic map, in accordance with one or more embodiments. In some embodiments of method 900, similar or identical operations as described in method 700 or 800 may be performed. Performance of the operations of process 900 may include obtaining a natural language-text document, as indicated by block 702.

In some embodiments, operations of process 900 may include locating trigger word within the document as indicated by block 704. Referring to the description in FIGS. 7 and 8, locating trigger words within document can be performed in various manners.

In some embodiments, operations of the process 900 may include determining a semantic triple based on the trigger words as indicated by block 706. In some embodiments, determining a semantic triple based on the trigger words includes classifying words within a region of trigger words in the neural or directed graph representation of the document as indicated by block 902.

Some embodiments may determine a subject entity or an object entity based on a detected verb predicate using one or more operations described in patent application 63/134,872, filed on Jan. 7, 2021, titled "STRUCTURED SEMANTIC CONTRACT MAPS." For example, to determine a subject entity or an object entity, some embodiments may train a machine learning model using a joint binary classification algorithm by minimizing a total cross-entropy loss based on a detected verb predicate. Some embodiments may use a same machine learning model used to determine the set of predicate values, where a different set of learning model parameters may be used to detect subject or object values. Alternatively, or in addition, some embodiments may use a different machine learning model. For example, some embodiments may use a transformer neural network model to determine a predicate value and use a GRU neural network model to determine a subject entity. Various types of entropy loss formulations may be used, where some embodiments may use an entropy loss formulation that determines loss terms between each subject or object n-gram and a detected predicate value. Some embodiments may then use the determined subject identified by the machine learning model to determine a subject entity for a semantic triple.

Some embodiments may generate and use a set of attention values to perform one or more NLP operations to extract or categorize the text of a natural-language-text document, where the attention values may be used to weigh or otherwise modify an output of a neural network. Various methods may be used to determine or use attention values. For example, some embodiments may use a multi-headed attention-based autoencoder, such as autoencoders using a model similar to those described by Vaswani et al. (Vaswani, Ashish, Noam Shazeer, Niki Parmar, Jakob Uszkoreit, Llion Jones, Aidan N. Gomez, Lukasz Kaiser, and Illia Polosukhin. "Attention is all you need." In Advances in neural information processing systems, pp. 5998-6008. 2017, arXiv:1706.03762) or Devlin et al. (Devlin, J., Chang, M. W, Lee, K. and Toutanova, K., 2018. Bert: Pre-training of deep bidirectional transformers for language understanding. arXiv preprint arXiv:1810.04805), which are incorporated by reference in their entirety.

In some embodiments, determining a semantic triple includes applying a style template to the region of trigger words as indicated by block 904. A style template may be selected of a plurality of available prespecified linguistic templates. A subject-predicate-object style template may be used to identify one or more words corresponding to a semantic triple such as an ROP. For example, a template model is used to calculate a score corresponding to each word within a proximity to the trigger word. The calculated scores are compared to determine a tuple containing words that maximize the output score.

In some embodiments, determining a semantic triple includes identifying semantic triples based on the applied style template as indicated by block 906. Some embodiments may determine a set of candidate subject entities based on an embedding sequence using a machine learning model. For example, some embodiments may use a trained machine learning model to predict which sequence of strings to identify as a subject entity identifier. Some embodiments may then compare the candidate subject entities to a stored set of entities, where the stored set of entities may be represented as a stored set of entity identifiers indicating entities having user accounts. Some embodiments may detect that a set of n-grams identifying a candidate subject entity is directly stored in a repository storing records representing a stored set of entity identifiers. Alternatively, some embodiments may detect that a set of n-grams identifying a candidate subject entity is a subset of a second entity, where the second entity is stored in a repository storing records representing a stored set of entity identifiers. For example, some embodiments may determine that "loan originator" is a candidate subject entity. Some embodiments may then determine that "loan originator" is a role assigned to an entity identified as "entity 123." In response to detecting the indirect identification of an entity, some embodiments may then determine that the candidate subject entity is an entity identified by the stored set of entity identifiers and populate a subject entity field of a semantic triple or other data model object with the candidate subject entity.

As described elsewhere in this disclosure, some embodiments may use the embedding sequence to determine a set of values based on the embedding sequence, where the set values may include an entity identifier, a category value representing a deontic category, a semantic double, or the like. Some embodiments may extract text sections of a natural-language-text document and store the text sections in the form of a directed graph structure, where graph vertices of the directed graph structure may represent clauses, and where graph edges of the directed graph may correspond with parent-child relationships between clauses or other indicated references between clauses. Some embodiments may further augment vertices or edges with associated information such as the corresponding clause text or a data model object extracted from the clause text.

In some embodiments, operations of process 900 may include annotating the document with semantic triples as indicated by block 708. This may include annotating the document with semantic triples in a manner that is the same or similar to that described with regard to block 708 of FIG. 7, 8, or 10. Annotating a document with semantic triples may include the computer system 102 populating an annotation of an annotated version of the natural-language-text document 202 with the clause determined.

In some embodiments, operations of process 900 may include performing a set of training operations on a set of training documents to determine a set of query vectors, key vectors, and value vectors for each attention head of a multi-headed attention model during training. A query vector may indicate an n-gram position(s) in a sequence of n-grams, a key vector indicating the n-gram positions in the n-gram sequence, and a value vector may indicate a value generated from the text of the n-gram. During a training operation, some embodiments may learn the three vectors and combine them with each other query, key, and value vectors, respectively, of other n-grams of a text section being analyzed to generate a query matrix, key matrix, and value matrix for the text section. Some embodiments may then perform a set of element-wise operations, where the element-wise operations include performing a matrix multiplication operation between the query matrix and the key matrix and then multiplying a transpose of the resulting matrix with the value matrix to determine attention weighted token for the n-grams of a text section. Some embodiments may then perform the above operations using different query, key, and value matrices for each attention head of a multi-headed attention model and concatenate the resulting matrices together to determine an output matrix. Some embodiments may then provide the output matrix as an input to a set of feed forward neural network layers to determine an additional set of outputs that may then be further processed to be decoded by a decoding neural network layer, where the decoding neural network layer may provide be used to provide one or more predictions. For example, the decoding neural network layer may be used to predict a category value representing a deontic category, such as whether a clause represents a "right," "obligation," or "prohibition."

In some embodiments, operations of process 900 may include encoding a data model object of a self-executing protocol in a programming language or another type of formal language. For example, a semantic triple or other data model object may be stored as a data structure encoding three different fields in a domain specific programming language, a structured data format such as JSON, or the like. In some embodiments, a semantic triple, semantic double, or other data model object may be a part of or otherwise be associated with a conditional statement as a condition of the conditional statements. For example, some embodiments may use an encoded proposition of a semantic triple to generate a document. Alternatively, or in addition, values of a semantic triple or other data model object may be included in part or in whole as a set of conditions or outcome subroutines of a conditional statement.

Figure 10:
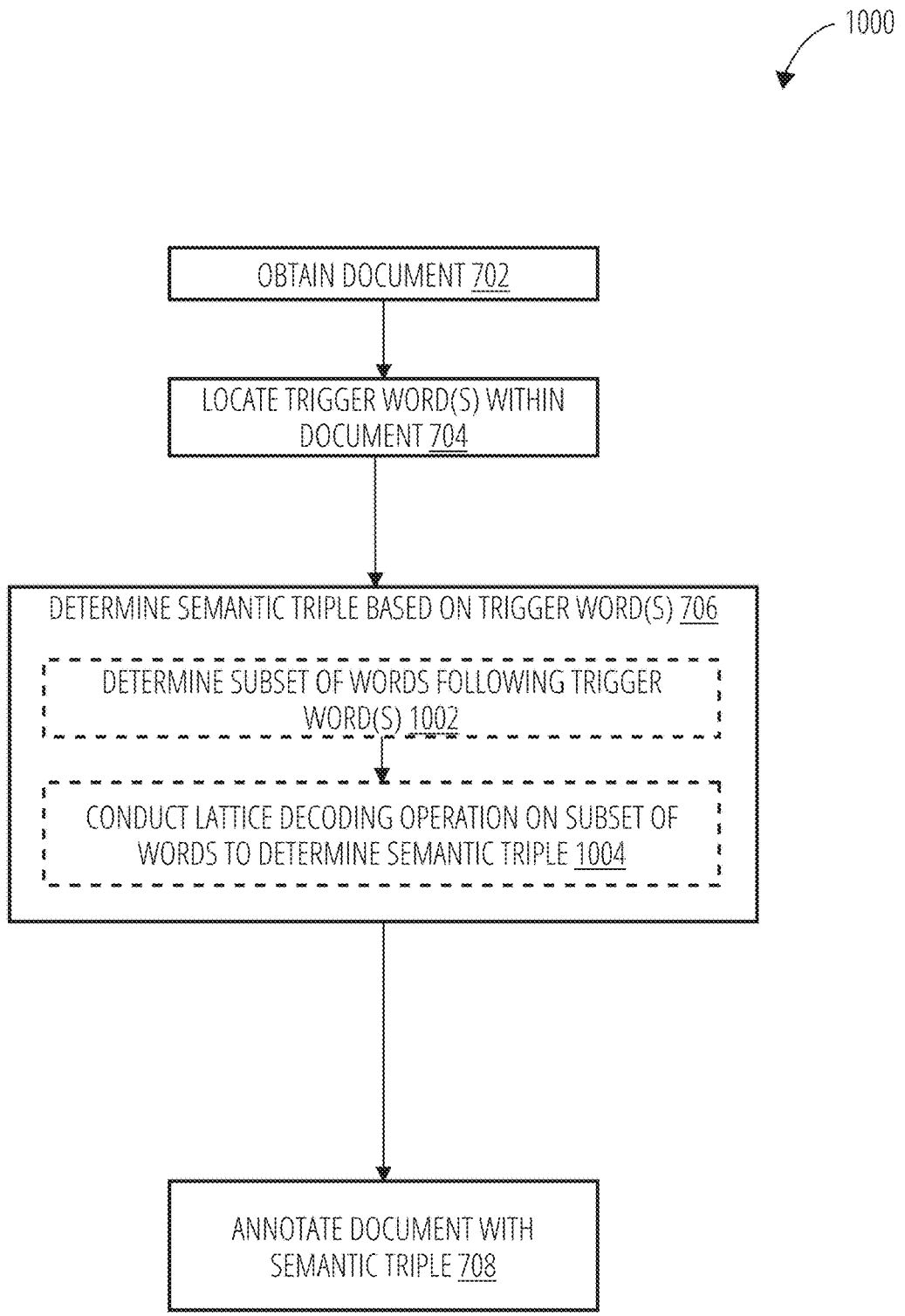
FIG. 10 is a flowchart illustrating an aspect of a process to generate a semantic map, in accordance with one or more embodiments.

FIG. 10 is a flowchart illustrating a process 1000 for generating a semantic map, in accordance with one or more embodiments. Notably, process 1000 may include employing a lattice decoding operation for determining semantic triples.

In some embodiments, the process 1000 includes obtaining a document as indicated by block 702. This may include obtaining a document in a manner that is the same or similar to that described with regard to block 702 of FIG. 7, 8 or 9. For example, obtaining a document may include the computer system 102 obtaining the natural-language-text document 202.

In some embodiments, operations of the process 1000 includes locating trigger word(s) within a document as indicated by block 704. This may include locating trigger word(s) within a document in a manner that is the same or similar to that described with regard to block 704 of FIG. 7, 8 or 9. Continuing with the prior example, locating trigger word(s) within a document may include the computer system 102 determining a location of each of one or more trigger words (e.g., "may," "shall," "will," "agrees," etc.) located in the natural-language-text document 202.

In some embodiments, operations of the process 1000 include determining a semantic triple based on the trigger words as indicated by block 706. In some embodiments, determining a semantic triple based on the trigger words includes determining a set of words following the trigger words as indicated by block 1002 and conducting a lattice decoding operation on the set of words to determine a semantic triple, as indicated by block 1004.

In some embodiments, determining a set of words following the trigger words (block 1002) includes determining a set of words following the trigger word in the unstructured text of the natural language document. The set of words may be defined, for example, by a predefined number of words following the trigger word, or a span of words extending between the trigger word and an end of clause token. A last word of the set of words may define an end of clause token. Continuing with the above example, and referring to FIG. 3E, where the trigger word is "shall" and the set of words is defined by nine words following the trigger word, determining a set of words following the trigger words may include the computer system 102 identifying, from the text of the natural-language-text document 202, a set of nine words following the term "shall," that includes "become," "unable," "or," "fail," "generally," "to," "pay," "its," and "debts."

In some embodiments, operations of the process 1000 include conducting a lattice decoding operation on the set of words to determine a semantic triple (block 1004). This may include conducting a lattice decoding operation on the set of words to identify a clause that contains or at least partially contains a semantic triple. In some embodiments, this includes determining a clause decoding lattice (for the set of words) that defines one or more paths (through the set of words) between the trigger word and the end of clause token, conducting a lattice decoding operation to select a path of the clause decoding lattice, and determining a clause including one or more words of the set of words that correspond to the path selected. Continuing with the above example, and referring to FIG. 3E, conducting a lattice decoding operation on the set of words to determine a semantic triple may include the computer system 102 determining a clause decoding lattice (for the set of words) that defines paths (through the set of nine words) between the trigger word ("shall") and the end of clause token ("debts") (see, e.g., the lattice of FIG. 3F or 3G), selecting a path of the clause decoding lattice (e.g., a path that passes through nodes corresponding to "shall," "fail," "to" "pay" and "debts", and determining a clause of "shall fail to pay debts". In some embodiments, the clause may be determined to include the trigger word and the words associated with the path, as well as other elements associated with the trigger word, such as a subject (e.g., "Borrower") that precedes the trigger word. For example, the clause may be determined as "Borrower shall fail to pay debts". In some embodiments, a data model object may be generated that associates the clause with the trigger word or the location in the document. The data model object may be stored in memory.

In some embodiments, the lattice decoding operation includes a maximum path lattice decoding operation, as described herein. In such an embodiment, the clause decoding lattice may, for example, be a bivariate lattice having nodes defined by the set of words, where each node is defined by a word and previous word. The maximum path lattice decoding operation may include: conducting a trigram evaluation to a determine trigram scores each of some or all of the word triples of the set of words; conducting, based on the trigram scores, edge relaxations for respective edges extending between some or all of the nodes of the bivariate lattice; determining, based on the edge relaxations, path scores for paths defined by the bivariate lattice; and determining, a path of the bivariate lattice associated with a highest path score of the path scores. In such an embodiment, the path selected may be the path of the bivariate lattice associated with a highest path score of the path scores.

In some embodiments, the lattice decoding operation includes a recursive optimization lattice decoding operation, as described herein. In such an embodiment, the recursive optimization lattice decoding operation may include conducting a trigram evaluation to determine trigram scores for some or all of the word triples of the set of words, and conducting, based on the trigram scores, a backward recurrence operation and forward recurrence operation to determine path scores for the one or more paths. In such an embodiment, the path selected may be a path of the clause decoding lattice associated with a highest path score of the path scores.

In some embodiments, the lattice decoding operation includes a beam search lattice decoding operation, as described herein. In such an embodiment, the beam search lattice decoding operation may include the following: (a) for a given node of a path of the clause decoding lattice, determining next possible nodes; (b) for each node of the next possible nodes conducting a trigram evaluation to determine a trigram score for the node; and (c) determining, based on the trigram scores for the next possible nodes, a given one of the next possible nodes as a next node. The steps (a), (b) and (c) may be repeated for the next node and so forth (e.g., until a node corresponding to an end of clause token is reached), to iteratively identify nodes to define the selected path (e.g., the path including the given node and the nodes identified as the "next" nodes in each iteration).

The described process for determining a semantic triple (e.g., described with regard to blocks 1002 and 1004 may, in some instances, be repeated for each of one or more trigger word locations (e.g., in document 202) to determine clauses for the associated trigger words (e.g., some or all of the trigger words located in document 202).

In some embodiments, operations of the process 800 may include annotating a document with semantic triples as indicated by block 708. This may include annotating the document with semantic triples in a manner that is the same or similar to that described with regard to block 708 of FIG. 7, 8 or 9. Annotating a document with semantic triples may include the computer system 102 populating an annotation of an annotated version of the natural-language-text document 202 with the clause determined. Continuing with the prior example, where the trigger word "shall" is located in Section 6.05 of a contract document associated with the UI 600 illustrated in FIG. 6, the UI 600 may include a box (similar to the first box 611) that includes a section title "Section 6.05 Asset Sale" and a representation of the clause "Borrower shall fail to pay debts". The box may, for example, be an interactive element that is user selectable to navigate to the portion of the contract (e.g., section 6.05), containing the trigger word and the clause.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

Figure 11:
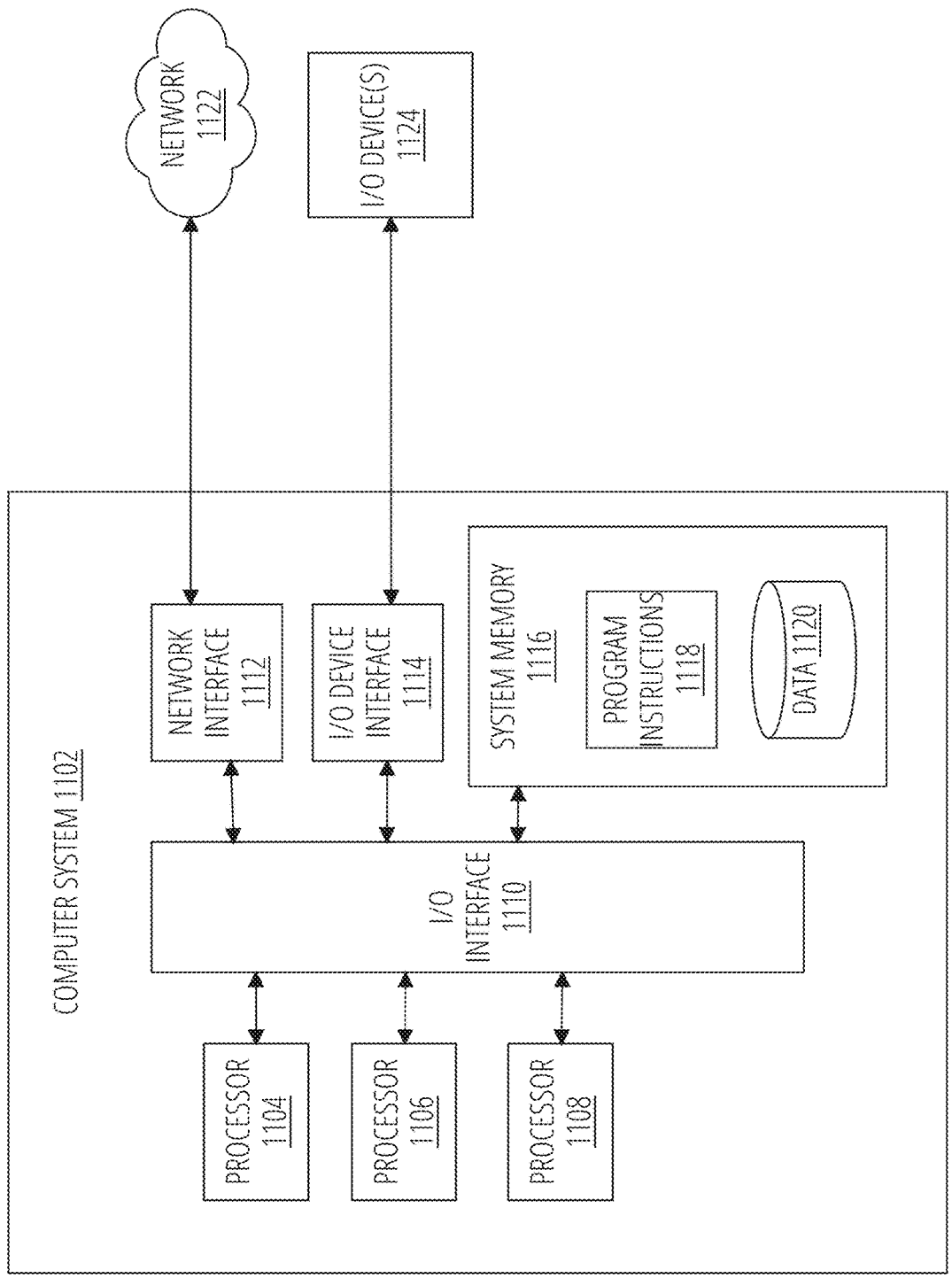
FIG. 11 shows a computer system for generating a data structure based on a natural language-text document, in accordance with one or more embodiments.

FIG. 11 shows a computer system for generating a data structure based on a natural language-text document, in accordance with one or more embodiments of the present techniques. FIG. 11 is a diagram that illustrates an exemplary computer system 1102 in accordance with embodiments of the present technique. Various portions of systems and methods described herein, may include or be executed on one or more computer systems similar to computer system 1102. Further, processes and modules described herein may be executed by one or more processing systems similar to that of computer system 1102.

Computer system 1102 may include one or more processors (e.g., processors 1104, 1106, 1108) coupled to system memory 1116, an input/output I/O device interface 1114, and a network interface 1112 via an input/output (I/O) interface 1110. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1102. A processor may execute code (e.g, processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1116). Computer system 1102 may be a uni-processor system including one processor (e.g., processor 1104), or a multi-processor system including any number of suitable processors (e.g., 1104-1108). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 700 may include a plurality of computing devices (e.g., distributed computer systems) to implement various processing functions.

I/O device interface 1114 may provide an interface for connection of one or more I/O devices 1124 to computer system 1102. I/O devices may include devices that receive input (e.g., from a user) or output information (e.g., to a user). I/O devices 1124 may include, for example, graphical U1 presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1124 may be connected to computer system 1102 through a wired or wireless connection. I/O devices 1124 may be connected to computer system 700 from a remote location. I/O devices 1124 located on remote computer system, for example, may be connected to computer system 1102 via a network 1122 and network interface 1112.

Network interface 1112 may include a network adapter that provides for connection of computer system 1102 to a network 1122. Network interface may network interface 1112 may facilitate data exchange between computer system 1102 and other devices connected to the network. Network interface 1112 may support wired or wireless communication. The network may include an electronic communication network, such as the Internet, a local area network (LAN), a wide area network (WAN), a cellular communications network, or the like.

System memory 1116 may be configured to store program instructions 1118 or data 1120. Program instructions 1118 may be executable by a processor (e.g., one or more of processors 1104-1108) to implement one or more embodiments of the present techniques. Program instructions 1118 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1116 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM), bulk storage memory (e.g., CD-ROM or DVD-ROM, hard drives), or the like. System memory 1116 may include a non-transitory computer readable storage medium that may have program instructions stored thereon that are executable by a computer processor (e.g., one or more of processors 1104-1108) to cause the subject matter and the functional operations described herein. A memory (e.g., system memory 1116) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1110 may be configured to coordinate I/O traffic between processors 1104-1108, system memory 1116, network interface 1112, I/O devices 1124 or other peripheral devices. I/O interface 1110 may perform protocol, timing, or other data transformations to convert data signals from one component (e.g., system memory 1116) into a format suitable for use by another component (e.g., processors 1104-1108). I/O interface 1110 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1102 or multiple computer systems 1102 configured to host different portions or instances of embodiments. Multiple computer systems 1102 may provide for parallel or sequential processing/execution of one or more portions of the techniques described herein.

Those skilled in the art will appreciate that computer system 700 is merely illustrative and is not intended to limit the scope of the techniques described herein. Computer system 700 may include any combination of devices or software that may perform or otherwise provide for the performance of the techniques described herein. For example, computer system 700 may include or be a combination of a cloud-computer system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1102 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

Those skilled in the art will appreciate that computer system 1102 is merely illustrative and is not intended to limit the scope of the techniques described herein. Computer system 300 may include any combination of devices or software that may perform or otherwise provide for the performance of the techniques described herein. For example, computer system 300 may include or be a combination of a cloud-computer system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 300 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The term "set" may indicate a single item or a plurality of items, e.g., "set of widgets" may indicate only one widget or may indicate multiple widgets. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A-1. A tangible, non-transitory, machine-readable medium storing instructions that when executed by one or more processors effectuate operations comprising: obtaining, with a computer system, a natural-language-text document comprising unstructured text; generating, with the computer system, based on a first set of machine learning model parameters, a neural representation of the unstructured text; identifying, with the computer system, based on the neural representation, a trigger word located within the unstructured text and associated with a first category; determining, with the computer system, based on the trigger word, a region within the unstructured text comprising descriptors associated with the first category; determining, with the computer system, from the region based on a second set of machine learning model parameters, a descriptor describing an action or condition of the first category; generating, with the computer system, a data model object comprising the descriptor defining an action or condition of the first category; and storing, with the computer system, the data model object in memory.

A-2. The medium of embodiment A-1, further comprising: extracting, with the computer system, a document structure corresponding to the unstructured text of the natural-language-text document; generating, with the computer system, based on the document structure, a directed graph representing contents of the text of the natural-language text document; and assigning, with the computer system, based on the directed graph, a label corresponding to each word of the text to generate a tagged token sequence.

A-3. The medium of any of embodiments A-1 to A-2, wherein the directed graph comprises: a first graph vertex based on a first clause and associated with the data model object; a second graph vertex based on a second clause; and a first graph edge comprising an identifier of the data model object and an identifier of the second graph vertex.

A-4. The medium of any of embodiments A-1 to A-3, the operations further comprising: generating, with the computer system, an annotated document comprising annotations within the document structure, wherein vertices are annotated with descriptors corresponding to the first category; and causing, with the computer system, a visualization of the annotated document structure in a selectable user interface (UI) to be displayed on a display device of a user.

A-5. The medium of any of embodiments A-1 to A-4, the operations further comprising: determining, with the computer system, based on a second trigger word and a third trigger word, a second and a third region within the unstructured text comprising descriptors associated with a second category and a third category, respectively; determining, with the computer system, based on a second set of machine learning model parameters, a descriptor describing an action or condition of the second and third category; wherein generating the data model object comprises: populating a first field with the first category, wherein the first category corresponds to a right; populating a second field with the second category, wherein the second category corresponds to an obligation; and populating a third field with the third category, wherein the third category corresponds to a prohibition.

A-6. The medium of any of embodiments A-1 to A-5, wherein extracting the document structure comprises extracting hierarchical structure within the document structure using cascading finite state machines.

A-7. The medium of any of embodiments A-1 to A-6, wherein extracting the document structure comprises converting each branch of the document corresponding to a clause into a tagged token sequence.

A-8. The medium of any of embodiments A-1 to A-7, further comprising determining definitional statements within the text and replacing the definitional statements with lexical equivalents.

A-9. The medium of any of embodiments A-1 to A-8, wherein each vertex of the directed graph represents a clause comprising rights, obligations, and prohibitions.

A-10. The medium of any of embodiments A-1 to A-9, wherein each edge of the directed graph represents a relationship between clauses.

A-11. The medium of any of embodiments A-1 to A-10, wherein generating the tagged token sequence for each clause comprises using a subcategorization frame template.

A-12. The medium of any of embodiments A-1 to A-11, wherein the tagged token sequence is applied as an input to the first set of machine learning model parameters.

A-13. The medium of any of embodiments A-1 to A-12, wherein generating the neural representation of the text sequence comprises replacing tokens and tags using an embedding layer to generate vector representations of each clause.

A-14. The medium of any of embodiments A-1 to A-13, wherein the category is a right, obligation, or prohibition associated with a clause.

A-15. The medium of any of embodiments A-1 to A-14, wherein identifying the category comprises identifying trigger words by using n-gram patterns.

A-16. The medium of any of embodiments A-1 to A-15, the operations further comprising identifying additional categories, wherein additional categories comprise an event, a condition, a non-obligation, and a failure.

A-17. The medium of any of embodiments A-1 to A-16, wherein determining the set of words defining an action or condition of the category comprises using a style template to compute an output score for each vector representation of clauses and selecting the vector representation having a highest output score.

A-18. The medium of any of embodiments A-1 to A-17, wherein storing the data model object in memory comprises storing a data structure comprising the data model object in a distributed, tamper-evident data store of a peer-to-peer sharing network.

A-19. The medium of any of embodiments A-1 to A-18, the operations further comprising: indexing a first graph vertex based on the first category; wherein causing the display of the visualization comprises: retrieving the identifier of the first graph vertex based on the first category; and displaying text stored in association with the first graph vertex.

A-20. The medium of any of embodiments A-1 to A-19, wherein determining the data model object comprises steps for determining the data model object.

A-21. A method to perform the operations of any of the embodiments A1-A20.

B-1. A tangible, non-transitory, machine-readable medium storing instructions that when executed by one or more processors effectuate operations comprising: obtaining, with a computer system, a natural-language-text document comprising unstructured text; determining, with the computer system, a document structure corresponding to the unstructured text of the natural language text document; identifying, with the computer system, a plurality of clauses within the document structure; generating, with the computer system, using a trained machine learning model, a hierarchical structure; determining, with the computer system, based on a trigger word associated with a first category within the hierarchical structure and a first set of machine learning model parameters, a region within the unstructured text comprising descriptors associated with the first category; determining, with the computer system, from the region based on a second set of machine learning model parameters, a descriptor describing an action or condition of the first category; generating, with the computer system, a data model object comprising the descriptor defining an action or condition of the first category; and storing, with the computer system, the data model object in memory.

B-2. The medium of embodiment B-1, the operations further comprising: determining, with the computer system, based on the trigger word and a second set of machine learning model parameters, a descriptor describing an action or condition of a second category; wherein generating the data model object comprises: populating a first field with the first category, wherein the first category corresponds to a predicate; populating a second field with the second category, wherein the second category corresponds to an object.

B-3. The medium of any of embodiments B-1 to B-2, further comprising: extracting, with the computer system, a document structure corresponding to the unstructured text of the natural-language-text document; generating, with the computer system, a directed graph representing contents of the text of the natural-language text document; and assigning, with the computer system, a label corresponding to each word of the text to generate a tagged token sequence.

B-4. The medium of any of embodiments B-1 to B-3, wherein the directed graph comprises: a first graph vertex based on a first clause; and is associated with the data model object; a second graph vertex based on a second clause; and a first graph edge comprising an identifier of the data model object and an identifier of the second graph vertex.

B-5. The medium of any of embodiments B-1 to B-4, wherein each vertex of the directed graph represents a clause comprising rights, obligations, and prohibitions and each edge of the directed graph represents a relationship between clauses.

B-6. The medium of any of embodiments B-1 to B-5, the operations further comprising: generating, with the computer system, an annotated document comprising annotations within the document structure wherein text associated with vertices of the directed graph are annotated with descriptors corresponding to the first category; causing, with the computer system, a visualization of the annotated document structure in a selectable user interface (UI) to be displayed on a display device of a user.

B-7. The medium of any of embodiments B-1 to B-6, the operations further comprising: wherein extracting the document structure comprises extracting hierarchical structure within the document structure using cascading finite state machines.

B-8. The medium of any of embodiments B-1 to B-7, wherein the category is a right, obligation, or prohibition associated with a clause.

B-9. The medium of any of embodiments B-1 to B-8, wherein storing the data model object in memory comprises storing a data structure comprising the data model object in a distributed, tamper-evident data store of a peer-to-peer sharing network.

B-10. The medium of any of embodiments B-1 to B-9, wherein extracting the document structure comprises extracting the hierarchical structure within the document structure using cascading finite state machines.

B-11. The medium of any of embodiments B-1 to B-10, the operations further comprising: receiving, with the computer system, a query comprising the first category; and causing, with the computer system, a presentation of a visualization of the data model object in response to receiving the query, the visualization comprising: a first shape comprising the region and the first category; and a second shape comprising a first annotation comprising a semantic text clause corresponding to the first category.

B-12. The medium of any of embodiments B-1 to B-11, wherein determining the first data model object comprises steps for determining the first data model object.

B-13. The medium of any of embodiments B-1 to B-12, wherein determining the hierarchical structure comprises steps for determining the hierarchical structure.

B-14. A method to perform the operations of any of the embodiments B1-B13.

C-1. A tangible, non-transitory, machine-readable medium storing instructions that are executable by one or more processors to effectuate operations comprising: obtaining, with a computer system, a location of a trigger word located in unstructured text of a natural-language-text document; determining, with the computer system, based on the location of the trigger word, a set of words defined by a given number of words following the trigger word in the unstructured text of the natural language document, a last word of the set of words defining an end of clause token; conducting, with the computer system, a lattice decoding operation for the set of words to determine a clause associated with the trigger word, the lattice decoding operation comprising: determining, with the computer system, a clause decoding lattice for the set of words, the clause decoding lattice defining one or more paths, between the trigger word and the end of clause token, through the set of words; selecting, with the computer system, a path of the clause decoding lattice; and determining, with the computer system, based on the path selected, the clause comprising one or more words of the set of words that correspond to the path selected; generating, with the computer system, a data model object comprising the clause associated with the trigger word; and storing, with the computer system, the data model object in memory.

C-2. The medium of embodiment C-1, the operations further comprising: generating, with the computer system, based on the data model object, an annotated document comprising an annotation populated with the clause associated with the trigger word.

C-3. The medium of any of embodiments C-1 to C-2, the operations further comprising: causing, with the computer system, a visualization of the annotated document on a graphical user interface (GUI) for viewing by a user, the visualization of the annotated document comprising a visualization of the clause associated with the trigger word.

C-4. The medium of any of embodiments C-1 to C-3, wherein the document comprises a contract, wherein the natural-language-text document comprises a contract, and the clause defines a right, an obligation, or a prohibition term of the contract, such that the visualization of the annotated document comprises a visualization of the right, obligation, or prohibition term of the contract.

C-5. The medium of any of embodiments C-1 to C-4, wherein selecting the path of the clause decoding lattice comprises conducting a maximum path lattice decoding operation to determine path scores for the one or more paths, and selecting the path based on the path scores.

C-6. The medium of any of embodiments C-1 to C-5, wherein the clause decoding lattice comprises a bivariate lattice, comprising nodes defined by the set of words, wherein each node is defined by a word and previous word, and wherein the maximum path lattice decoding operation comprises: conducting a trigram evaluation to a determine trigram scores for word triples of the set of words; conducting, based on the trigram scores, edge relaxations for respective edges extending between nodes of the bivariate lattice; determining, based on the edge relaxations, path scores for paths defined by the bivariate lattice; and determining, a path of the bivariate lattice associated with a highest path score of the path scores, and wherein the path selected is the path of the bivariate lattice associated with a highest path score of the path scores.

C-7. The medium of any of embodiments C-1 to C-6, wherein selecting the path of the clause decoding lattice comprises conducting a recursive optimization lattice decoding operation to determine path scores for the one or more paths, and selecting the path based on the path scores.

C-8. The medium of any of embodiments C-1 to C-7, wherein the recursive optimization lattice decoding operation comprises: conducting a trigram evaluation to determine trigram scores for word triples of the set of words; and conducting, based on the trigram scores, a backward recurrence operation and forward recurrence operation to determine path scores for the one or more paths; and determining, a path of the clause decoding lattice associated with a highest path score of the path scores, and wherein the path selected is the path of the clause decoding lattice associated with a highest path score of the path scores.

C-9. The medium of any of embodiments C-1 to C-8, wherein selecting the path of the clause decoding lattice comprises conducting a beam search lattice decoding operation and selecting the path based on the beam search lattice decoding operation.

C-10. The medium of any of embodiments C-1 to C-9, wherein the beam search lattice decoding operation comprises: for a given node of a path of the clause decoding lattice, determining next possible nodes; for each node of the next possible nodes conducting a trigram evaluation to determine a trigram score for the node; and determining, based on the trigram scores for the next possible nodes, a given one of the next possible nodes as a next node, determining a path comprising the node and the next node in series, and wherein the path selected is the path comprising the node and the next node in series.

C-11. The medium of any of embodiments C-1 to C-10, the operations further comprising: obtaining, with the computer system, the natural-language-text document; generating, with the computer system, based on a first set of machine learning model parameters, a neural representation of the unstructured text of the natural-language-text document; identifying, with the computer system, based on the neural representation, the trigger word located in the unstructured text of the natural-language-text document; and determining, with the computer system, the location of the trigger word within the unstructured text of the natural-language-text document.

C-12. The medium of any of embodiments C-1 to C-11, wherein the natural-language-text document comprises a contract, and wherein the clause defines a right, an obligation, or a prohibition.

C-13. The medium of any of embodiments C-1 to C-12, wherein the clause comprises: a subject preceding the trigger word; and the one or more words of the set of words that correspond to the path selected, wherein the one or more words comprise a predicate.

C-14. The medium of any of embodiments C-1 to C-13, the operations further comprising: obtaining, with the computer system, a second location for a second trigger word located in unstructured text of the natural-language-text document; determining, with the computer system, based on the second location of the trigger word, a second set of words defined by a given number of words following the second trigger word in the unstructured text of the natural-language document, a last word of the second set of words defining a second end of clause token; conducting, with the computer system, a second lattice decoding operation for the second set of words to determine a second clause associated with the second trigger word, the second lattice decoding operation comprising: determining, with the computer system, a second clause decoding lattice for the second set of words, the second clause decoding lattice defining one or more paths, between the second trigger word and the second end of clause token, through the second set of words; selecting, with the computer system, a path of the second clause decoding lattice; and determining, with the computer system, based on the path of the second clause decoding lattice selected, the second clause comprising one or more words of the second set of words that correspond to the path of the second clause decoding lattice selected; generating, with the computer system, a second data model object comprising the second clause associated with the second trigger word; and storing, with the computer system, the second data model object in memory.

C-15. The medium of any of embodiments C-1 to C-14, wherein storing the data model object in memory comprises storing a data structure comprising the data model object in a distributed, tamper-evident data store of a peer-to-peer sharing network.

C-16. A method to perform the operations of any of the embodiments C1-C15.

What is claimed is:

1. A tangible, non-transitory, machine-readable medium storing instructions that when executed by one or more processors effectuate operations comprising:
   obtaining, with a computer system, a natural-language-text document comprising unstructured text;
   generating, with the computer system, based on a first set of machine learning model parameters, a neural representation of the unstructured text, the neural representation including a sequence of a plurality of embedding vectors;
   identifying, with the computer system, based on the neural representation, a trigger word located within the unstructured text and associated with a first category, wherein the trigger word is associated with the first category by using a multi-headed attention model;
   determining, with the computer system, based on the trigger word, a region within the unstructured text comprising descriptors associated with the first category;
   determining, with the computer system, from the region based on a second set of machine learning model parameters, a descriptor describing an action or condition of the first category;
   generating, with the computer system, a data model object comprising the descriptor defining an action or condition of the first category;
   storing, with the computer system, the data model object in memory; and
   annotating the document with semantic triples based on the data model object, wherein the operations further comprise:
      extracting, with the computer system, a document structure corresponding to the unstructured text of the natural-language-text document wherein extracting the document structure comprises:
         extracting hierarchical structure within the document structure using cascading finite state machines; and
         converting each branch of the document corresponding to a clause into a tagged token sequence by using a subcategorization frame template;
      generating, with the computer system, based on the document structure, a directed graph representing contents of the text of the natural-language text document; and
      assigning, with the computer system, based on the directed graph, a label corresponding to each word of the text to generate a tagged token sequence.

2. The medium of claim 1, wherein the directed graph comprises:
   a first graph vertex based on a first clause and associated with the data model object;
   a second graph vertex based on a second clause; and
   a first graph edge comprising an identifier of the data model object and an identifier of the second graph vertex.

3. The medium of claim 1, the operations further comprising:
   generating, with the computer system, an annotated document comprising annotations within the document structure, wherein vertices are annotated with descriptors corresponding to the first category; and causing, with the computer system, a visualization of the annotated document structure in a selectable user interface (UI) to be displayed on a display device of a user.

4. The medium of claim 1, the operations further comprising:

determining, with the computer system, based on a second trigger word and a third trigger word, a second and a third region within the unstructured text comprising descriptors associated with a second category and a third category, respectively;

determining, with the computer system, based on a second set of machine learning model parameters, a descriptor describing an action or condition of the second and third category;

wherein generating the data model object comprises:

populating a first field with the first category, wherein the first category corresponds to a right;

populating a second field with the second category, wherein the second category corresponds to an obligation; and populating a third field with the third category, wherein the third category corresponds to a prohibition.

5. The medium of claim 1, further comprising determining definitional statements within the text and replacing the definitional statements with lexical equivalents.

6. The medium of claim 1, wherein each vertex of the directed graph represents a clause comprising rights, obligations, and prohibitions.

7. The medium of claim 1, wherein each edge of the directed graph represents a relationship between clauses.

8. The medium of claim 1, wherein the tagged token sequence is applied as an input to the first set of machine learning model parameters.

9. The medium of claim 1, wherein generating the neural representation of the text sequence comprises replacing tokens and tags using an embedding layer to generate vector representations of each clause.

10. The medium of claim 1, wherein the category is a right, obligation, or prohibition associated with a clause.

11. The medium of claim 10, wherein identifying the category comprises identifying trigger words by using n-gram patterns.

12. The medium of claim 11, the operations further comprising identifying additional categories, wherein additional categories comprise an event, a condition, a non-obligation, and a failure.

13. The medium of claim 1, wherein determining the set of words defining an action or condition of the category comprises using a style template to compute an output score for each vector representation of clauses and selecting the vector representation having a highest output score.

14. The medium of claim 1, wherein storing the data model object in memory comprises storing a data structure comprising the data model object in a distributed, tamper-evident data store of a peer-to-peer sharing network.

15. The medium of claim 3, the operations further comprising:

indexing a first graph vertex based on the first category;

wherein causing the display of the visualization comprises:

retrieving the identifier of the first graph vertex based on the first category; and displaying text stored in association with the first graph vertex.

16. The medium of claim 1, wherein determining the data model object comprises steps for determining the data model object.

17. A method, comprising:

obtaining, with a computer system, a natural-language-text document comprising unstructured text, wherein the unstructured text comprises a plurality of clauses;

generating, with the computer system, based on a first set of machine learning model parameters, a neural representation of the unstructured text, the neural representation including a sequence of a plurality of embedding vectors;

identifying, with the computer system, a trigger word within the unstructured text and is associated with a first category, wherein the trigger word is associated with the first category by using a multi-headed attention model;

determining, with the computer system, based on the trigger word, a location within the unstructured text comprising descriptors associated with the first category;

determining, with the computer system, based on a second set of machine learning model parameters, a descriptor describing an action or condition of the first category;

generating, with the computer system, a data model object comprising the descriptor defining an action or condition of the first category;

storing, with the computer system, the data model object in memory; and annotating the document with semantic triples based on the data model object, wherein the operations further comprise:

extracting, with the computer system, a document structure corresponding to the unstructured text of the natural-language-text document wherein extracting the document structure comprises:

extracting hierarchical structure within the document structure using cascading finite state machines; and converting each branch of the document corresponding to a clause into a tagged token sequence by using a subcategorization frame template;

generating, with the computer system, based on the document structure, a directed graph representing contents of the text of the natural-language text document; and assigning, with the computer system, based on the directed graph, a label corresponding to each word of the text to generate a tagged token sequence.

* * * * *